(12) United States Patent
Kutaragi et al.

(10) Patent No.: US 7,895,076 B2
(45) Date of Patent: Feb. 22, 2011

(54) ADVERTISEMENT INSERTION, PROFILING, IMPRESSION, AND FEEDBACK

(75) Inventors: Ken Kutaragi, Kanagawa (JP); Masayuki Chatani, Tokyo (JP); Kan Ebisawa, Kanagawa (JP); Shinichi Okamoto, Tokyo (JP); Keiso Shimakawa, Kanagawa (JP); Makoto Kubo, Tokyo (JP); Yutaka Kagiwada, Tokyo (JP); Andrew House, Foster City, CA (US); Glen Van Datta, San Diego, CA (US); Gary Zalewski, Oakland, CA (US)

(73) Assignees: Sony Computer Entertainment Inc., Tokyo (JP); Sony Computer Entertainment America LLC, Foster City, CA (US); Sony Corporation, Tokyo (JP)

( * ) Notice: Subject to any disclaimer, the term of this patent is extended or adjusted under 35 U.S.C. 154(b) by 1160 days.

(21) Appl. No.: 11/400,031

(22) Filed: Apr. 7, 2006

(65) Prior Publication Data

US 2007/0043616 A1    Feb. 22, 2007

Related U.S. Application Data

(63) Continuation-in-part of application No. 11/085,675, filed on Mar. 21, 2005, now Pat. No. 7,085,733, which is a continuation of application No. 10/007,522, filed on Dec. 6, 2001, now Pat. No. 6,882,978, which is a continuation of application No. 09/384,894, filed on Aug. 27, 1999, now abandoned, which is a continuation of application No. 08/672,116, filed on Jun. 27, 1996, now Pat. No. 5,946,664, said application No. 11/400,031 is a continuation-in-part of application No. 11/241,229, filed on Sep. 30, 2005, and a continuation-in-part of application No. 09/780,995, filed on Feb. 9, 2001, now Pat. No. 7,761,328, and a continuation-in-part of application No. 09/771,751, filed on Jan. 29, 2001, now Pat. No. 7,171,480, and a continuation-in-part of application No. 09/452,811, filed on Dec. 2, 1999, now Pat. No. 7,047,302.

(30) Foreign Application Priority Data

Jun. 30, 1995   (JP) .................................. 7-166682
Jul. 4, 2000    (JP) ............................ 2000-241861
Dec. 18, 2000   (JP) ............................ 2000-375096

(51) Int. Cl.
   *G06Q 30/00*   (2006.01)
(52) U.S. Cl. .................. 705/14.41; 705/14.4; 705/14.43
(58) Field of Classification Search .................. 75/14.4, 75/14.41, 14.43
   See application file for complete search history.

(56) References Cited

U.S. PATENT DOCUMENTS 4,521,021 A   6/1985   Dixon (Continued)

FOREIGN PATENT DOCUMENTS

CA   2106122 A1   3/1994

(Continued)

OTHER PUBLICATIONS

Nielsen Media Research, "What TV Ratings Really Mean," Jun. 2005.

*Primary Examiner*—Raquel Alvarez
(74) *Attorney, Agent, or Firm*—Carr & Ferrell LLP

(57) ABSTRACT

Various apparatus, methods and systems for insertion of advertisements in various environments are provided. Apparatus, methods and systems for profiling users, registering advertisement impressions and generating feedback in response to advertisement viewing are also disclosed.

20 Claims, 38 Drawing Sheets

U.S. PATENT DOCUMENTS

| | | |
|---|---|---|
| 4,542,897 A | 9/1985 | Melton et al. |
| 4,734,690 A | 3/1988 | Waller |
| 4,807,158 A | 2/1989 | Blanton et al. |
| 4,905,168 A | 2/1990 | McCarthy et al. |
| 4,926,255 A | 5/1990 | Von Kohorn |
| 4,969,036 A | 11/1990 | Bhanu et al. |
| 5,014,234 A | 5/1991 | Edwards, Jr. |
| 5,083,271 A | 1/1992 | Thacher et al. |
| 5,105,184 A | 4/1992 | Pirani et al. |
| 5,227,874 A | 7/1993 | Von Kohorn |
| 5,231,568 A | 7/1993 | Cohen et al. |
| 5,283,731 A | 2/1994 | Lalonde et al. |
| 5,305,195 A | 4/1994 | Murphy |
| 5,305,389 A | 4/1994 | Palmer |
| 5,319,454 A | 6/1994 | Schutte |
| 5,347,632 A | 9/1994 | Filepp et al. |
| 5,373,440 A | 12/1994 | Cohen et al. |
| 5,377,997 A | 1/1995 | Wilden et al. |
| 5,446,919 A | 8/1995 | Wilkins |
| 5,462,275 A | 10/1995 | Lowe et al. |
| 5,497,479 A | 3/1996 | Hornbuckle |
| 5,512,935 A | 4/1996 | Majeti et al. |
| 5,526,041 A | 6/1996 | Glatt |
| 5,539,450 A | 7/1996 | Handelman |
| 5,548,645 A | 8/1996 | Ananda |
| 5,564,038 A | 10/1996 | Grantz et al. |
| 5,565,909 A | 10/1996 | Thibadeau et al. |
| 5,592,212 A | 1/1997 | Handelman |
| 5,630,757 A | 5/1997 | Gagin et al. |
| 5,636,346 A | 6/1997 | Saxe |
| 5,663,757 A | 9/1997 | Morales |
| 5,684,526 A | 11/1997 | Yoshinobu |
| 5,697,844 A | 12/1997 | Von Kohorn |
| 5,699,497 A | 12/1997 | Erdahl et al. |
| 5,707,289 A | 1/1998 | Watanabe et al. |
| 5,721,827 A | 2/1998 | Logan et al. |
| 5,724,521 A | 3/1998 | Dedrick |
| 5,734,619 A | 3/1998 | Numata et al. |
| 5,748,867 A | 5/1998 | Cosman et al. |
| 5,758,068 A | 5/1998 | Brandt et al. |
| 5,758,257 A | 5/1998 | Herz et al. |
| 5,774,170 A | 6/1998 | Hite et al. |
| 5,794,210 A | 8/1998 | Goldhaber et al. |
| 5,798,519 A | 8/1998 | Vock et al. |
| 5,805,815 A | 9/1998 | Hill |
| 5,822,523 A | 10/1998 | Rothschild et al. |
| 5,848,396 A | 12/1998 | Gerace |
| 5,855,008 A | 12/1998 | Goldhaber et al. |
| 5,857,149 A | 1/1999 | Suzuki |
| 5,860,073 A | 1/1999 | Ferrel et al. |
| 5,867,208 A | 2/1999 | McLaren |
| 5,876,286 A | 3/1999 | Lee |
| 5,879,235 A | 3/1999 | Kaneko et al. |
| 5,903,816 A | 5/1999 | Broadwin et al. |
| 5,910,987 A | 6/1999 | Ginter et al. |
| 5,911,582 A | 6/1999 | Redford |
| 5,916,024 A | 6/1999 | Von Kohorn |
| 5,917,725 A | 6/1999 | Thacher et al. |
| 5,929,850 A | 7/1999 | Broadwin et al. |
| 5,937,037 A | 8/1999 | Kamel et al. |
| 5,946,646 A | 8/1999 | Schena et al. |
| 5,946,664 A | 8/1999 | Ebisawa |
| 5,948,061 A | 9/1999 | Merriman et al. |
| 5,964,660 A | 10/1999 | James et al. |
| 5,970,143 A | 10/1999 | Schneier et al. |
| 5,987,511 A | 11/1999 | Elixmann et al. |
| 5,991,735 A | 11/1999 | Gerace |
| 6,005,602 A | 12/1999 | Matthews, III |
| 6,012,984 A | 1/2000 | Roseman |
| 6,015,348 A | 1/2000 | Lambright et al. |
| 6,020,883 A | 2/2000 | Herz et al. |
| 6,024,643 A | 2/2000 | Begis |
| 6,026,368 A | 2/2000 | Brown et al. |
| 6,029,046 A | 2/2000 | Khan et al. |
| 6,036,601 A | 3/2000 | Heckel |
| 6,047,289 A | 4/2000 | Thorne et al. |
| 6,088,722 A | 7/2000 | Herz et al. |
| 6,108,637 A | 8/2000 | Blumenau |
| 6,113,494 A | 9/2000 | Lennert |
| 6,119,098 A | 9/2000 | Guyot et al. |
| 6,149,519 A | 11/2000 | Osaki et al. |
| 6,151,631 A | 11/2000 | Ansell et al. |
| 6,165,070 A | 12/2000 | Nolte et al. |
| 6,179,713 B1 | 1/2001 | James et al. |
| 6,181,988 B1 | 1/2001 | Schneider et al. |
| 6,196,920 B1 | 3/2001 | Spaur et al. |
| 6,199,082 B1 | 3/2001 | Ferrel et al. |
| 6,216,129 B1 | 4/2001 | Eldering |
| 6,236,975 B1 | 5/2001 | Boe et al. |
| 6,238,290 B1 | 5/2001 | Tarr et al. |
| 6,251,017 B1 | 6/2001 | Leason et al. |
| 6,263,360 B1 | 7/2001 | Arnold et al. |
| 6,264,555 B1 | 7/2001 | Glazman et al. |
| 6,264,560 B1 | 7/2001 | Goldberg et al. |
| 6,267,672 B1 | 7/2001 | Vance |
| 6,267,675 B1 | 7/2001 | Lee |
| 6,275,989 B1 | 8/2001 | Broadwin et al. |
| 6,298,348 B1 | 10/2001 | Eldering |
| 6,308,328 B1 | 10/2001 | Bowcutt et al. |
| 6,312,337 B1 | 11/2001 | Edwards et al. |
| 6,320,495 B1 | 11/2001 | Sporgis |
| 6,324,519 B1 | 11/2001 | Eldering |
| 6,343,990 B1 | 2/2002 | Rasmussen et al. |
| 6,346,045 B2 | 2/2002 | Rider et al. |
| 6,366,701 B1 | 4/2002 | Chalom et al. |
| 6,371,850 B1 | 4/2002 | Sonoda |
| 6,379,251 B1 | 4/2002 | Auxier et al. |
| 6,381,362 B1 | 4/2002 | Deshpande et al. |
| 6,385,592 B1 | 5/2002 | Angles et al. |
| 6,390,922 B1 | 5/2002 | Vange et al. |
| 6,393,574 B1 | 5/2002 | Kashiwagi et al. |
| 6,394,899 B1 | 5/2002 | Walker |
| 6,400,996 B1 | 6/2002 | Hoffberg et al. |
| 6,411,936 B1 | 6/2002 | Sanders |
| 6,434,614 B1 | 8/2002 | Blumenau |
| 6,443,843 B1 | 9/2002 | Walker et al. |
| 6,446,130 B1 | 9/2002 | Grapes |
| 6,446,261 B1 | 9/2002 | Rosser |
| 6,456,234 B1 | 9/2002 | Johnson |
| 6,457,010 B1 | 9/2002 | Eldering et al. |
| 6,460,036 B1 | 10/2002 | Herz |
| 6,468,155 B1 | 10/2002 | Zucker et al. |
| 6,470,138 B1 | 10/2002 | Um et al. |
| 6,484,148 B1 | 11/2002 | Boyd |
| 6,484,149 B1 | 11/2002 | Jammes et al. |
| 6,489,955 B1 | 12/2002 | Newhall, Jr. |
| 6,513,160 B2 | 1/2003 | Dureau |
| 6,516,338 B1 | 2/2003 | Landsman et al. |
| 6,529,940 B1 | 3/2003 | Humble |
| 6,530,840 B1 | 3/2003 | Cuomo et al. |
| 6,532,448 B1 | 3/2003 | Higginson et al. |
| 6,539,375 B2 | 3/2003 | Kawasaki |
| 6,539,544 B2 | 3/2003 | Ebisawa |
| 6,553,178 B2 | 4/2003 | Abecassis |
| 6,560,578 B2 | 5/2003 | Eldering |
| 6,563,523 B1 | 5/2003 | Suchocki et al. |
| 6,564,217 B2 | 5/2003 | Bunney et al. |
| 6,595,859 B2 | 7/2003 | Lynn |
| 6,606,746 B1 | 8/2003 | Zdepski et al. |
| 6,611,957 B2 | 8/2003 | Ebisawa |
| 6,612,932 B2 | 9/2003 | Stern |
| 6,615,039 B1 | 9/2003 | Eldering |
| 6,616,533 B1 | 9/2003 | Rashkovskiy |
| 6,625,578 B2 | 9/2003 | Spaur et al. |

| | | | | | | |
|---|---|---|---|---|---|---|
| 6,632,138 B1 | 10/2003 | Serizawa et al. | | 2001/0032333 A1 | 10/2001 | Flickinger |
| 6,640,097 B2 | 10/2003 | Corrigan et al. | | 2001/0034643 A1 | 10/2001 | Acres |
| 6,640,335 B2 | 10/2003 | Ebisawa | | 2001/0034762 A1 | 10/2001 | Jacobs et al. |
| 6,640,336 B1 | 10/2003 | Ebisawa | | 2001/0037232 A1 | 11/2001 | Miller |
| 6,645,068 B1 | 11/2003 | Kelly et al. | | 2001/0039210 A1 | 11/2001 | St-Denis |
| 6,654,725 B1 | 11/2003 | Langheinrich et al. | | 2001/0049620 A1 | 12/2001 | Blasko |
| 6,656,050 B2 | 12/2003 | Busch et al. | | 2001/0052123 A1 | 12/2001 | Kawai |
| 6,659,861 B1 | 12/2003 | Faris et al. | | 2002/0004743 A1 | 1/2002 | Kutaragi et al. |
| 6,663,105 B1 | 12/2003 | Sullivan et al. | | 2002/0004744 A1 | 1/2002 | Muyres et al. |
| 6,669,562 B1 | 12/2003 | Shiino | | 2002/0007307 A1 | 1/2002 | Miller et al. |
| 6,669,564 B1 | 12/2003 | Young et al. | | 2002/0007310 A1 | 1/2002 | Long |
| 6,680,746 B2 | 1/2004 | Kawai et al. | | 2002/0010626 A1 | 1/2002 | Agmoni |
| 6,683,941 B2 | 1/2004 | Brown et al. | | 2002/0010628 A1 | 1/2002 | Burns |
| 6,684,194 B1 | 1/2004 | Eldering et al. | | 2002/0010757 A1 | 1/2002 | Granik et al. |
| 6,687,608 B2 | 2/2004 | Sugimoto et al. | | 2002/0013174 A1 | 1/2002 | Murata |
| 6,697,792 B2 | 2/2004 | Bunney et al. | | 2002/0018076 A1 | 2/2002 | Gianola |
| 6,699,127 B1 | 3/2004 | Lobb et al. | | 2002/0018982 A1 | 2/2002 | Conroy |
| 6,701,363 B1 | 3/2004 | Chiu et al. | | 2002/0019774 A1 | 2/2002 | Kanter |
| 6,704,930 B1 | 3/2004 | Eldering et al. | | 2002/0022476 A1 | 2/2002 | Go |
| 6,709,335 B2 | 3/2004 | Bates et al. | | 2002/0022516 A1 | 2/2002 | Forden |
| 6,712,702 B2 | 3/2004 | Goldberg et al. | | 2002/0023000 A1 | 2/2002 | Bollay |
| 6,714,236 B1 | 3/2004 | Wada et al. | | 2002/0026345 A1 | 2/2002 | Juels |
| 6,714,723 B2 | 3/2004 | Abecassis | | 2002/0026355 A1 | 2/2002 | Mitsuoka et al. |
| 6,714,917 B1 | 3/2004 | Eldering et al. | | 2002/0026638 A1 | 2/2002 | Eldering et al. |
| 6,716,103 B1 | 4/2004 | Eck et al. | | 2002/0032608 A1 | 3/2002 | Kanter |
| 6,718,551 B1 | 4/2004 | Swix et al. | | 2002/0032626 A1 | 3/2002 | DeWolf et al. |
| 6,721,748 B1 | 4/2004 | Knight et al. | | 2002/0032906 A1 | 3/2002 | Grossman |
| 6,731,238 B2 | 5/2004 | Johnson | | 2002/0044687 A1 | 4/2002 | Federman |
| 6,738,078 B1 | 5/2004 | Duncombe | | 2002/0046087 A1 | 4/2002 | Hey |
| 6,745,011 B1 | 6/2004 | Hendrickson et al. | | 2002/0046095 A1 | 4/2002 | Wallace |
| 6,757,740 B1 | 6/2004 | Parekh et al. | | 2002/0046102 A1 | 4/2002 | Dohring et al. |
| 6,758,746 B1 | 7/2004 | Hunter et al. | | 2002/0049968 A1 | 4/2002 | Wilson et al. |
| 6,758,754 B1 | 7/2004 | Lavanchy et al. | | 2002/0051521 A1 | 5/2002 | Patrick |
| 6,758,755 B2 | 7/2004 | Kelly et al. | | 2002/0055833 A1 | 5/2002 | Sterling |
| 6,764,395 B1 | 7/2004 | Guyett | | 2002/0055876 A1 | 5/2002 | Gabler |
| 6,764,403 B2 | 7/2004 | Gavin | | 2002/0056107 A1 | 5/2002 | Schlack |
| 6,771,290 B1 | 8/2004 | Hoyle | | 2002/0059577 A1 | 5/2002 | Lu et al. |
| 6,783,460 B2 | 8/2004 | Galyean, III et al. | | 2002/0059590 A1 | 5/2002 | Kitsukawa et al. |
| 6,785,902 B1 | 8/2004 | Zigmond et al. | | 2002/0061778 A1 | 5/2002 | Acres |
| 6,814,663 B2 | 11/2004 | Edwards et al. | | 2002/0067730 A1 | 6/2002 | Hinderks et al. |
| 6,820,277 B1 | 11/2004 | Eldering et al. | | 2002/0069405 A1 | 6/2002 | Chapin et al. |
| 6,827,645 B2 | 12/2004 | Morita et al. | | 2002/0072965 A1 | 6/2002 | Merriman et al. |
| 6,840,861 B2 | 1/2005 | Jordan et al. | | 2002/0072966 A1 | 6/2002 | Eldering et al. |
| 6,863,612 B2 | 3/2005 | Willis | | 2002/0073235 A1 | 6/2002 | Chen et al. |
| 6,874,683 B2 | 4/2005 | Keronen et al. | | 2002/0077906 A1 | 6/2002 | Remler |
| 6,882,978 B2 | 4/2005 | Ebisawa | | 2002/0082077 A1 | 6/2002 | Johnson et al. |
| 6,890,256 B2 | 5/2005 | Walker et al. | | 2002/0082910 A1 | 6/2002 | Kontogouris |
| 6,895,170 B1 | 5/2005 | Lambert et al. | | 2002/0082913 A1 | 6/2002 | Li |
| 6,912,398 B1 | 6/2005 | Domnitz | | 2002/0082941 A1 | 6/2002 | Bird |
| 6,928,414 B1 | 8/2005 | Kim | | 2002/0083435 A1 | 6/2002 | Blasko et al. |
| 6,941,574 B1 | 9/2005 | Broadwin et al. | | 2002/0083439 A1 | 6/2002 | Eldering |
| 6,942,575 B2 | 9/2005 | Mergler | | 2002/0083441 A1 | 6/2002 | Flickinger et al. |
| 6,955,605 B2 | 10/2005 | Young et al. | | 2002/0083442 A1 | 6/2002 | Eldering |
| 6,964,608 B1 | 11/2005 | Koza | | 2002/0083443 A1 | 6/2002 | Eldering et al. |
| 6,967,566 B2 | 11/2005 | Weston et al. | | 2002/0083444 A1 | 6/2002 | Blasko et al. |
| 6,968,567 B1 | 11/2005 | Gordon et al. | | 2002/0083445 A1 | 6/2002 | Flickinger et al. |
| 6,970,834 B2 | 11/2005 | Martin et al. | | 2002/0083451 A1 | 6/2002 | Gill et al. |
| 6,970,915 B1 | 11/2005 | Partovi et al. | | 2002/0087402 A1 | 7/2002 | Zustak |
| 6,973,664 B2 | 12/2005 | Fries | | 2002/0087403 A1 | 7/2002 | Meyers et al. |
| 6,995,788 B2 | 2/2006 | James | | 2002/0087973 A1 | 7/2002 | Hamilton et al. |
| 7,072,849 B1 | 7/2006 | Filepp et al. | | 2002/0087975 A1 | 7/2002 | Schlack |
| 7,086,187 B2 | 8/2006 | Bandak | | 2002/0087980 A1 | 7/2002 | Eldering et al. |
| 2001/0011226 A1 | 8/2001 | Greer et al. | | 2002/0094868 A1 | 7/2002 | Tuck et al. |
| 2001/0013009 A1 | 8/2001 | Greening et al. | | 2002/0095676 A1 | 7/2002 | Knee et al. |
| 2001/0014915 A1 | 8/2001 | Blumenau | | 2002/0098891 A1 | 7/2002 | Graham et al. |
| 2001/0025245 A1 | 9/2001 | Flickinger et al. | | 2002/0099600 A1 | 7/2002 | Merriman et al. |
| 2001/0025254 A1 | 9/2001 | Park | | 2002/0099611 A1 | 7/2002 | De Souza et al. |
| 2001/0025274 A1 | 9/2001 | Zehr et al. | | 2002/0099653 A1 | 7/2002 | De Souza et al. |
| 2001/0027412 A1 | 10/2001 | Son | | 2002/0100040 A1 | 7/2002 | Bull |
| 2001/0032125 A1 | 10/2001 | Bhan et al. | | 2002/0107073 A1 | 8/2002 | Binney |
| 2001/0032132 A1 | 10/2001 | Moran | | 2002/0107075 A1 | 8/2002 | Stephan |
| 2001/0032133 A1 | 10/2001 | Moran | | 2002/0107730 A1 | 8/2002 | Bernstein |
| 2001/0032137 A1 | 10/2001 | Bennett et al. | | 2002/0109680 A1 | 8/2002 | Orbanes et al. |

| Publication No. | Date | Inventor |
|---|---|---|
| 2002/0111154 A1 | 8/2002 | Eldering et al. |
| 2002/0111172 A1 | 8/2002 | De Wolf et al. |
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Basco et al. |
| 2002/0112249 A1 | 8/2002 | Hendricks et al. |
| 2002/0112250 A1 | 8/2002 | Koplar et al. |
| 2002/0116284 A1 | 8/2002 | Steelman et al. |
| 2002/0120589 A1 | 8/2002 | Aoki |
| 2002/0123928 A1 | 9/2002 | Eldering et al. |
| 2002/0129368 A1 | 9/2002 | Schlack et al. |
| 2002/0133398 A1 | 9/2002 | Geller et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0161625 A1 | 10/2002 | Brito-Valladares et al. |
| 2002/0161639 A1 | 10/2002 | Goldstein |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach, III |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2003/0004810 A1 | 1/2003 | Eldering |
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi et al. |
| 2003/0048293 A1 | 3/2003 | Werkhoven |
| 2003/0054888 A1 | 3/2003 | Walker et al. |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1 | 6/2003 | Klayh |
| 2003/0104867 A1 | 6/2003 | Kobayashi et al. |
| 2003/0110171 A1 | 6/2003 | Ozer et al. |
| 2003/0115074 A1 | 6/2003 | Freeman et al. |
| 2003/0115318 A1 | 6/2003 | Wueste |
| 2003/0115587 A1 | 6/2003 | Kendall et al. |
| 2003/0126150 A1 | 7/2003 | Chan |
| 2003/0139966 A1 | 7/2003 | Sirota et al. |
| 2003/0144044 A1 | 7/2003 | Piarsky |
| 2003/0144048 A1 | 7/2003 | Silva |
| 2003/0149618 A1 | 8/2003 | Sender et al. |
| 2003/0149623 A1 | 8/2003 | Chen |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172376 A1 | 9/2003 | Coffin, III |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0212608 A1 | 11/2003 | Cliff |
| 2003/0216961 A1 | 11/2003 | Barry |
| 2003/0226141 A1 | 12/2003 | Krasnow et al. |
| 2003/0226142 A1 | 12/2003 | Rand |
| 2003/0229893 A1 | 12/2003 | Sgaraglino |
| 2004/0002380 A1 | 1/2004 | Brosnan et al. |
| 2004/0003396 A1 | 1/2004 | Babu |
| 2004/0014454 A1 | 1/2004 | Burgess et al. |
| 2004/0015397 A1 | 1/2004 | Barry et al. |
| 2004/0015608 A1* | 1/2004 | Ellis et al. ............... 709/246 |
| 2004/0019521 A1 | 1/2004 | Birmingham |
| 2004/0025174 A1 | 2/2004 | Cerrato |
| 2004/0030595 A1 | 2/2004 | Park |
| 2004/0034686 A1 | 2/2004 | Guthrie |
| 2004/0039648 A1 | 2/2004 | Candelore et al. |
| 2004/0039796 A1 | 2/2004 | Watkins |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicolas et al. |
| 2004/0059625 A1 | 3/2004 | Schrader |
| 2004/0068552 A1 | 4/2004 | Kotz et al. |
| 2004/0073482 A1 | 4/2004 | Wiggins et al. |
| 2004/0078263 A1 | 4/2004 | Altieri |
| 2004/0078266 A1 | 4/2004 | Kim |
| 2004/0078292 A1 | 4/2004 | Blumenau |
| 2004/0078809 A1 | 4/2004 | Drazin |
| 2004/0083133 A1 | 4/2004 | Nicholas et al. |
| 2004/0102248 A1 | 5/2004 | Young et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133480 A1 | 7/2004 | Domes |
| 2004/0133518 A1 | 7/2004 | Dryall |
| 2004/0137980 A1 | 7/2004 | Aenlle |
| 2004/0139465 A1 | 7/2004 | Matthews, III et al. |

| | | | | | |
|---|---|---|---|---|---|
| 2004/0140352 A1 | 7/2004 | Walker et al. | 2005/0021403 A1 | 1/2005 | Ozer et al. |
| 2004/0143478 A1 | 7/2004 | Ward | 2005/0021465 A1 | 1/2005 | Segerstrom |
| 2004/0143495 A1 | 7/2004 | Koenig | 2005/0021853 A1 | 1/2005 | Parekh et al. |
| 2004/0148221 A1 | 7/2004 | Chu | 2005/0027587 A1 | 2/2005 | Latona et al. |
| 2004/0148424 A1 | 7/2004 | Berkson et al. | 2005/0027595 A1 | 2/2005 | Ha et al. |
| 2004/0148625 A1 | 7/2004 | Eldering et al. | 2005/0027699 A1 | 2/2005 | Awadallah et al. |
| 2004/0152517 A1 | 8/2004 | Hardisty et al. | 2005/0028188 A1 | 2/2005 | Latona et al. |
| 2004/0152518 A1 | 8/2004 | Kogo | 2005/0028195 A1 | 2/2005 | Feinleib et al. |
| 2004/0153360 A1 | 8/2004 | Schumann | 2005/0032577 A1 | 2/2005 | Blackburn et al. |
| 2004/0153363 A1 | 8/2004 | Stehling | 2005/0033700 A1 | 2/2005 | Vogler et al. |
| 2004/0153385 A1 | 8/2004 | Allibhoy et al. | 2005/0038702 A1 | 2/2005 | Merriman et al. |
| 2004/0153453 A1 | 8/2004 | Brodie et al. | 2005/0050070 A1 | 3/2005 | Sheldon |
| 2004/0158858 A1 | 8/2004 | Paxton | 2005/0055725 A1 | 3/2005 | Stewart |
| 2004/0162758 A1 | 8/2004 | Willis | 2005/0075155 A1 | 4/2005 | Sitrick |
| 2004/0162759 A1 | 8/2004 | Willis | 2005/0075172 A1 | 4/2005 | Coleman |
| 2004/0163101 A1 | 8/2004 | Swix et al. | 2005/0076051 A1 | 4/2005 | Carobus et al. |
| 2004/0163134 A1 | 8/2004 | Willis | 2005/0091108 A1 | 4/2005 | Frost |
| 2004/0168202 A1 | 8/2004 | Ebihara | 2005/0091111 A1 | 4/2005 | Green et al. |
| 2004/0169678 A1 | 9/2004 | Oliver | 2005/0096975 A1 | 5/2005 | Moshe |
| 2004/0172324 A1 | 9/2004 | Merriman et al. | 2005/0096983 A1 | 5/2005 | Werkhoven |
| 2004/0172331 A1 | 9/2004 | Merriman et al. | 2005/0097622 A1 | 5/2005 | Zigmond et al. |
| 2004/0172332 A1 | 9/2004 | Merriman et al. | 2005/0101386 A1 | 5/2005 | Lavanchy et al. |
| 2004/0172343 A1 | 9/2004 | Allibhoy et al. | 2005/0102177 A1 | 5/2005 | Takayama |
| 2004/0176170 A1 | 9/2004 | Eck et al. | 2005/0107158 A1 | 5/2005 | Kanisawa et al. |
| 2004/0176995 A1 | 9/2004 | Fusz | 2005/0113170 A1 | 5/2005 | McHugh |
| 2004/0177001 A1 | 9/2004 | Salinas | 2005/0114526 A1 | 5/2005 | Aoyama |
| 2004/0181808 A1 | 9/2004 | Schaefer et al. | 2005/0130725 A1 | 6/2005 | Creamer et al. |
| 2004/0186766 A1 | 9/2004 | Fellenstein et al. | 2005/0143174 A1 | 6/2005 | Goldman et al. |
| 2004/0186771 A1 | 9/2004 | Squires | 2005/0144063 A1 | 6/2005 | Spector |
| 2004/0193488 A1 | 9/2004 | Khoo et al. | 2005/0144073 A1 | 6/2005 | Morrisroe et al. |
| 2004/0194123 A1 | 9/2004 | Fredlund et al. | 2005/0149396 A1 | 7/2005 | Horowitz et al. |
| 2004/0194128 A1 | 9/2004 | McIntyre et al. | 2005/0153760 A1 | 7/2005 | Varley |
| 2004/0201629 A1 | 10/2004 | Bates et al. | 2005/0154640 A1 | 7/2005 | Kolluri et al. |
| 2004/0204238 A1 | 10/2004 | Aoki | 2005/0154717 A1 | 7/2005 | Watson et al. |
| 2004/0204247 A1 | 10/2004 | Walker et al. | 2005/0155056 A1 | 7/2005 | Knee et al. |
| 2004/0205157 A1 | 10/2004 | Bibelnieks et al. | 2005/0155083 A1 | 7/2005 | Oh et al. |
| 2004/0205508 A1 | 10/2004 | Wecker et al. | 2005/0160442 A1 | 7/2005 | Kaplowitz |
| 2004/0205807 A1 | 10/2004 | Wilcoxson et al. | 2005/0164757 A1 | 7/2005 | Ebisawa |
| 2004/0210472 A1 | 10/2004 | Lew et al. | 2005/0165640 A1 | 7/2005 | Kotorov |
| 2004/0210489 A1 | 10/2004 | Jackson et al. | 2005/0165644 A1 | 7/2005 | Beyda et al. |
| 2004/0210661 A1 | 10/2004 | Thompson | 2005/0171865 A1 | 8/2005 | Beardow |
| 2004/0210824 A1 | 10/2004 | Shoff et al. | 2005/0177413 A1 | 8/2005 | Blumberg et al. |
| 2004/0219977 A1 | 11/2004 | Ebisawa | 2005/0177430 A1 | 8/2005 | Willis |
| 2004/0220850 A1 | 11/2004 | Ferrer et al. | 2005/0177431 A1 | 8/2005 | Willis et al. |
| 2004/0221018 A1 | 11/2004 | Ji | 2005/0177461 A1 | 8/2005 | Rosefelt et al. |
| 2004/0224772 A1 | 11/2004 | Canessa et al. | 2005/0178940 A1 | 8/2005 | Granick |
| 2004/0225562 A1 | 11/2004 | Turner | 2005/0179685 A1 | 8/2005 | Kake et al. |
| 2004/0225715 A1 | 11/2004 | Gottfried | 2005/0182693 A1 | 8/2005 | Alivandi |
| 2004/0230593 A1 | 11/2004 | Rudin et al. | 2005/0182737 A1 | 8/2005 | Brown |
| 2004/0230994 A1 | 11/2004 | Urdang et al. | 2005/0185825 A1 | 8/2005 | Hoshino et al. |
| 2004/0234932 A1 | 11/2004 | Hughes et al. | 2005/0192071 A1 | 9/2005 | Matsuno et al. |
| 2004/0236585 A1 | 11/2004 | Kohnke et al. | 2005/0192864 A1 | 9/2005 | Ganz |
| 2004/0243455 A1 | 12/2004 | Smith | 2005/0193411 A1 | 9/2005 | Funston |
| 2004/0243466 A1 | 12/2004 | Trzybinski et al. | 2005/0193425 A1 | 9/2005 | Sull et al. |
| 2004/0243470 A1 | 12/2004 | Ozer et al. | 2005/0195157 A1 | 9/2005 | Kramer et al. |
| 2004/0243623 A1 | 12/2004 | Ozer et al. | 2005/0203804 A1 | 9/2005 | Suzuki et al. |
| 2004/0248649 A1 | 12/2004 | Arai et al. | 2005/0203811 A1 | 9/2005 | David |
| 2004/0249786 A1 | 12/2004 | Dabney et al. | 2005/0204381 A1 | 9/2005 | Ludvig et al. |
| 2004/0252051 A1 | 12/2004 | Johnson | 2005/0216346 A1 | 9/2005 | Kusumoto et al. |
| 2004/0254831 A1 | 12/2004 | Dean | 2005/0216348 A1 | 9/2005 | Martin et al. |
| 2004/0254957 A1 | 12/2004 | Hyotyniemi et al. | 2005/0216581 A1 | 9/2005 | Blumenau et al. |
| 2004/0255148 A1 | 12/2004 | Monteiro et al. | 2005/0222908 A1 | 10/2005 | Altberg et al. |
| 2004/0259553 A1 | 12/2004 | Delaney et al. | 2005/0227749 A1 | 10/2005 | Bender et al. |
| 2004/0260609 A1 | 12/2004 | Loeb et al. | 2005/0228797 A1 | 10/2005 | Koningstein et al. |
| 2004/0261125 A1 | 12/2004 | Ellis et al. | 2005/0235030 A1 | 10/2005 | Lauckhart et al. |
| 2004/0266535 A1 | 12/2004 | Reeves | 2005/0235199 A1 | 10/2005 | Adams |
| 2004/0266537 A1 | 12/2004 | Morris | 2005/0235310 A1 | 10/2005 | Bies |
| 2004/0267611 A1 | 12/2004 | Hoerenz | 2005/0235318 A1 | 10/2005 | Grauch et al. |
| 2005/0005242 A1 | 1/2005 | Hoyle | 2005/0240476 A1 | 10/2005 | Bigott |
| 2005/0015267 A1 | 1/2005 | Barringer et al. | 2005/0246736 A1 | 11/2005 | Beyda et al. |
| 2005/0021387 A1 | 1/2005 | Gottfurcht | 2005/0247769 A1 | 11/2005 | Potter et al. |
| 2005/0021396 A1 | 1/2005 | Pearch et al. | 2005/0251539 A1 | 11/2005 | Parekh et al. |
| 2005/0021397 A1 | 1/2005 | Cui et al. | 2005/0256768 A1 | 11/2005 | Robinson |

| | | |
|---|---|---|
| 2005/0261062 A1 | 11/2005 | Lewin et al. |
| 2005/0261962 A1 | 11/2005 | Chuah |
| 2005/0266906 A1 | 12/2005 | Stevens |
| 2005/0266907 A1 | 12/2005 | Weston et al. |
| 2005/0270537 A1 | 12/2005 | Mian et al. |
| 2005/0283395 A1 | 12/2005 | Lesandrini et al. |
| 2005/0283401 A1 | 12/2005 | Swix et al. |
| 2005/0288999 A1 | 12/2005 | Lerner et al. |
| 2006/0167747 A1 | 7/2006 | Goodman |
| 2006/0230141 A1 | 10/2006 | Willis |
| 2006/0248209 A1 | 11/2006 | Chiu |
| 2007/0078714 A1 | 4/2007 | Ott |
| 2007/0174471 A1 | 7/2007 | Van Rossum |
| 2008/0097872 A1 | 4/2008 | Peckover |
| 2009/0183081 A1 | 7/2009 | Rodriguez |

FOREIGN PATENT DOCUMENTS

| | | |
|---|---|---|
| EP | 0 337 539 A2 | 10/1989 |
| EP | 0 620 688 A2 | 10/1994 |
| GB | 2 141 907 A | 1/1985 |
| GB | 2 194 369 A | 3/1988 |
| WO | WO 93/14462 A1 | 7/1993 |
| WO | WO 93/19427 A1 | 9/1993 |
| WO | WO 93/22017 A1 | 11/1993 |
| WO | WO 95/12442 A1 | 5/1995 |
| WO | WO 9959097 A1 * | 11/1999 |
| WO | WO 03/032127 A2 | 4/2003 |
| WO | WO 2005/086969 A2 | 9/2005 |

* cited by examiner

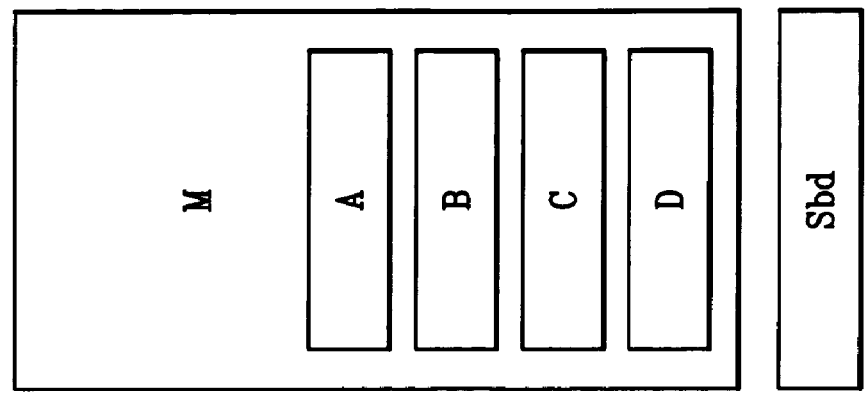
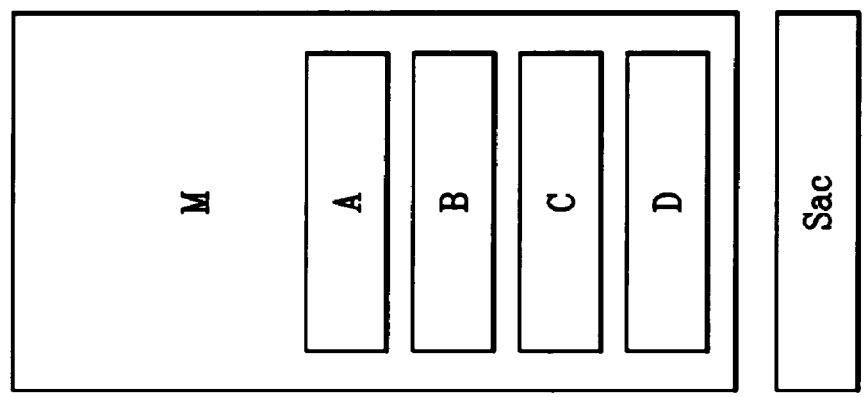

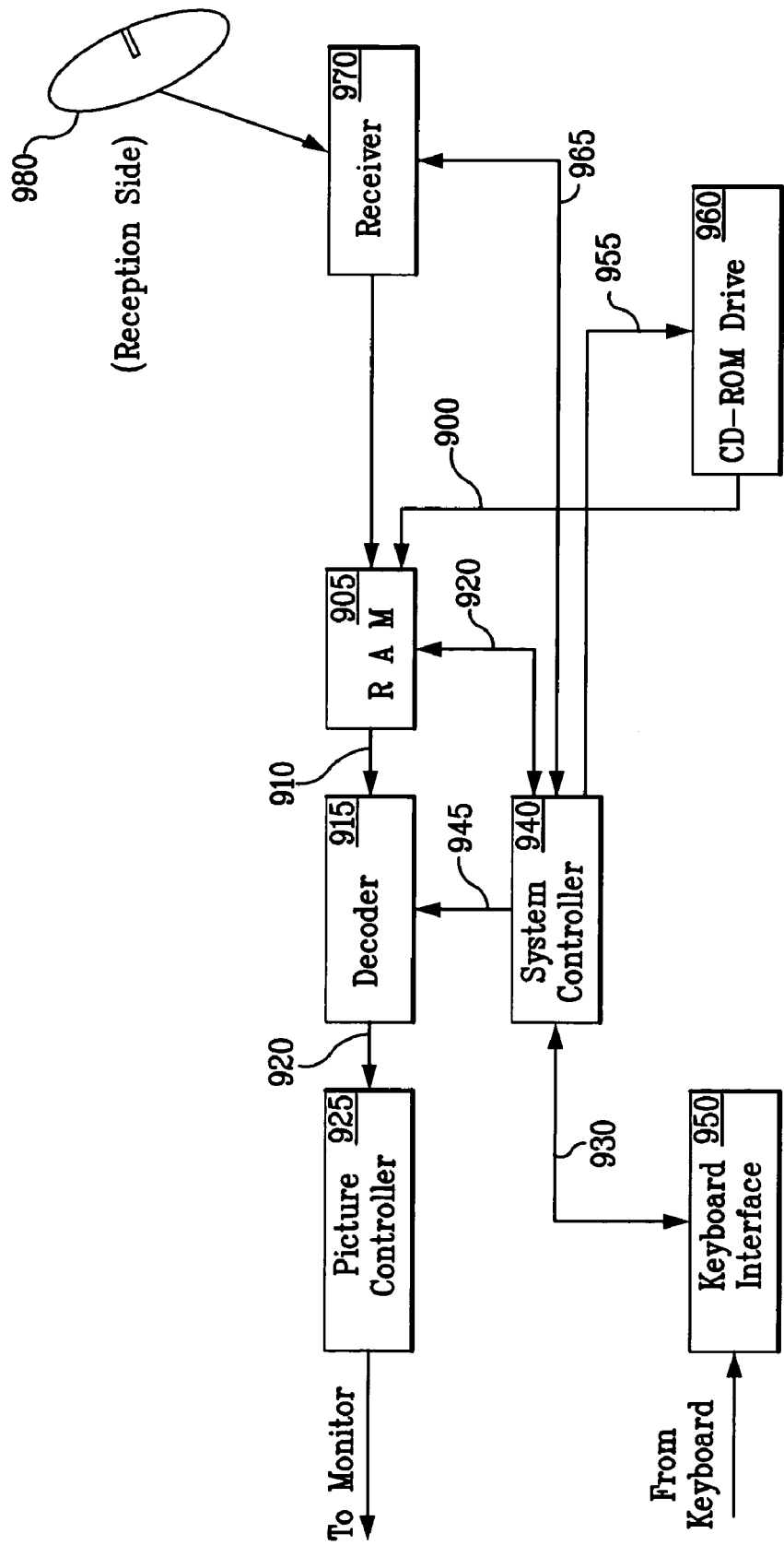

FIG. 10A

Channel G

| Software Identification Data (J) |
|---|
| Advertising Data (J-1) |
| Advertising Data (J-2) |
| Software Identification Data (K) |
| Advertising Data (K-1) |
| Advertising Data (K-2) |
| Advertising Data (K-3) |
| Software Identification Data (J) |
| Advertising Data (J-1) |

Time Lapse →

FIG. 10B

Channel H

| Software Identification Data (P) |
|---|
| Advertising Data (P-1) |
| Software Identification Data (Q) |
| Advertising Data (Q-1) |
| Software Identification Data (R) |
| Advertising Data (R-1) |
| Advertising Data (R-2) |
| Advertising Data (R-3) |
| Software Identification Data (P) |
| Advertising Data (P-1) |

Time Lapse →

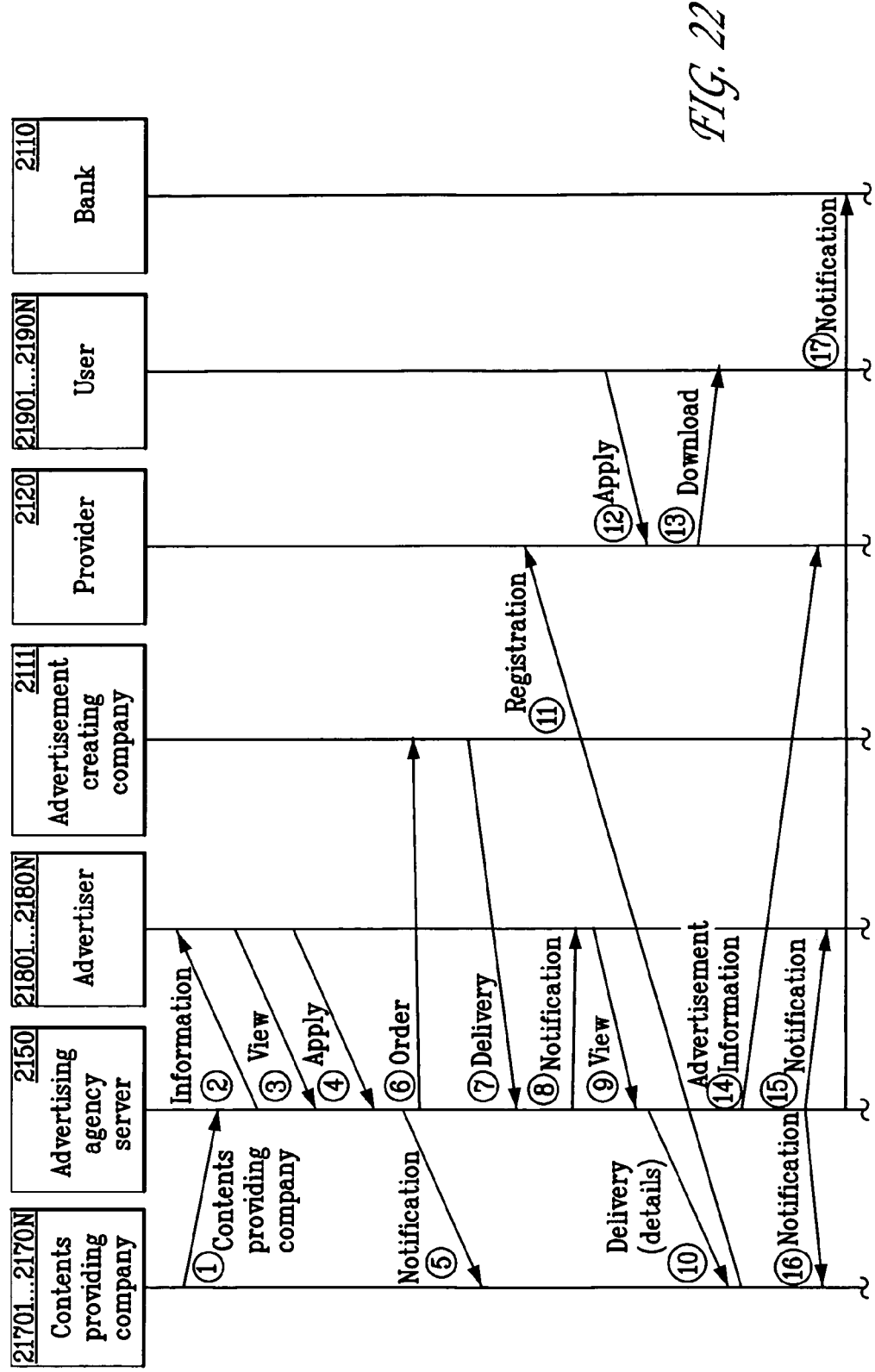

ADVERTISEMENT INSERTION, PROFILING, IMPRESSION, AND FEEDBACK

CROSS-REFERENCE TO RELATED APPLICATIONS

The present application is a continuation-in-part and claims the priority benefit of U.S. patent application Ser. No. 11/085,675 filed Mar. 21, 2005 now U.S. Pat. No. 7,085,733 and entitled "Apparatus and Method for Executing a Game Program Having Advertisements Therein," which is a continuation and claims the priority benefit of U.S. patent application Ser. No. 10/007,522 filed Dec. 6, 2001 and now U.S. Pat. No. 6,882,978, which is a continuation and claims the priority benefit of U.S. patent application Ser. No. 09/384,894 filed Aug. 27, 1999 and now abandoned, which is a continuation and claims the priority benefit of U.S. patent application Ser. No. 08/672,116 filed Jun. 27, 1996 and now U.S. Pat. No. 5,946,664, which claims the foreign priority benefit of Japanese patent application number 7-166682 filed Jun. 30, 1995; the present application is also a continuation-in-part and claims the priority benefit of U.S. patent application Ser. No. 09/452,811 filed Dec. 2, 1999 U.S. Pat. No. 7,047,302 and entitled "Method and System for Enabling Optional Customer Election of Auxiliary Content Provided on Detachable Local Storage Media"; the present application is also a continuation-in-part and claims the priority benefit of U.S. patent application Ser. No. 09/771,751 filed Jan. 29, 2001 now U.S. Pat. No. 7,171,480 and entitled "Method and System for Providing Auxiliary Content Located on Local Storage During Download/Access of Primary Content Over a Network"; the present application is also a continuation-in-part and claims the priority benefit of U.S. patent application Ser. No. 09/780,995 filed Feb. 9, 2001 now U.S. Pat. No. 7,761,328 and entitled "In-Contents Advertising Method, In-Contents Advertising Server, and Program-Transferring Medium for Realizing In-Contents Advertising," which claims the foreign priority benefit of Japanese patent application number 2000-375096 filed Dec. 18, 2000 and Japanese patent application number 2000-241861 filed Jul. 4, 2000; the present application is also a continuation-in-part and claims the priority benefit of U.S. patent application Ser. No. 11/241,229 filed Sep. 30, 2005 and entitled "Advertising Impression Determination." The disclosure of all of these applications is incorporated herein by reference.

The present application is also related to U.S. Pat. No. 6,539,544 and entitled "Game Machine System, Broadcasting System, Data Distribution System, and Method, Program Executing Apparatus and Method." The disclosure of this patent is also incorporated by reference.

BACKGROUND OF THE INVENTION

Apparatus and Method for Executing a Game Program Having Advertisements

The present invention relates to executing a game program having advertisements therein and, more particularly, to apparatus and methods for executing a game program in which advertisements can be updated by downloading new advertisement data.

Enabling Optional Customer Election of Auxiliary Content

The present invention further relates to systems for engaging in interactive entertainment or for accessing non-interactive entertainment using a networked game console connected to a content provider over a bi-directional network, and more specifically to maintenance and accessing of customer and content databases which support such systems, for enabling playback of both valuable primary content along with auxiliary content such as targeted advertisements.

Providing Auxiliary Content Located on Local Storage During Download/Access of Primary Content Over a Network The present invention further relates to systems and methods for providing auxiliary content located on local storage to a client connected to a primary content provider over a bi-directional network, and more specifically to accessing auxiliary content during download/access of primary content over the network, enabling dissemination of auxiliary content during otherwise dormant wait periods.

In-Contents Advertising Method

The present invention also relates to an in-contents advertising method, an in-contents advertising server, and a program-transferring medium for realizing in-contents advertising, suitable for displaying advertisements of advertisers in contents such as games. More specifically, the present invention obtains advertisement information appropriated beforehand to contents, at the time of activation of the contents, and inserts the advertisement information in the contents, based on commissioning from advertisers, and information contained within contents indicating that advertisements may be inserted, thereby enabling advertising within the contents.

Advertising Impression Determination

The present invention also relates to targeted advertising, such as an advertising system and method for dynamically displaying advertisements in the context of video games (i.e., in-game advertising). More specifically, the present invention provides for the determination and tracking of advertising impressions in response to users interacting with video games having in-game advertising functionality.

SUMMARY OF THE INVENTION

Apparatus and Method for Executing a Game Program Having Advertisements

In one embodiment of the present invention, apparatus and method for executing a game program having advertisements therein are provided. Apparatus and methods are also provided for execution of a game program containing advertisements, which are subject to modification. Certain limitations may be placed on the execution of a game program, in some embodiments, if advertisement information has not been updated.

In accordance with one embodiment of the present invention, various apparatus and methods operate to store a game program in a memory, receive (e.g., download via a transmission line) at predetermined times (e.g., on each new day or each time the game program is executed, or each time the game system is turned on) advertising data that relates to at least one advertisement, store the received advertising data in the memory, execute the game program stored in the memory, and output display data, which corresponds to the advertisement data stored in the memory in accordance with the game program. Some embodiments of the present invention include a game program received with advertising data ready for execution.

In additional embodiments of the present invention, a game identification code, which identifies the game program to be executed, is transmitted to a game service provider, and advertising data that corresponds to the game program identified by the game identification code is received from the game service provider.

In the various embodiments of the present invention, a plurality of advertising data corresponding to a plurality of game programs are received (e.g., via a satellite transmission), and display data which correspond to advertisement data of the executed game program is output during the execution thereof.

In accordance with another embodiment of the present invention, apparatus and methods operate to store a game program and advertising data that relates to a plurality of advertisements in a memory, receive at predetermined times advertising selection data that identifies selected advertisements stored in the memory, execute the game program stored in the memory, and output display data which corresponds to the selected advertisements as identified in the advertising selection data at respective times in accordance with the game program.

Enabling Optional Customer Election of Auxiliary Content

An embodiment of the present invention provides a system and method whereby advertisements are made available to customers via a detachable local storage medium, such as a DVD or CD-ROM disc, which is intended to be inserted into a game console connected via a bi-directional network to a specified content provider, wherein the game console includes a control function for enabling the auxiliary content such as advertisements to be viewed, at the option of the customer, while the customer accesses valuable media content from a primary content database maintained solely by the content provider.

Additional embodiments of the present invention provide a system and method as described above, wherein viewing of auxiliary data such as advertisements can be disabled by a control function of the game console at any time prior to download or during playback of the primary media data.

Still further embodiments provide a system and method as described above, wherein a record is maintained of times and durations for which a customer has elected to view auxiliary content along with viewing of valuable media content, wherein an auxiliary content viewing record is subsequently uploaded to the server station maintained by the content provider and can be used as a basis for assessing advertising fees to an advertiser, as well as updating of the customer database.

A further embodiment of the present invention provides a system and method as described above, wherein a customer database is maintained in the server station, containing identifying information of users who access the server station, wherein such identifying information is capable of being downloaded into the game console in order to enable only auxiliary content which is customized based on a user's identification profile to be loaded and viewed.

Additional embodiments provide key data, which may include a media or customer identifier and an authentication code, on the detachable local storage medium on the client side of the system, whereby the key data is used to authenticate access to a specified server station which provides primary media content, and whereby such primary media content cannot be accessed unless the local storage medium is inserted into the game console.

As a result of the above described embodiments, improvements over known advertisement methods can be achieved. As an advertisement medium, by use of a local storage medium such as CD-ROM or DVD, there is no need as in the prior art for advertisers to expend costs for maintenance of a large scale advertisement database on the server side of the system. Therefore, advertisers are afforded great flexibility in preparing their own advertising content on relatively low cost packaged media, where at the same time advertisers can associate their auxiliary content with specified valuable media content downloadable from a main content provider.

Additionally, the cost and time associated with downloading of large volume auxiliary data are avoided. Because the cost of packaged media such as CD-ROM or DVD is relatively low, advertisers have the advantage of being able to easily distribute such media as inserts in magazines and the like. In addition, because of their ability to hold large scale data, such detachable packaged media have the ability to handle multi-colored animation or lengthy playing of auxiliary content which is highly suitable for advertisements.

A significant advantage of the present invention is the ability for advertisers to associate their auxiliary content with specified highly popular and valuable primary media content such as feature movies, interactive games, popular utility programs and the like, which are downloaded from the main content server. That is, merely by contracting with and following a prescribed format determined by the primary media content provider, advertisers are then able to easily manufacture their own advertisement containing CD-ROM or DVD media discs which are easily distributed to customers. Because of their association with popular and valuable primary media content, customers become highly motivated to use such CD-ROM or DVD media as a means for gaining access to the primary media content.

Providing Auxiliary Content Located on Local Storage During Download/Access of Primary Content Over a Network An embodiment of the present invention provides a system and computer-based method for providing auxiliary content located on local storage to a client connected to a primary content provider over a network, particularly during transfer of primary content via a server dedicated to download operations. Control over the auxiliary content, primary content and/or the download management server is exercised by a distributor.

The exemplary system includes the download management server, a customer database and a primary content database on the server side, and a client console including a local storage device containing the auxiliary content on the client side. The auxiliary content provided can be varied based on one or more user preferences, one or more distributor preferences, or a combination of both user and distributor preference information With respect to user preferences, either previously acquired information is used or the user is prompted to chose from a selection of specific content items and categories of content; default content is provided if no user preferences are available/selected.

With respect to exemplary distributor preferences, the download management server sends the user auxiliary content assignment data before sending the requested primary content; according to the data, the client computer executes the appropriate auxiliary content stored in the local storage. The auxiliary content is stored in the local storage prior to download of the primary content from the download management server, though the user can acquire the local storage and/or auxiliary content by a variety of means (e.g., the auxiliary content can be provided on a CD-ROM, sent to a client hard drive over the network, etc.).

An embodiment of the present invention provides a system and method whereby advertisements or auxiliary content are made available to customers via removable local storage, such as a DVD or CD-ROM disc, which is intended to be inserted into a client console connected via a bi-directional network to a specified content provider, wherein the client console includes a control function for enabling the auxiliary content such as advertisements to be viewed, at the option of the customer, while the customer accesses valuable content from a primary content database maintained solely by the content provider.

An additional embodiment of the present invention provides a system and method as described above, wherein a customer database is maintained in the server station, containing identifying information of users who access the server station, wherein such identifying information is capable of being downloaded into the client console in order to enable only auxiliary content which is customized based on a user's identification profile to be loaded and viewed.

A still further embodiment of the present invention provides key data, which may include a local storage device identifier or customer identifier and an authentication code, on removable local storage on the client side of the system, whereby the key data is used to authenticate access to a specified server station which provides primary content, and whereby such primary content cannot be accessed unless the local storage is inserted into the client console.

As a result of the above-described objects of the invention, improvements over known advertisement methods can be achieved As an advertisement medium, by use of local storage such as CD-ROM or DVD, there is no need as in the prior art for advertisers to expend costs for maintenance of a large-scale advertisement database on the server side of the system. Therefore, advertisers are afforded great flexibility in preparing their own advertising content on relatively low cost packaged storage media, where at the same time advertisers can associate their auxiliary content with specified valuable primary content downloadable from a main primary content provider.

Furthermore, the cost and time associated with downloading of large-volume auxiliary data can be avoided. Because the cost of packaged storage media such as CD-ROM or DVD is relatively low, advertisers have the advantage of being able to easily distribute such devices as inserts in magazines and the like. In addition, because of their ability to hold large amounts of data, such removable packaged storage media have the ability to handle multicolored animation or other lengthy auxiliary content, which is highly suitable for advertisements.

A significant advantage of the present invention is the ability for content providers to associate their auxiliary content with specified highly popular and valuable primary content such as feature movies, interactive games, popular utility programs and the like, which are downloaded from the main content server. That is, merely by contracting with and following a prescribed format determined by the primary content provider, advertisers are then able to easily manufacture their own advertisement containing CD-ROM or DVD discs which are easily distributed to customers. Because of their association with popular and valuable primary content, customers become highly motivated to use CD-ROM or DVD as a means for gaining access to the primary content.

In-Contents Advertising Method

An embodiment of the disclosed in-contents advertising method according to the present invention includes advertisement information provided beforehand in contents, based on information contained within contents indicating that advertisements may be inserted within the contents.

Additionally, an embodiment of the exemplary in-contents advertising server according to the present invention inserts advertisement information in contents, based on specifications of the advertiser, and information contained within contents indicating that advertisements may be inserted.

The exemplary program transferring medium according to an embodiment of the present invention is for realizing in-contents advertisements by obtaining advertisement information appropriated beforehand to the contents, at the time of activation of the contents, and inserting the advertisement information in the contents, based on information contained within contents indicating that advertisements may be inserted.

An exemplary digital contents distribution system according to an embodiment of the present invention for realizing in-contents advertisements comprises: a digital contents distribution system comprising a first server storing a plurality of digital contents to be provided; an advertisement information providing system comprising a database storing advertisement information which is to be set in advertisement areas in the digital contents; and a plurality of user terminal devices; wherein, in response to download requests for specific digital contents from the users, the digital contents distribution system receives advertisement information corresponding to the specific digital contents from the database of the advertisement information providing system, and subsequently distributes the specific digital contents to the user.

An embodiment of the digital contents distribution system for realizing in-contents advertisements according to an embodiment of the present invention comprises: a digital contents distribution system comprising a first server storing a plurality of digital contents to be provided; an advertisement information providing system comprising a database storing advertisement information which is to be set in advertisement areas in the digital contents; and a plurality of user terminal devices; wherein, in response to download requests for specific digital contents from the users, the digital contents distribution system distributes the specific digital contents to the user; and wherein the advertisement information providing system transmits advertisement information corresponding to the specific digital contents from the database, to the user.

Certain embodiments of the presently digital contents distribution system according to the present invention may configure a network of the digital contents distribution system comprising the first server, the advertisement information providing system comprising the database, and the plurality of user terminal devices, using one, or two or more, of the following means: cable television, broad-band wireless network, and optical fiber network.

An embodiment of the digital contents distribution system according to the present invention may further comprise means for recording the transmission state of the advertisement information, with advertising fees being calculated based on the recording results, and may further comprise a contents providing system for creating contents and providing the contents to the digital contents providing system, and an advertisement creating system for creating advertisement information and providing the advertisement information to the advertisement information providing system.

Some embodiments of the digital contents distribution system may further comprise a banking system, wherein the advertisement information providing system comprises means for recording the transmission state of the advertisement information, with advertising fees being calculated based on the recording results, and the advertiser is billed for the advertising fees from the bank.

The exemplary advertisement information providing system may provide the advertisement creating system with advertisement structure information containing at least portions and times regarding which advertisement insertion can be made, and the advertisement creating system may provide the advertisement information creating system with advertisement information created based on the advertisement structure information and specified information from the advertiser.

Exemplary digital contents data may contain advertisement programs, with the advertisement information being set into the digital contents by the advertisement programs. Additionally, an exemplary digital contents providing system according to the present invention comprises a plurality of servers storing digital contents, wherein the digital contents providing system configures an advertisement information providing system having a database storing advertisement information to be set into advertising areas within the digital contents, and a network, and wherein, in response to download requests for digital contents from the users, the digital contents distribution system receives corresponding advertisement information from the database, and distributes the advertisement information along with the requested digital contents.

Advertising Impression Determination

An embodiment of the present invention may be configured to provide a system and method for deploying and tracking advertisements across a video game network. Embodiments of the present invention may also be configured to provide a method for determining an impression area in a video game environment relative an advertisement in the environment.

An embodiment of the present invention may be configured to provide a method for identifying an obstruction in the impression area and redefining the impression area based on the presence of the obstruction. An embodiment of the present invention may also be configured to provide a method for verifying an advertising impression in a video game environment when a video game character is present in an impression area with an unobstructed view of a related advertisement.

An embodiment of the present invention may be configured to further provide a method for determining the time a video game character is present in an impression area with an unobstructed view of an advertisement. An embodiment of the present invention may also be configured to provide a system for determining when an advertising impression has been made in a video game environment.

An embodiment of the present invention may be configured to provide a system for processing a payment based on the presence of a video game character in an impression area in a video game environment. An embodiment of the present invention may also be configured to allow advertisers to identify popular games and/or effective advertisements to allow for the establishment of proper pricing models, receive feedback on their products, market to various segments and deploy custom programming relating to advertising campaigns in an adaptable in-game advertising network.

BRIEF DESCRIPTION OF THE DRAWINGS

Apparatus and Method for Executing a Game Program Having Advertisements

FIGS. 5A and 5B schematically illustrate the data structure of a game program stored in the game system in accordance with another embodiment of the present invention;

FIG. 9 is a block diagram of the game system in accordance with a further embodiment of the present invention;

FIGS. 10A and 10B are schematic diagrams of the data structure of game data received by the game system shown in FIG. 9;

Enabling Optional Customer Election of Auxiliary Content

Figure 12:
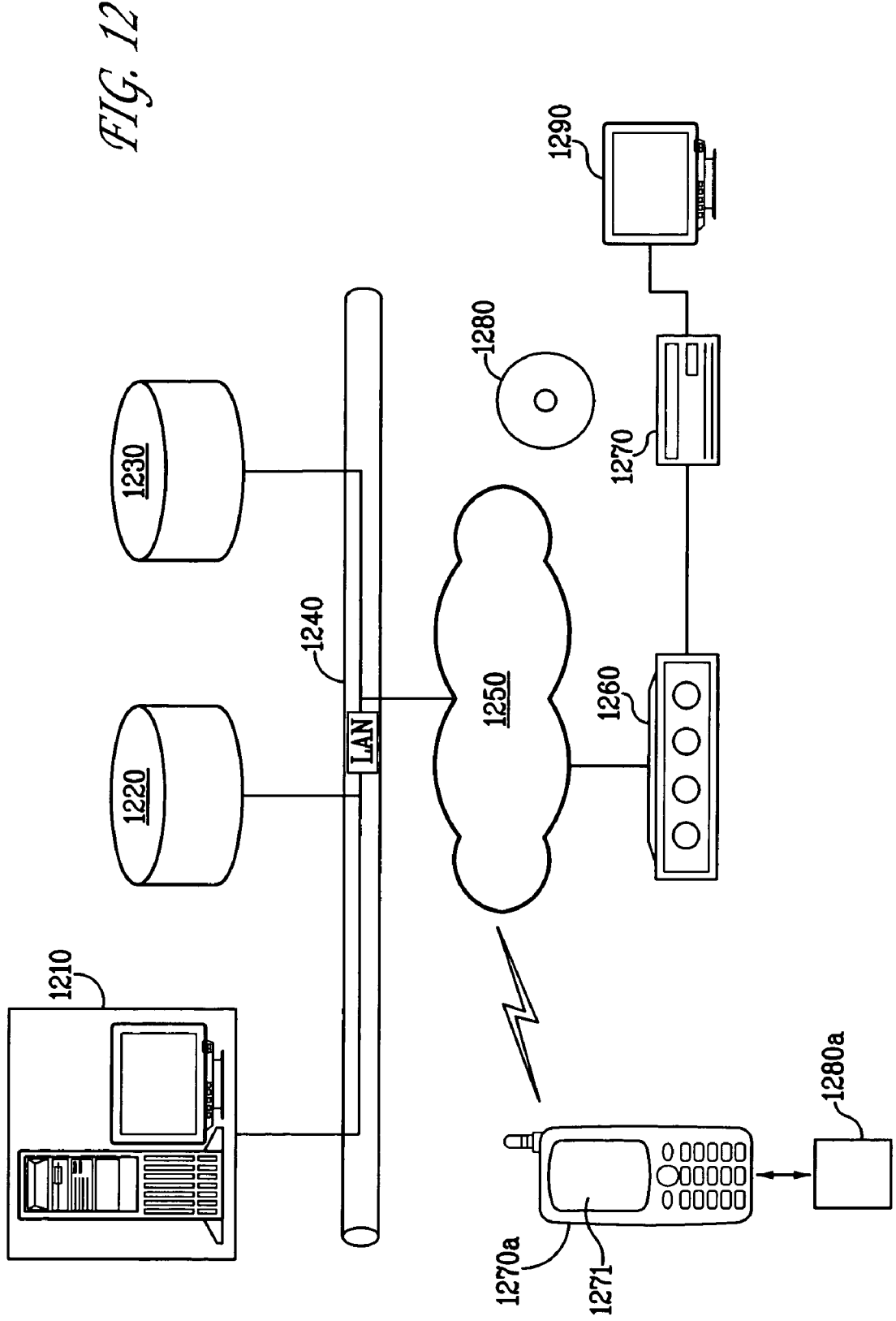
Figure 13:
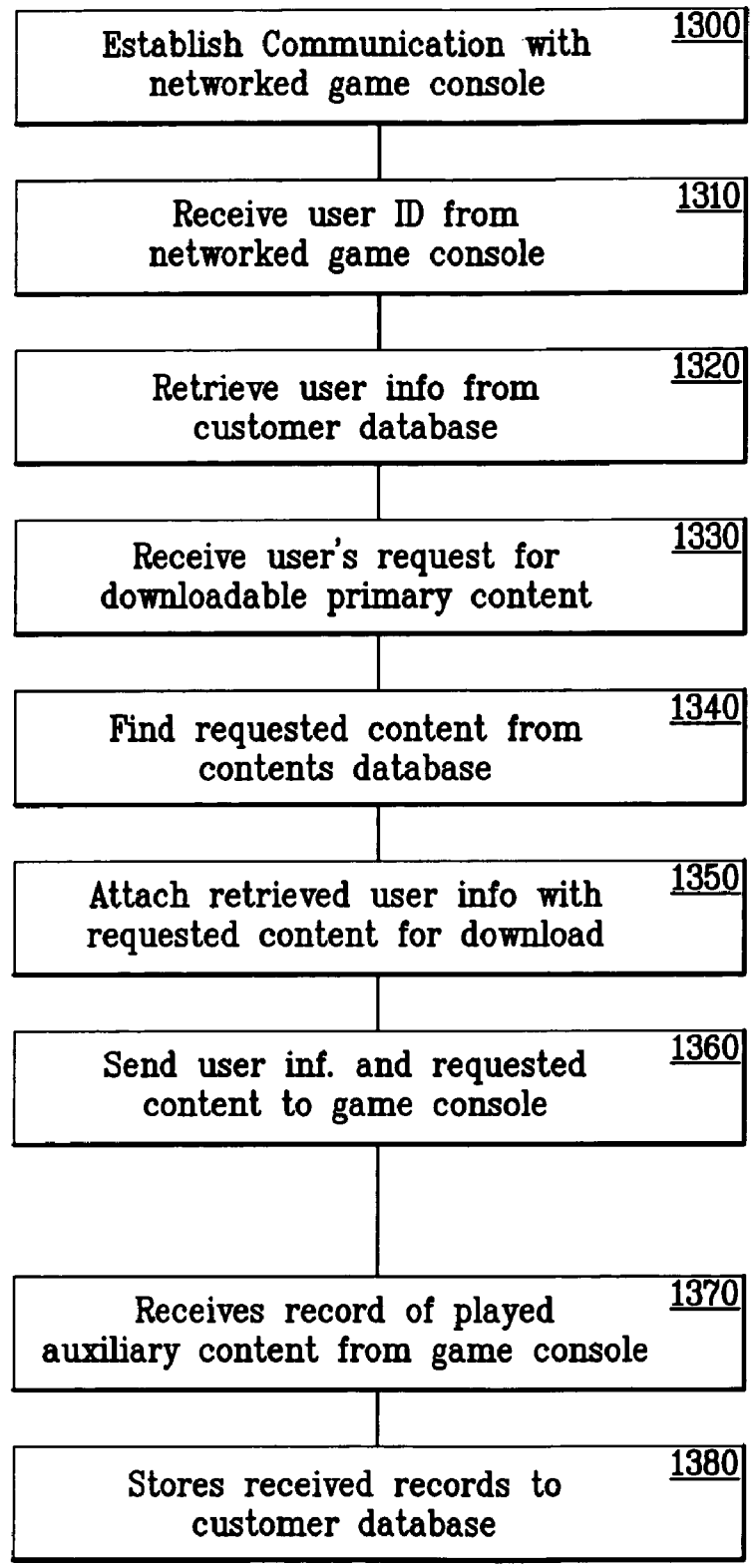
Figure 14:
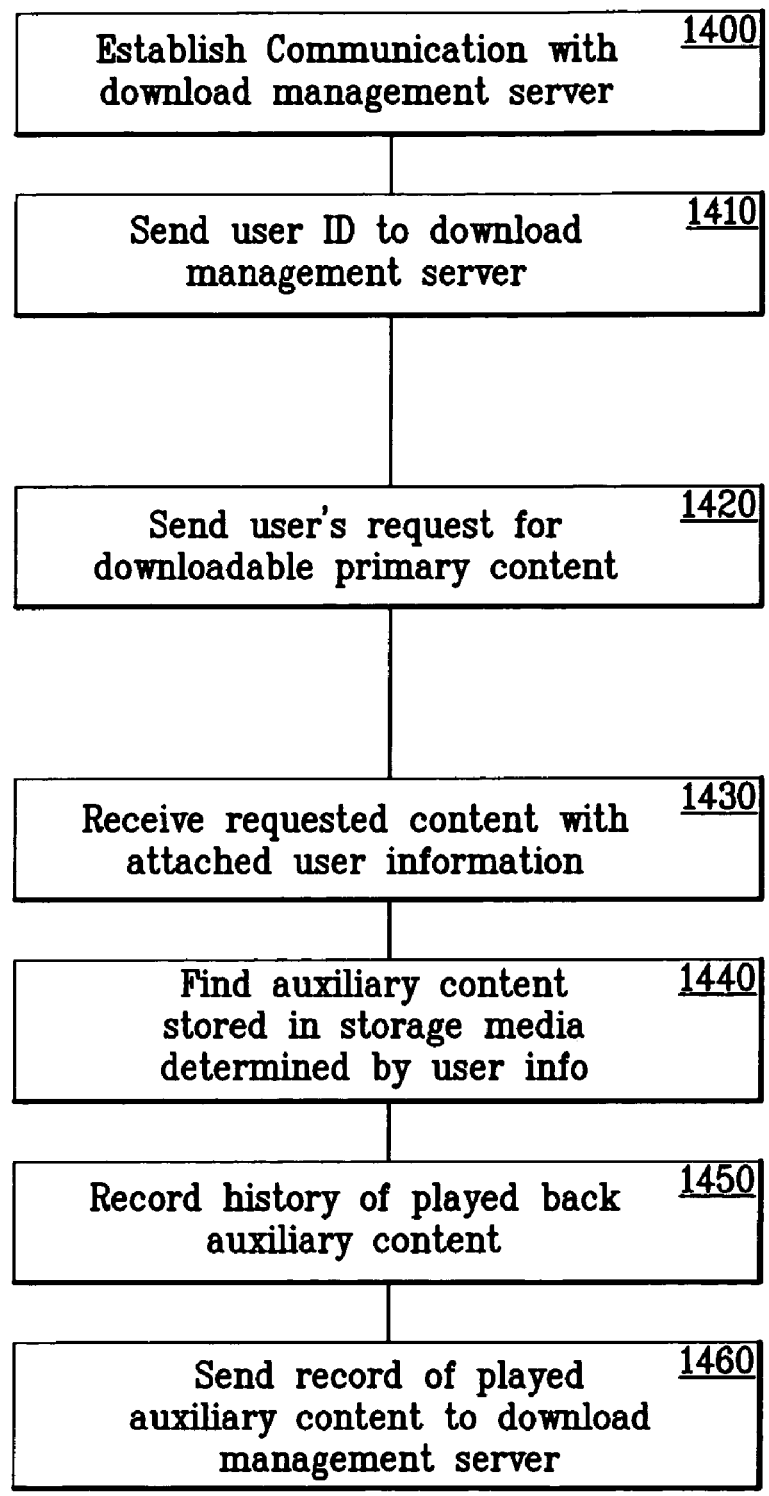
Figure 15:
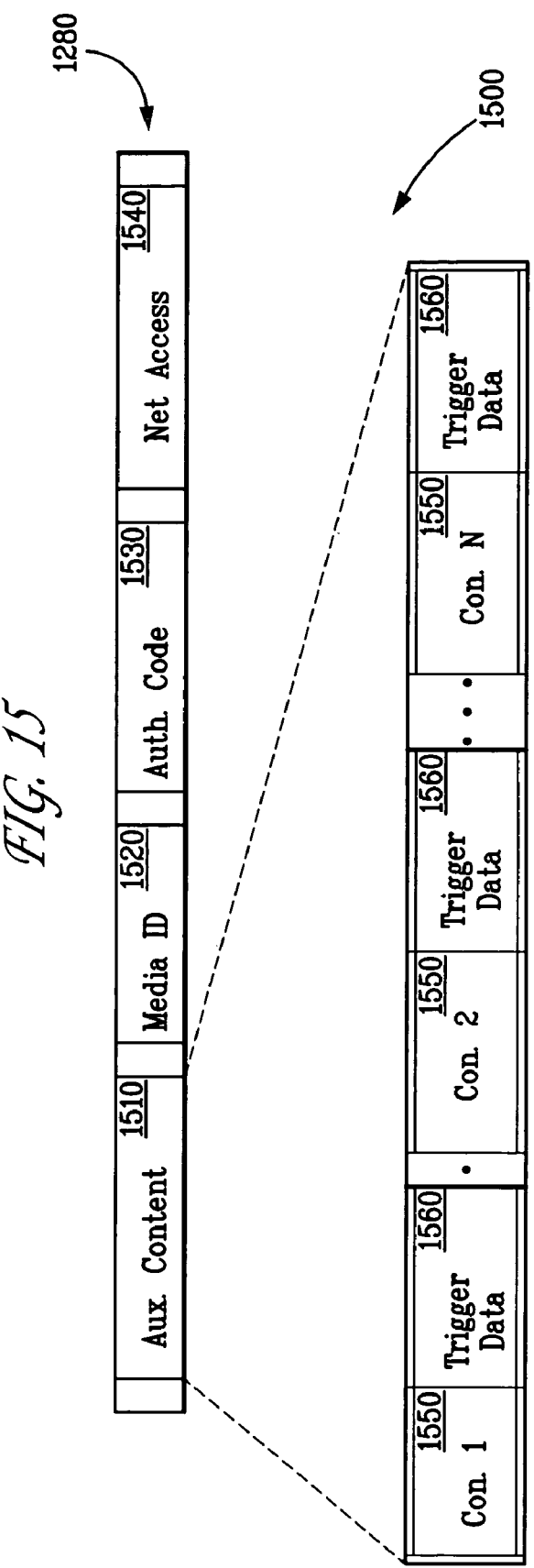
Figure 16:
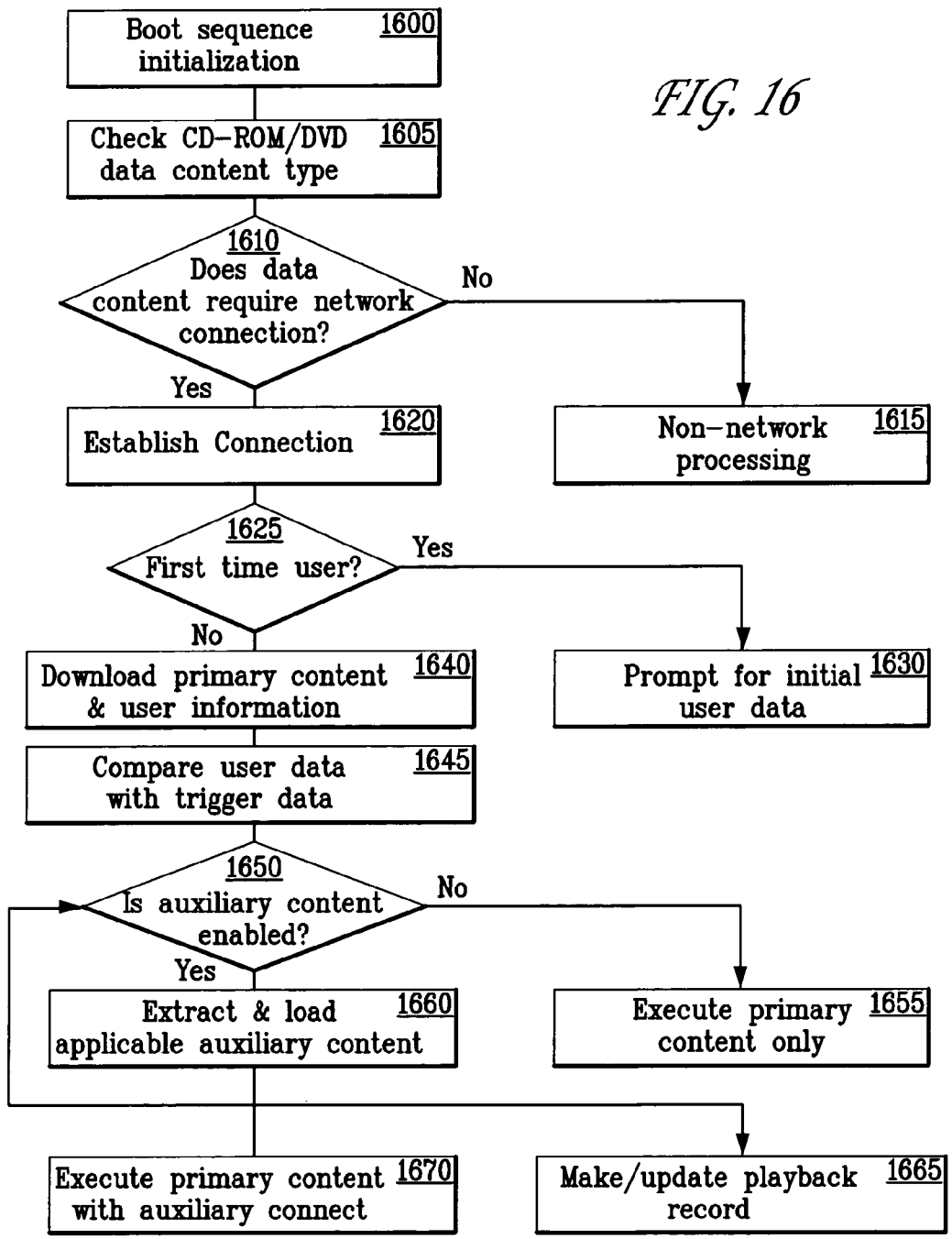
Figure 17:
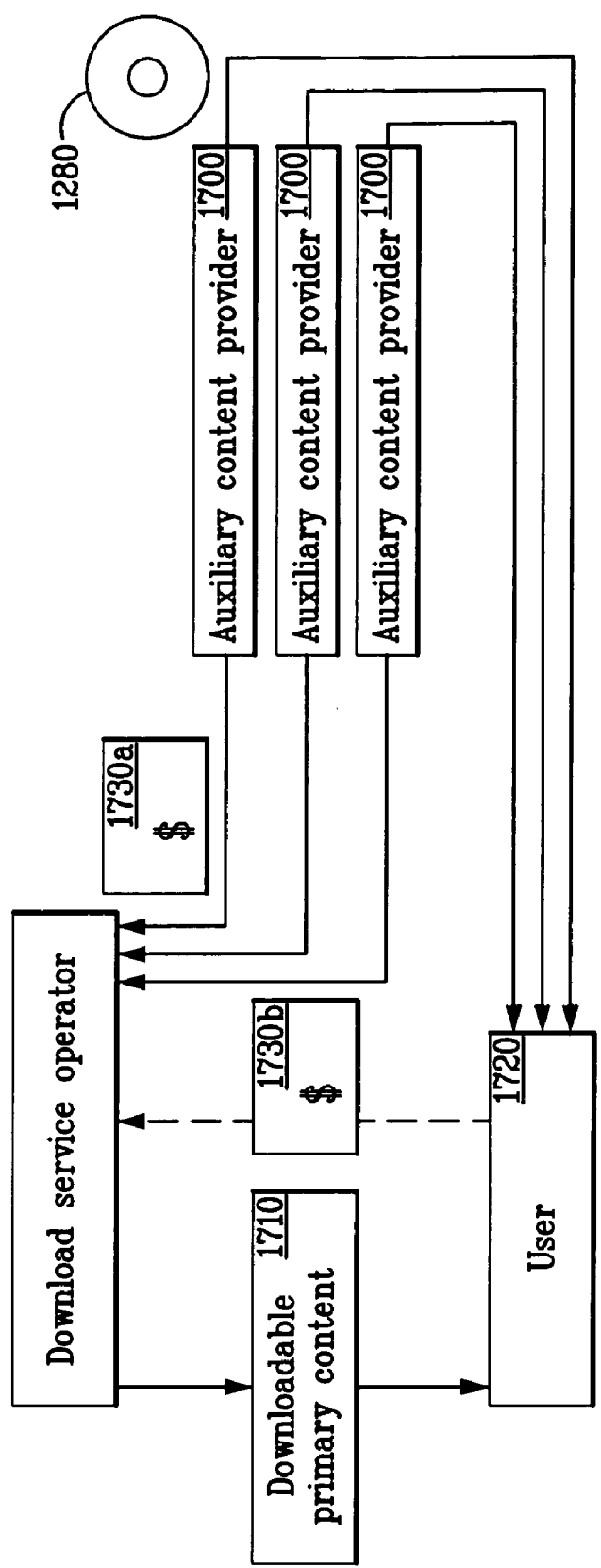
Figure 18:
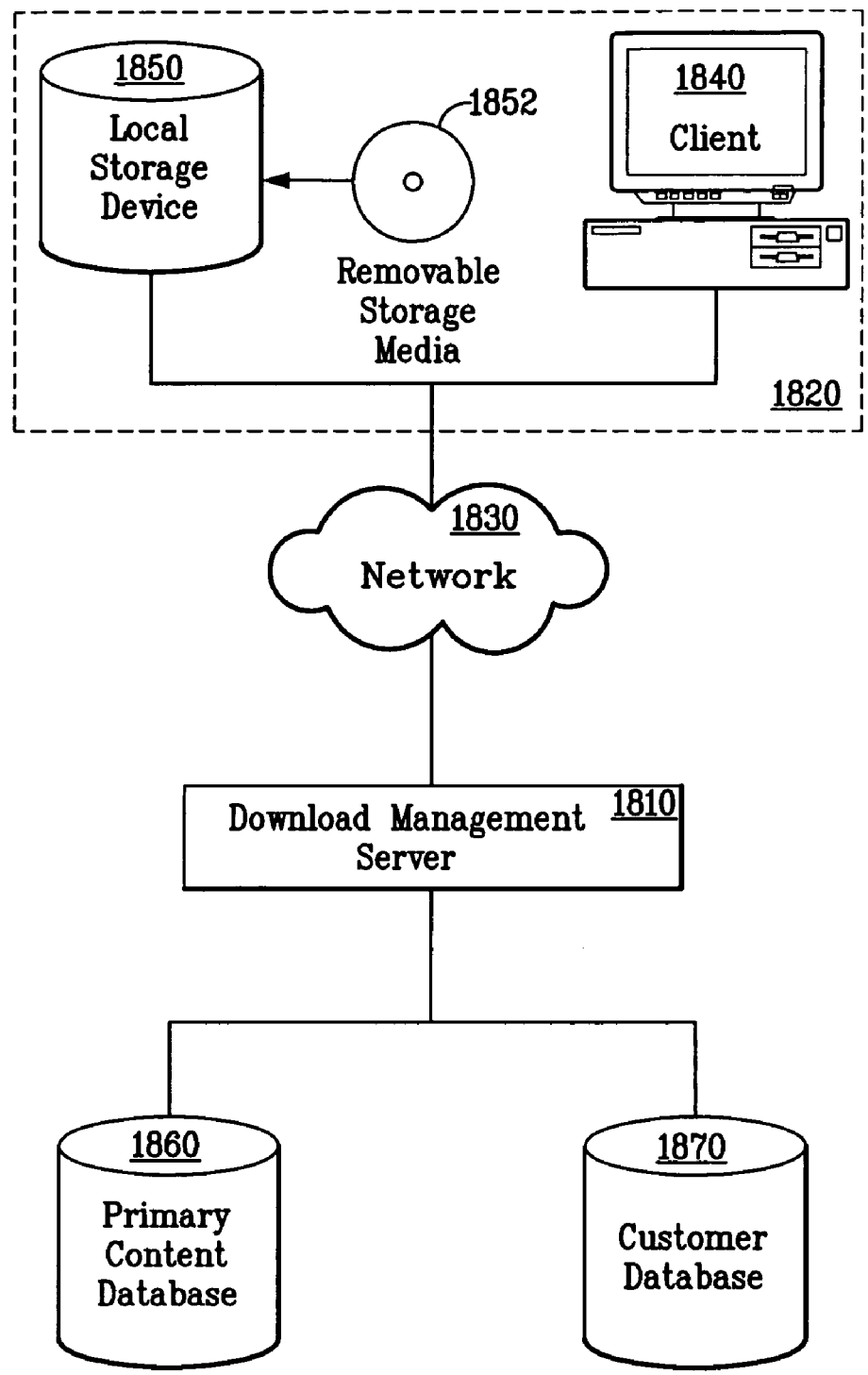
Figure 19:
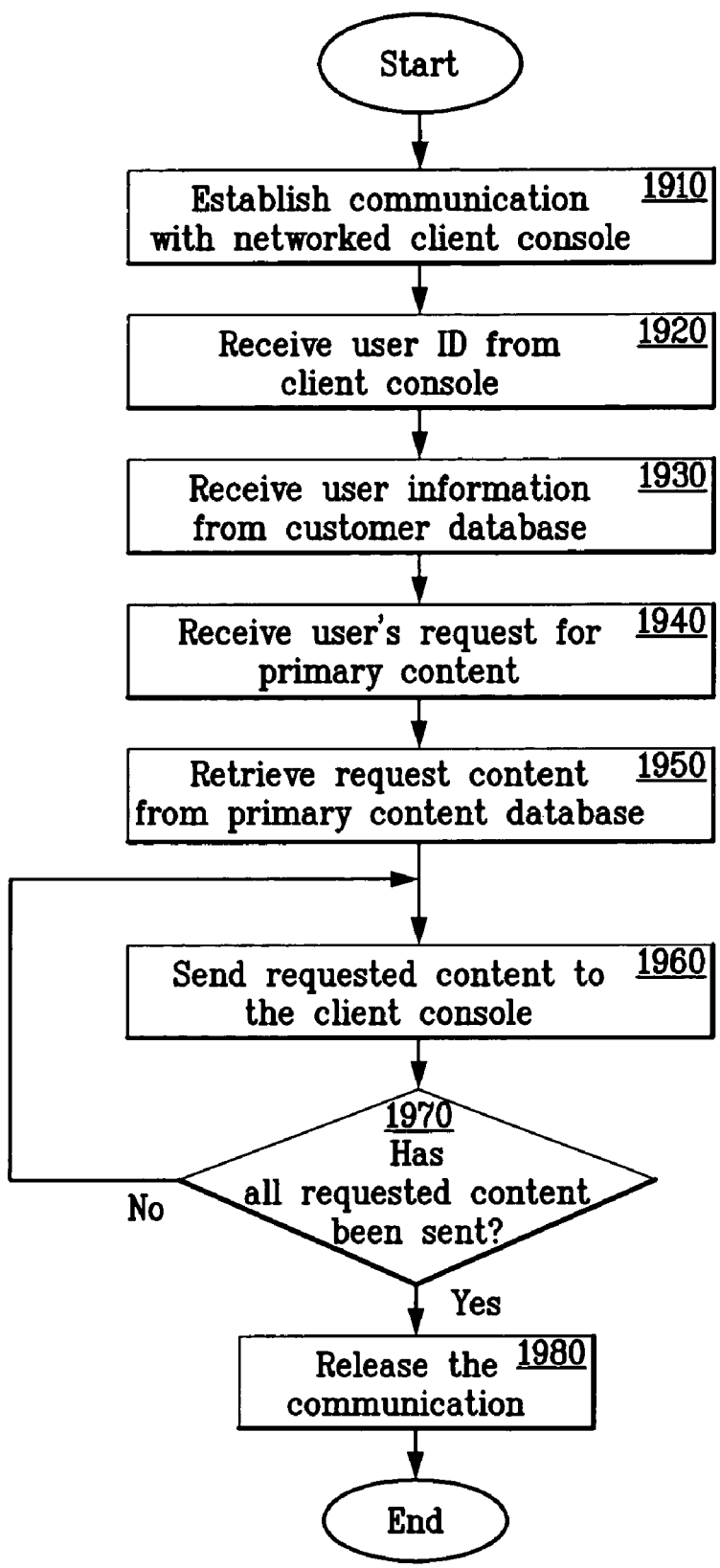
Figure 20:
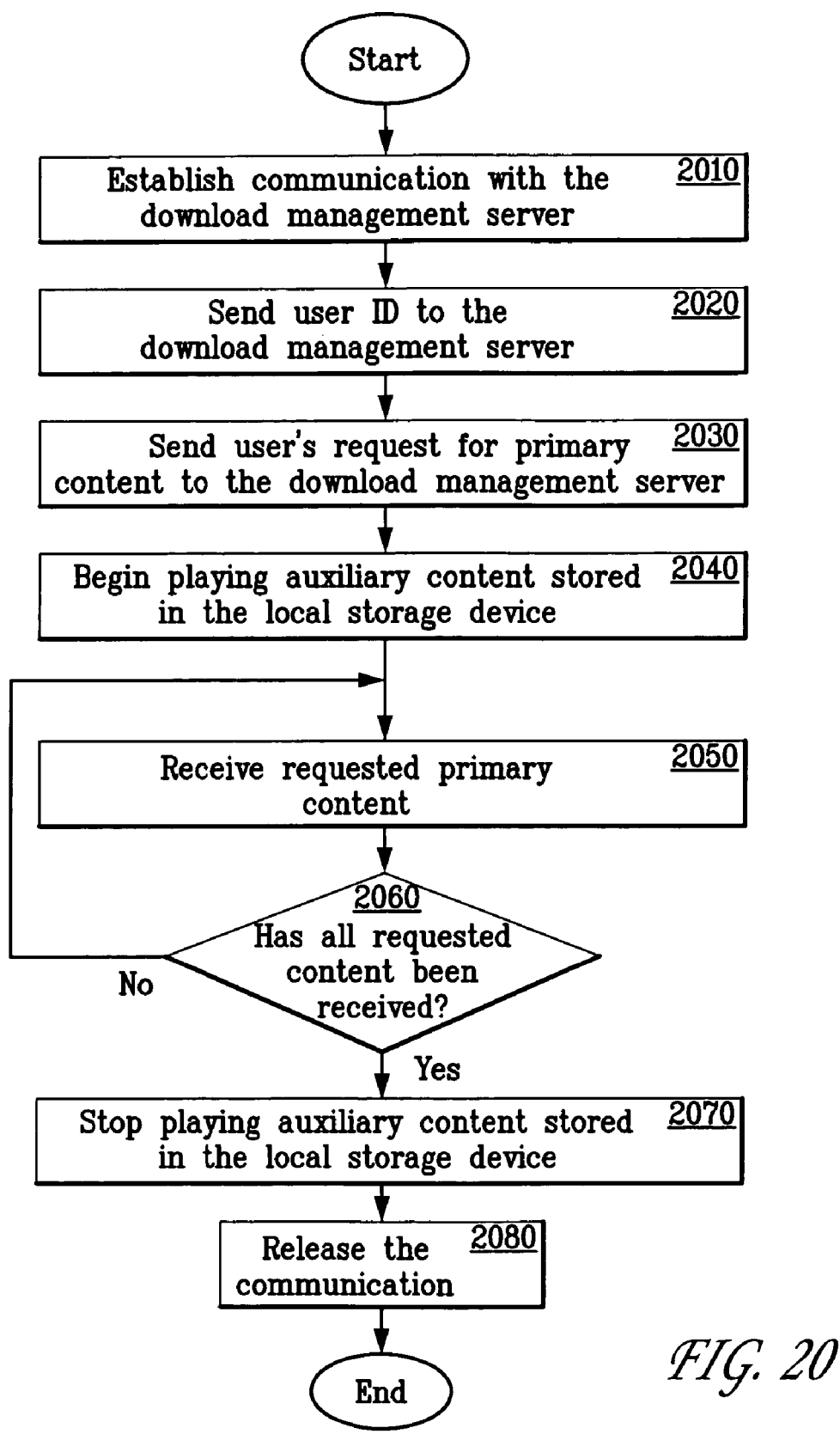

FIG. 12 illustrates an overall system configuration of a system for enabling display of primary media content, along with optional display of locally stored auxiliary media content, according to an embodiment of the present invention;

FIG. 13 is a flowchart which describes functions performed by the primary content server during communication with a networked game console;

FIG. 14 is a flowchart which describes functions performed by a networked game console during communication with the primary content server;

FIG. 15 is a diagram of data contents contained on a detachable storage medium inserted in the game console;

FIG. 16 is a process diagram describing the steps undertaken in the game console during access with the primary content server;

FIG. 17 is a diagram describing an exemplary business model implemented according to the teachings of the present invention;

Providing Auxiliary Content Located on Local Storage During Download/Access of Primary Content Over a Network FIG. 18 illustrates a block diagram of a computer network system that implements embodiments of the present invention;

FIG. 19 is a flowchart that illustrates some download management server steps taken in providing the desired auxiliary content during download of primary content, according to one embodiment of the present invention;

FIG. 20 is a flowchart that illustrates some client-side steps taken in providing the desired auxiliary content during download of primary content, according to one embodiment of the present invention;

In-Contents Advertising Method

Figure 3B:
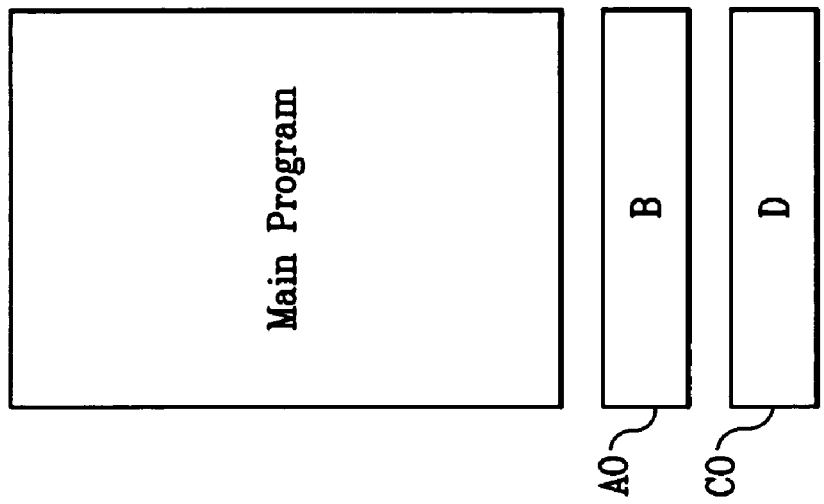
FIGS. 3A and 3B are schematic diagrams of the data structure of a game program stored in the game system of the present invention.
Figure 21:
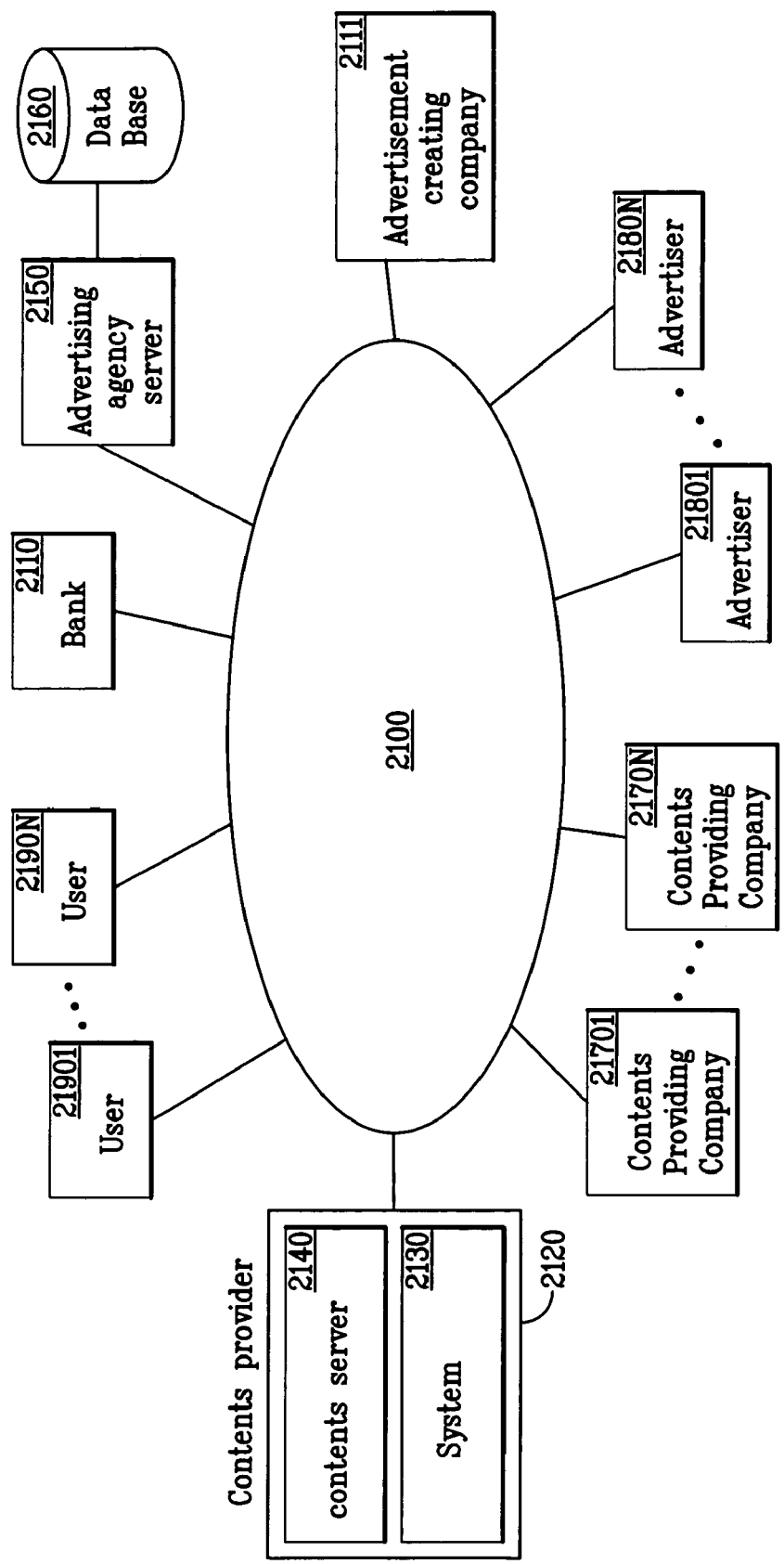
Figure 23A:
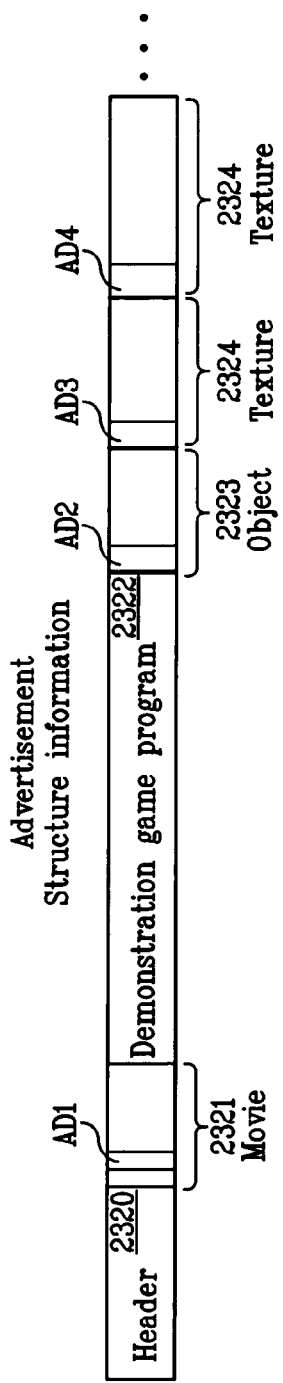
Figure 24:
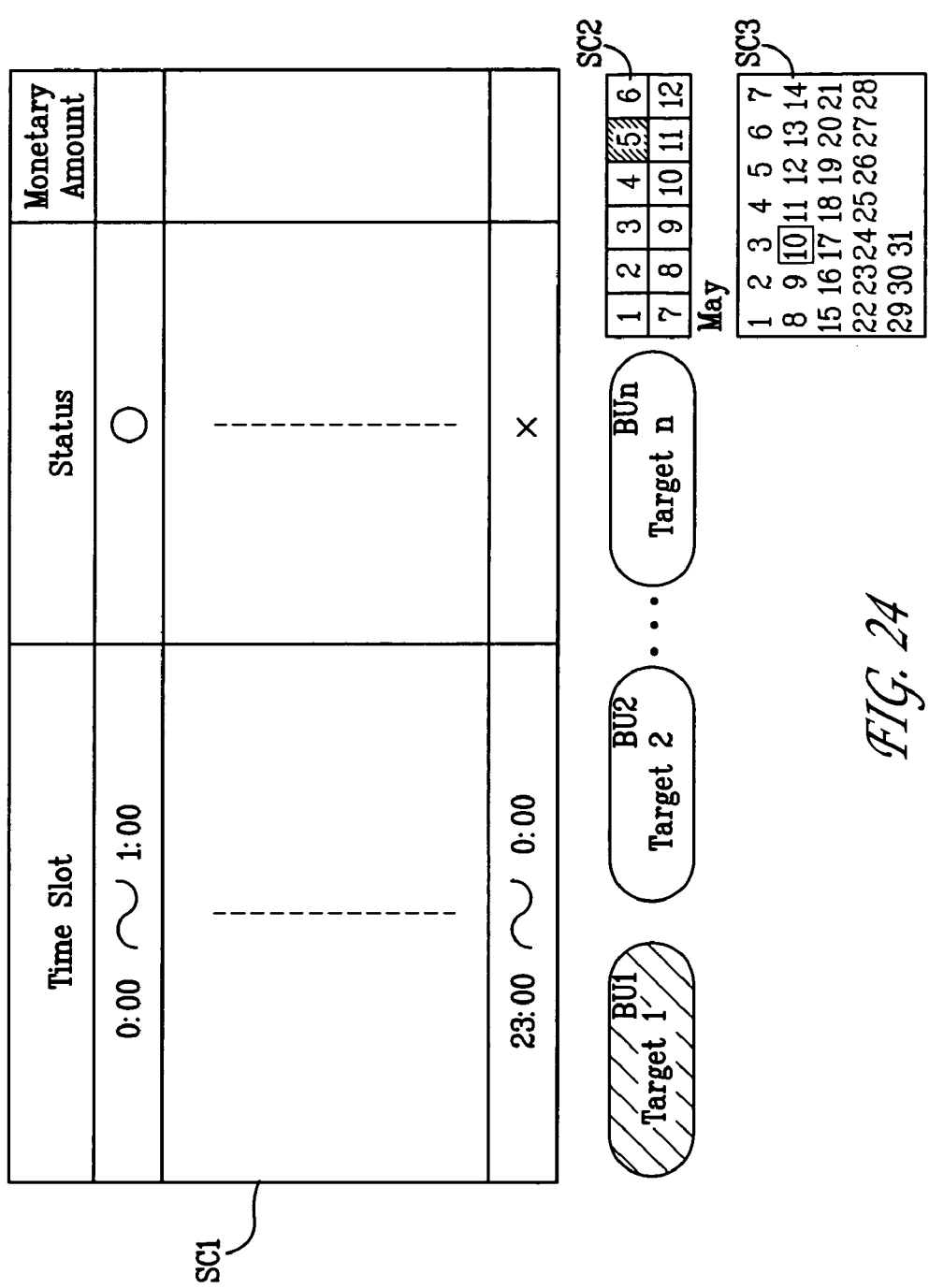
Figure 25:
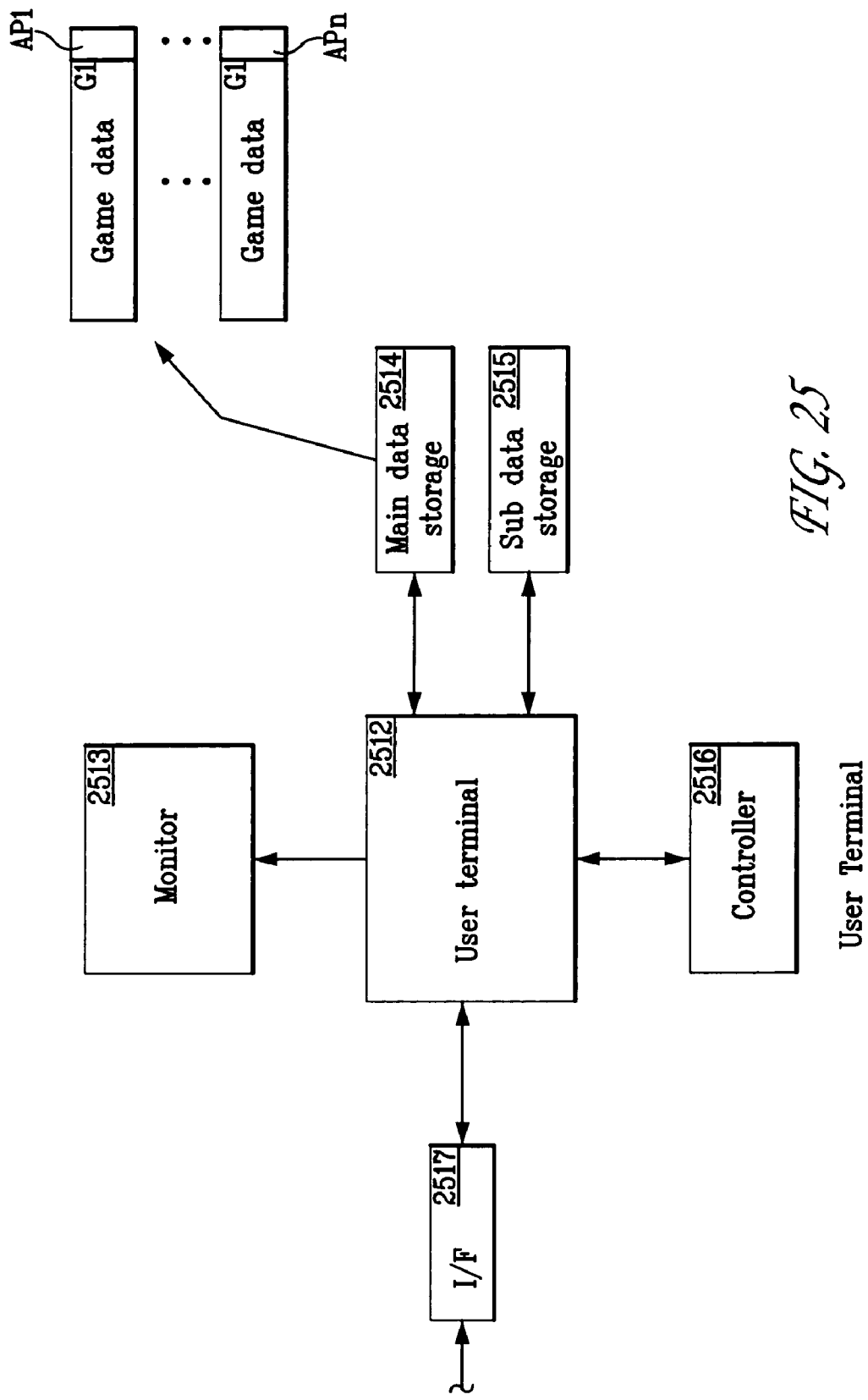
Figure 26:
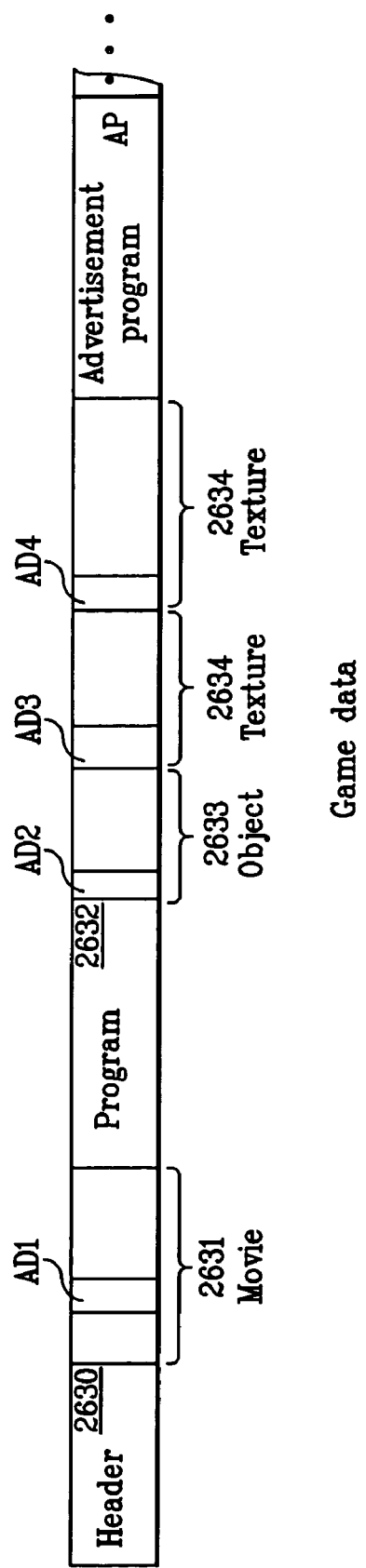
Figure 27:
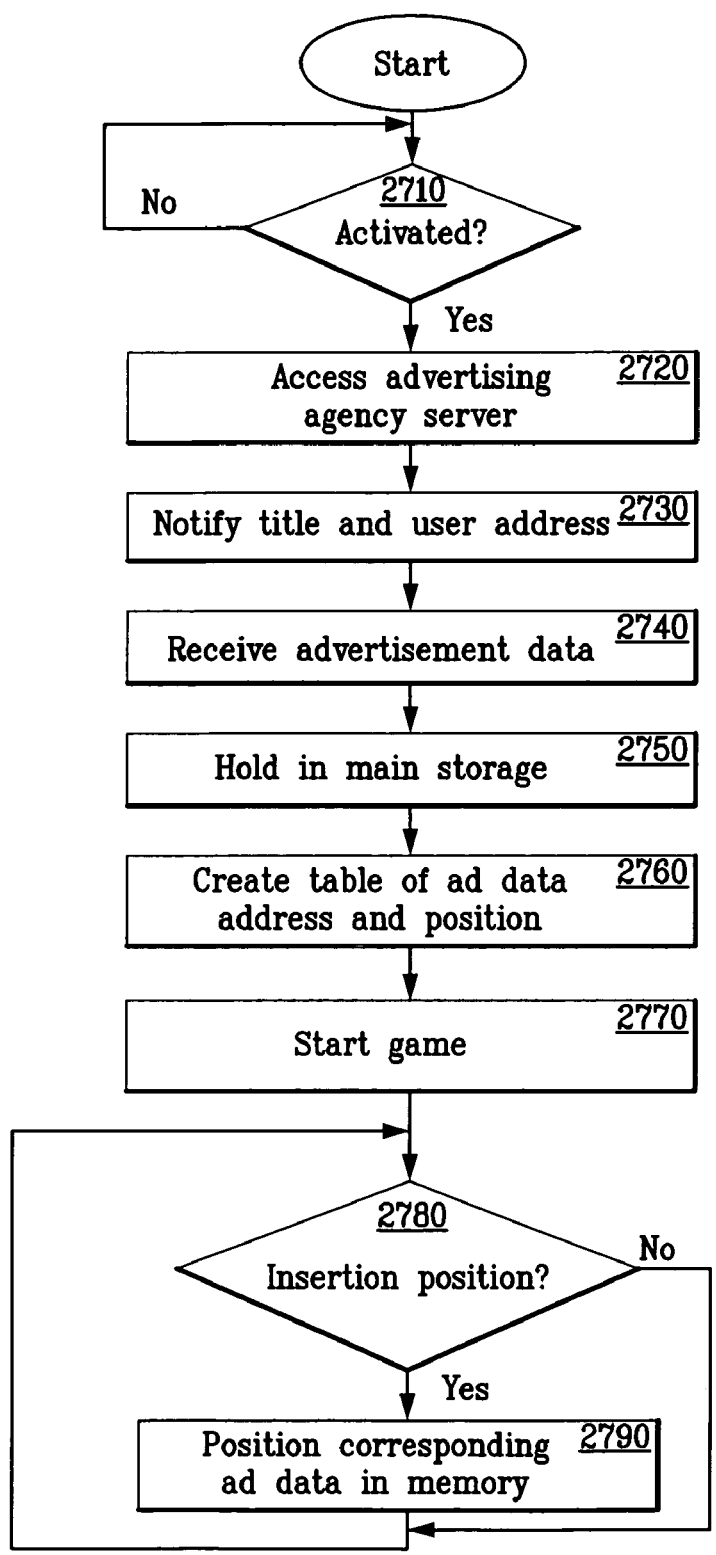
Figure 28:
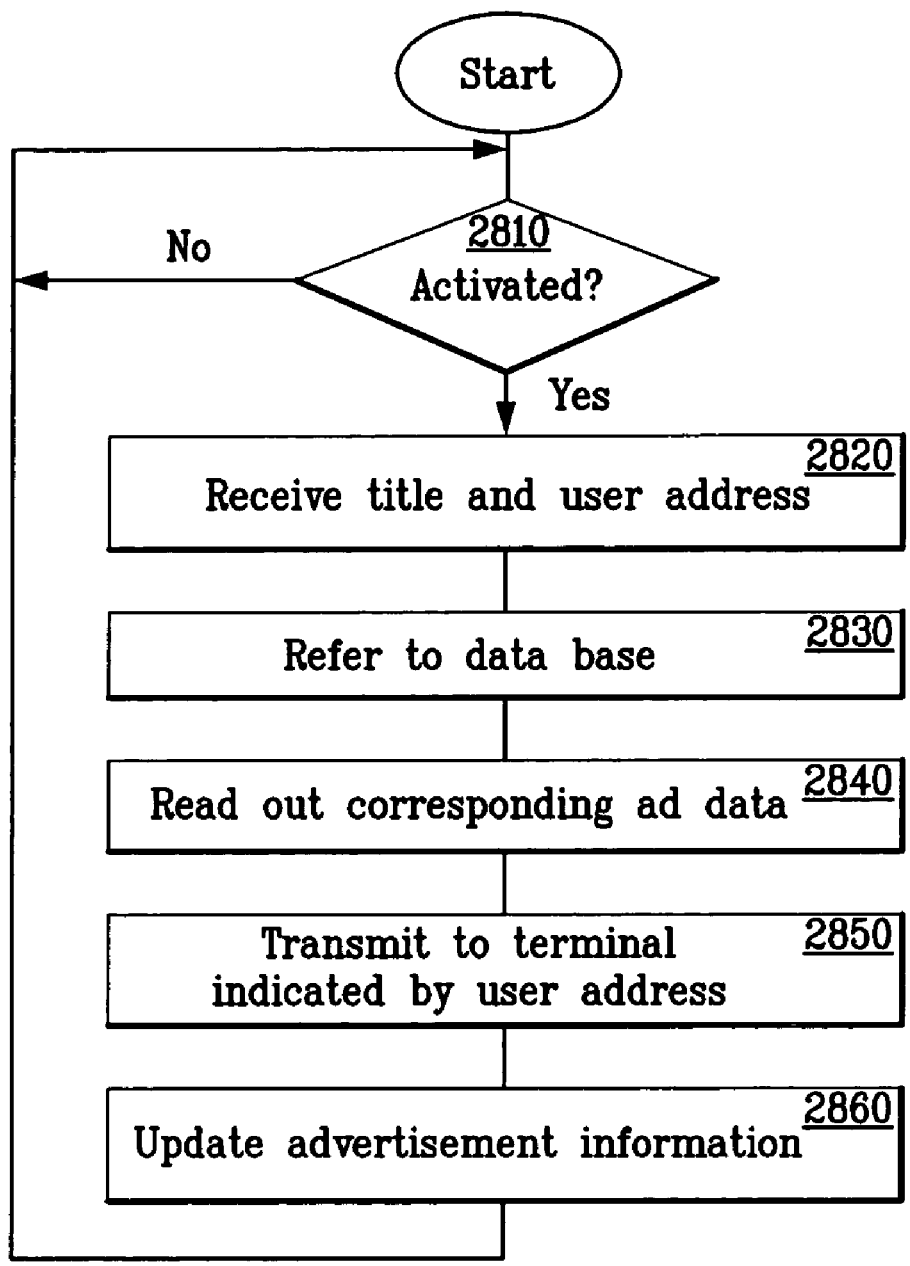
Figure 29:
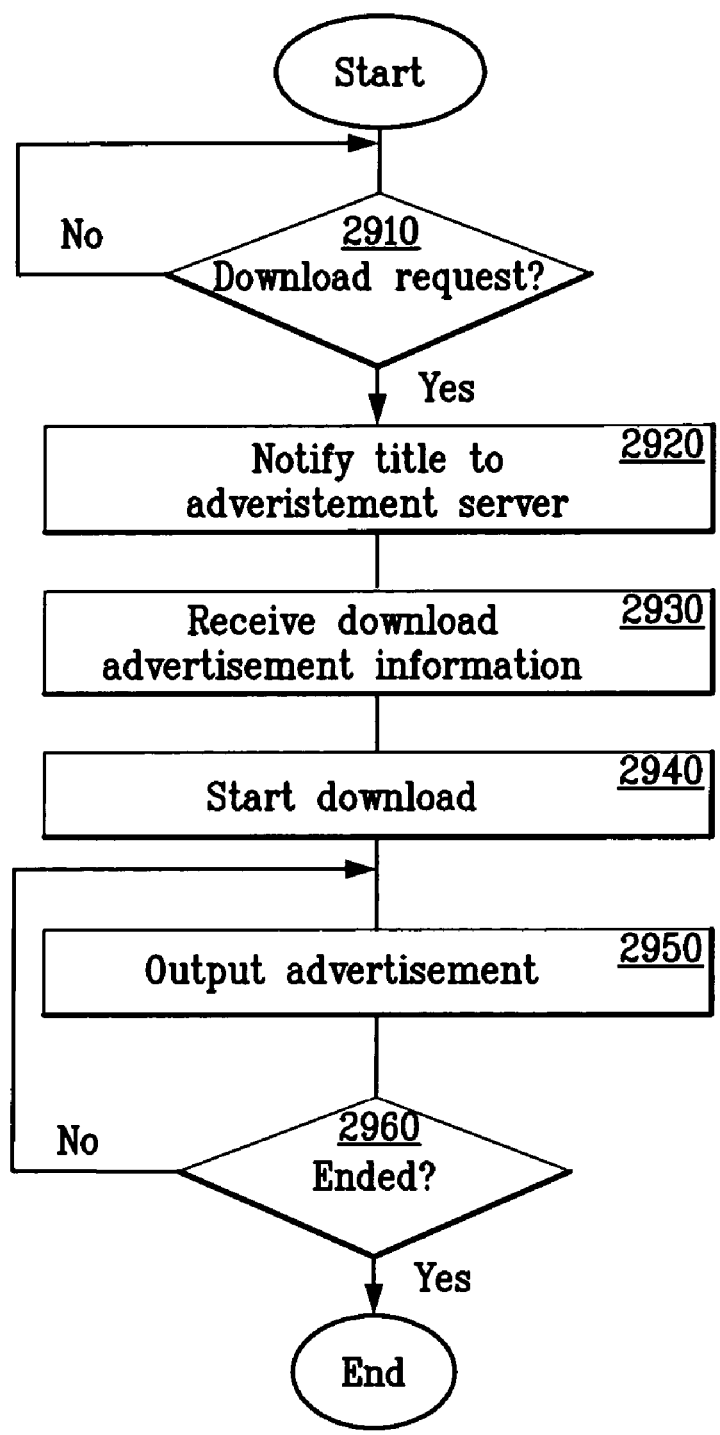

FIG. 21 is a block diagram illustrating an overall system connected to a network;

FIG. 22 is a communication flow illustrating information exchange between parties;

FIGS. 23A and 3B are explanatory diagram illustrating an example of the data configuration of advertising structure information, and a screen example for advertisers;

FIG. 24 is a screen example for advertisers indicating the time slot for displaying advertisements, status, and monetary amount;

FIG. 25 is a block diagram illustrating a configuration example of a user client terminal;

FIG. 26 is an explanatory diagram illustrating the configuration of contents downloaded to the user client terminal;

FIG. 27 is a flowchart illustrating advertising operations in the event that a game is activated at the user client terminal;

FIG. 28 is a flowchart illustrating the operation of an advertising program which operates on the client terminal where the game has been activated;

FIG. 29 is a flowchart illustrating the advertisement output operations in the event that game data is being downloaded to the user client terminal;

Advertising Impression Determination

Figure 30:
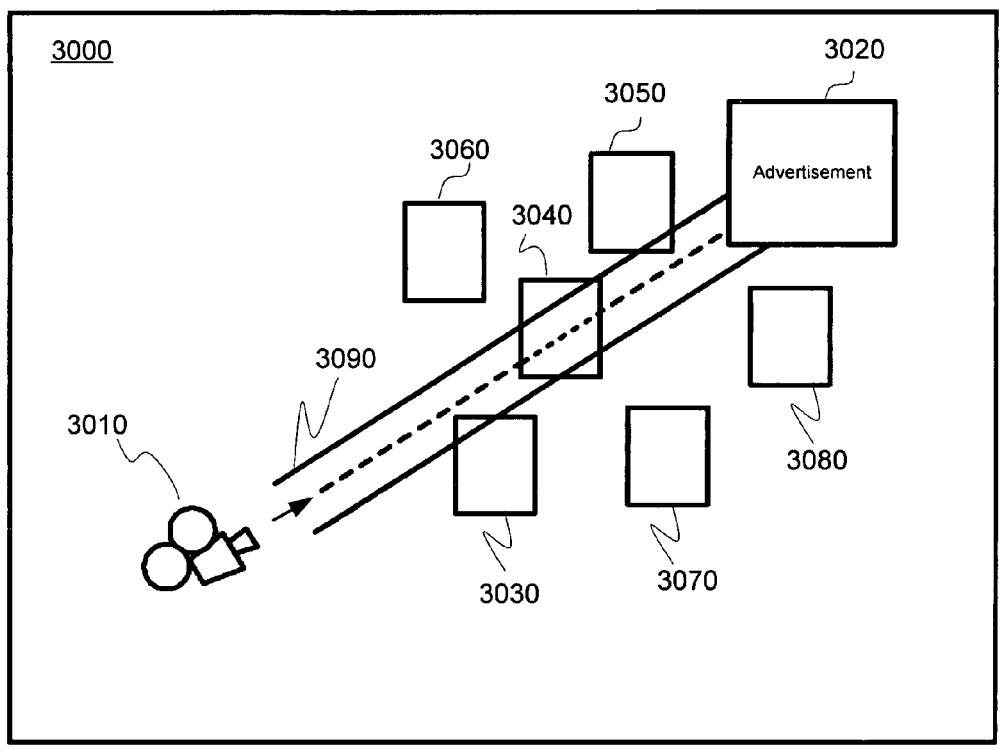
Figure 31:
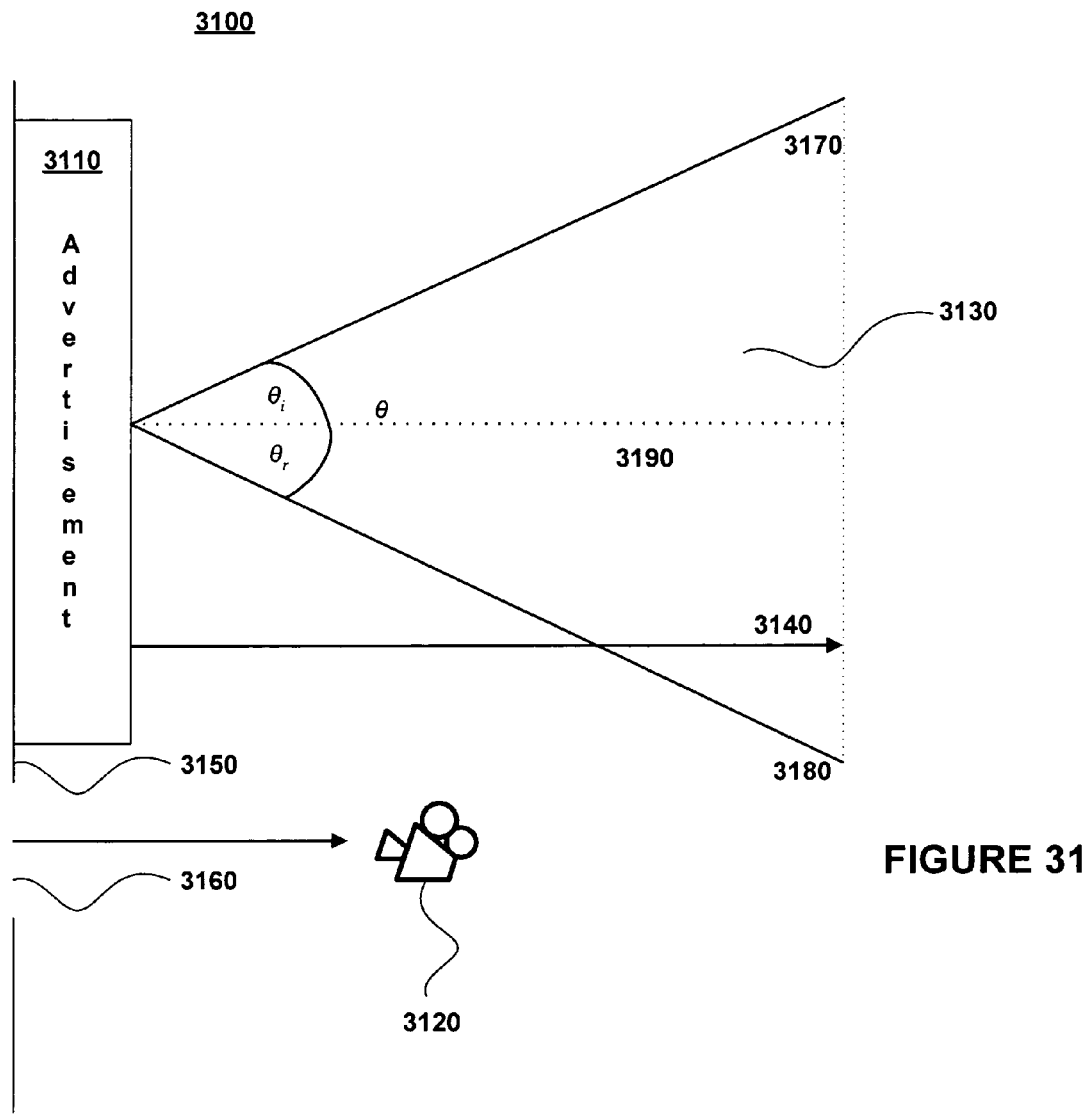
Figure 32:
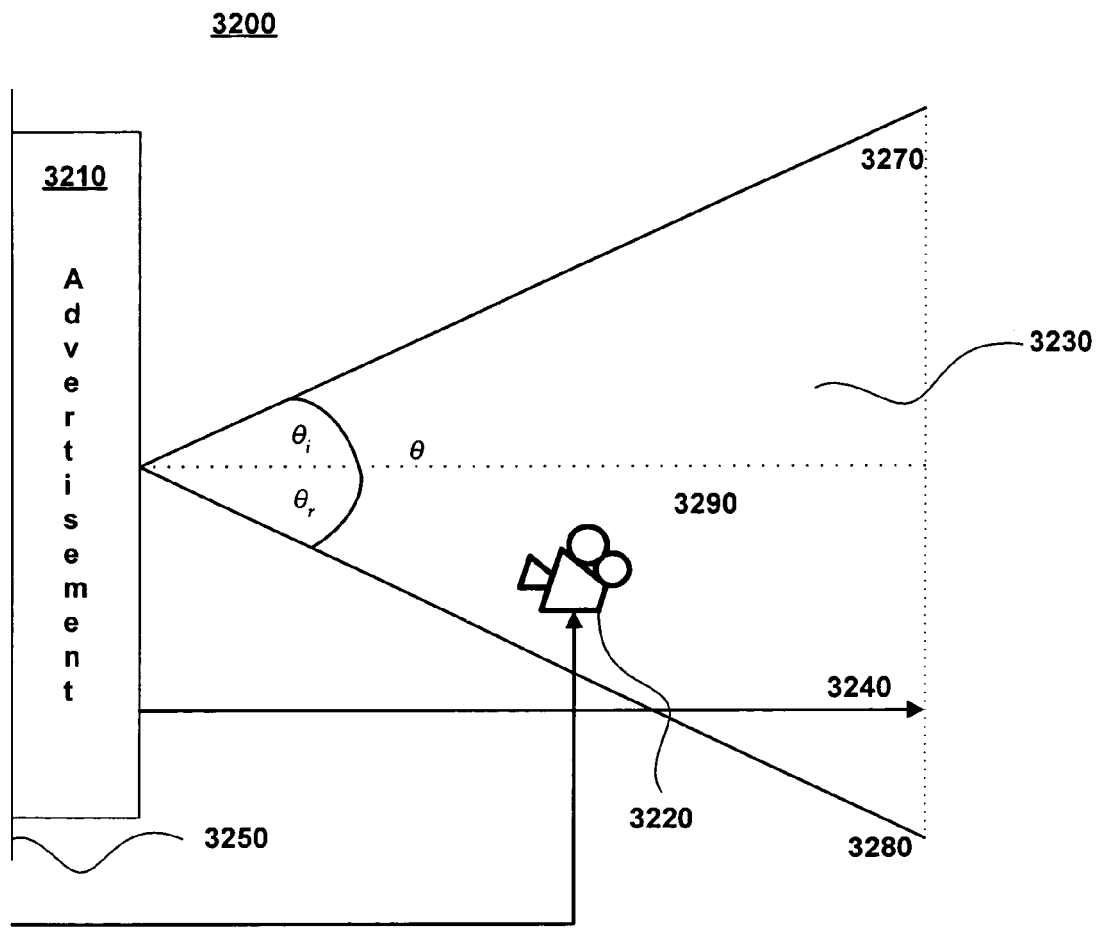
Figure 33A:
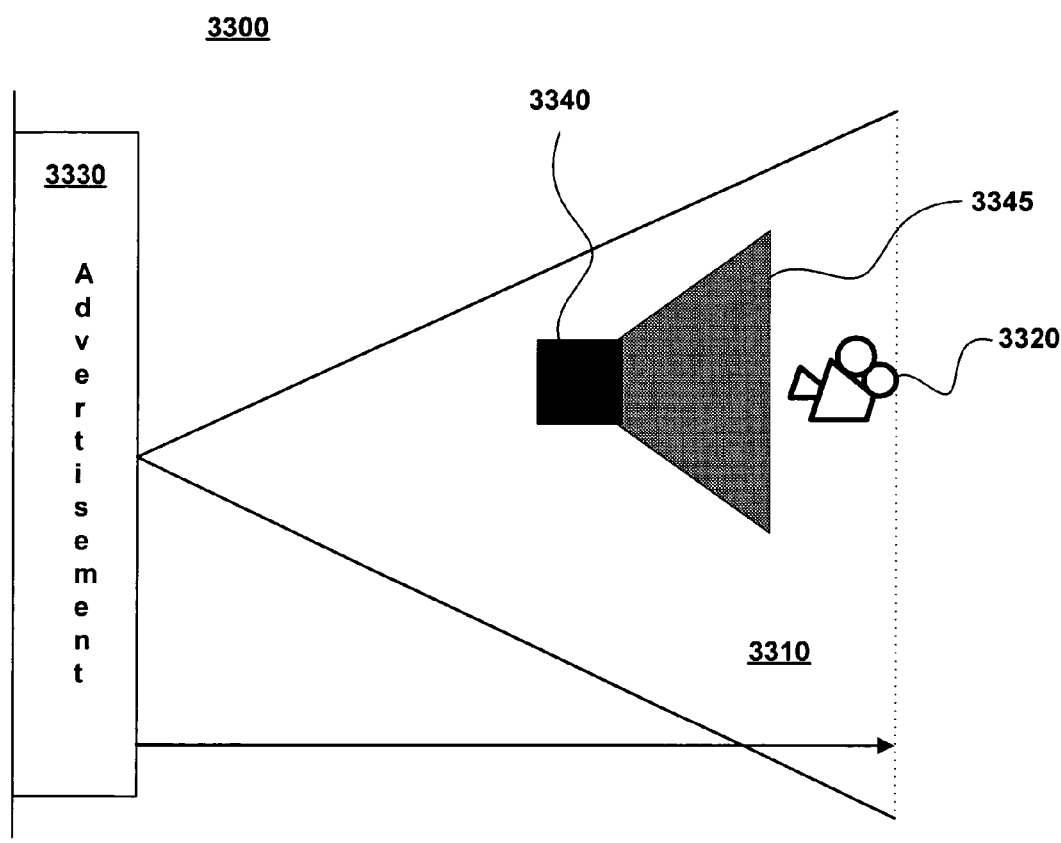
Figure 33B:
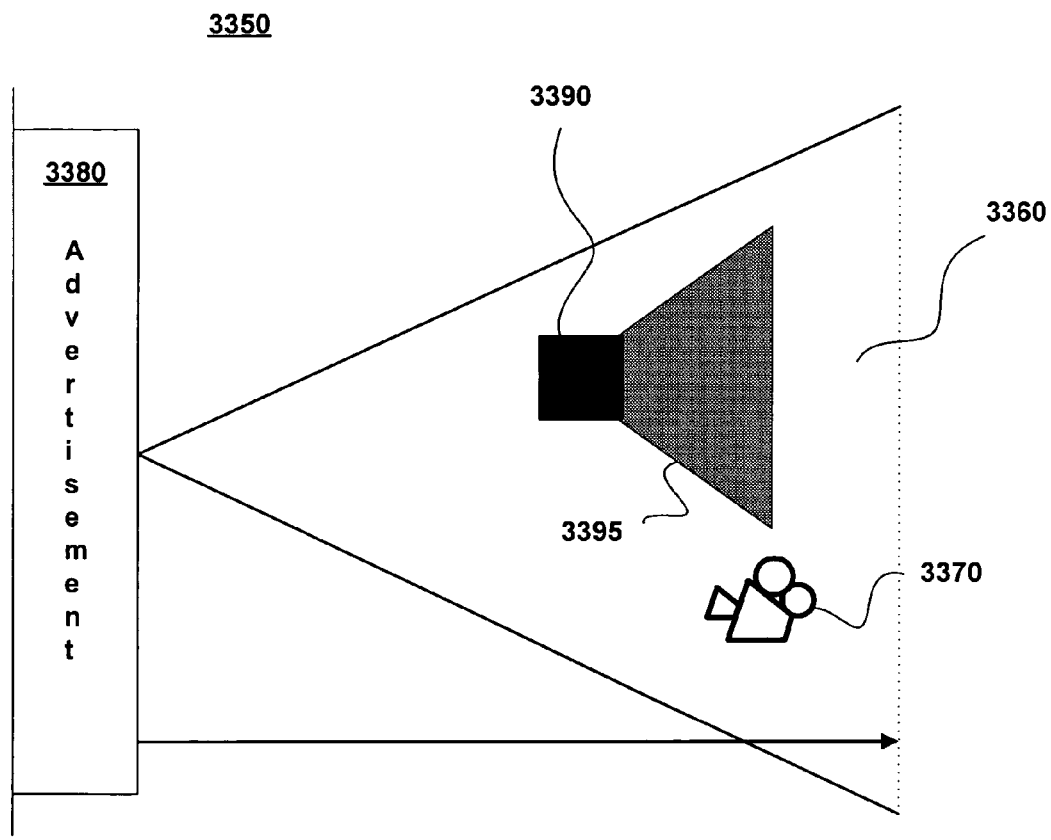
Figure 34:
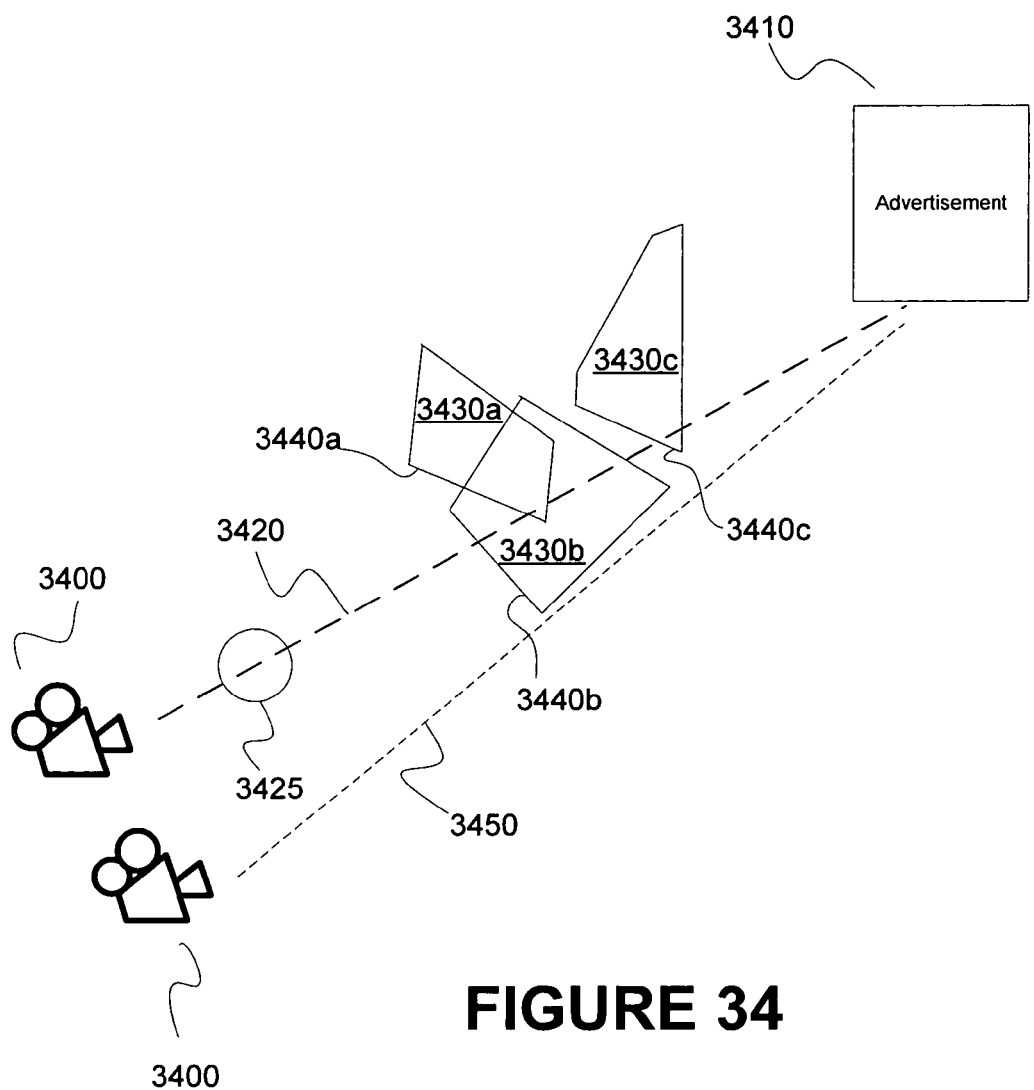
Figure 35A:
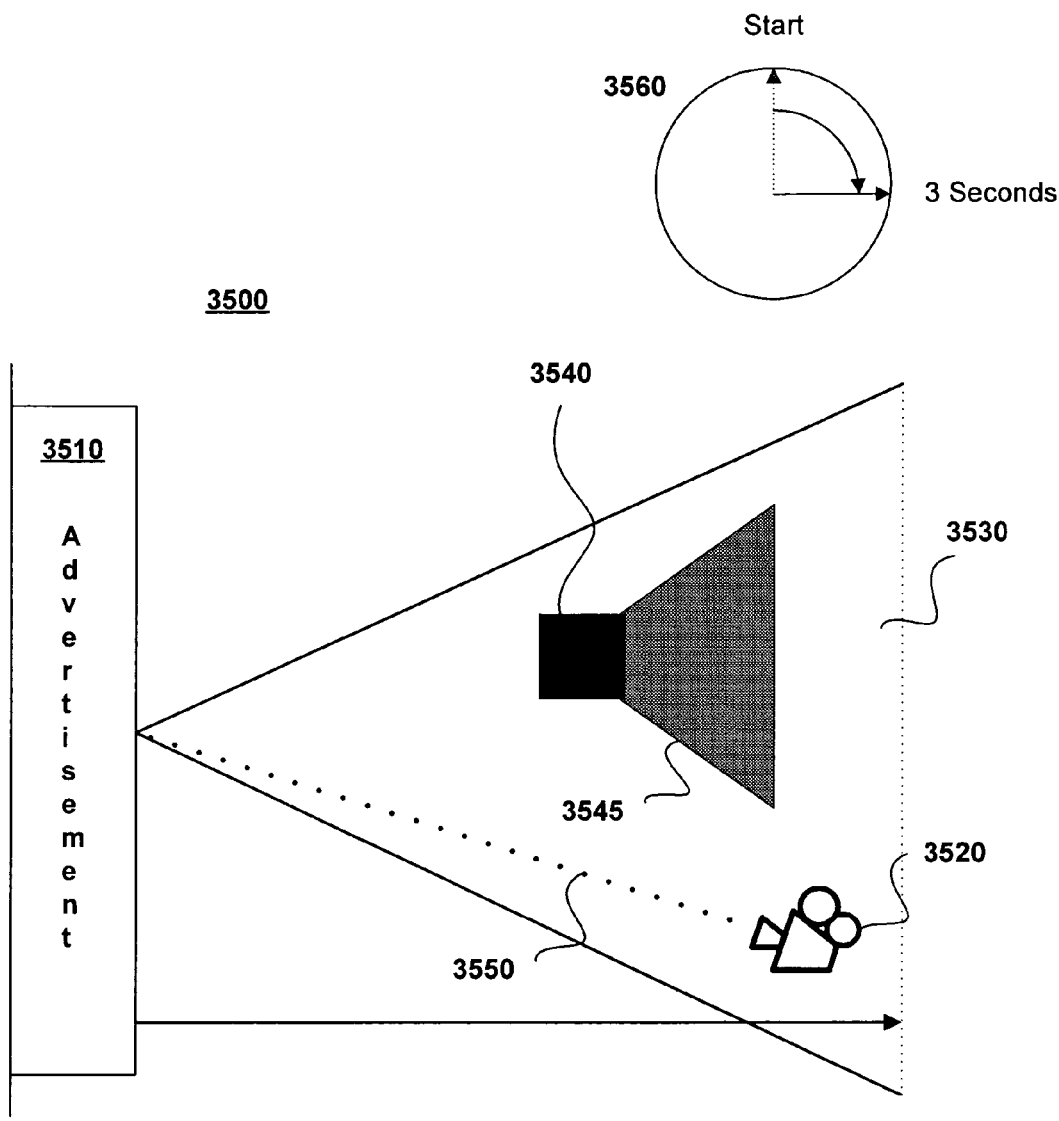
Figure 35B:
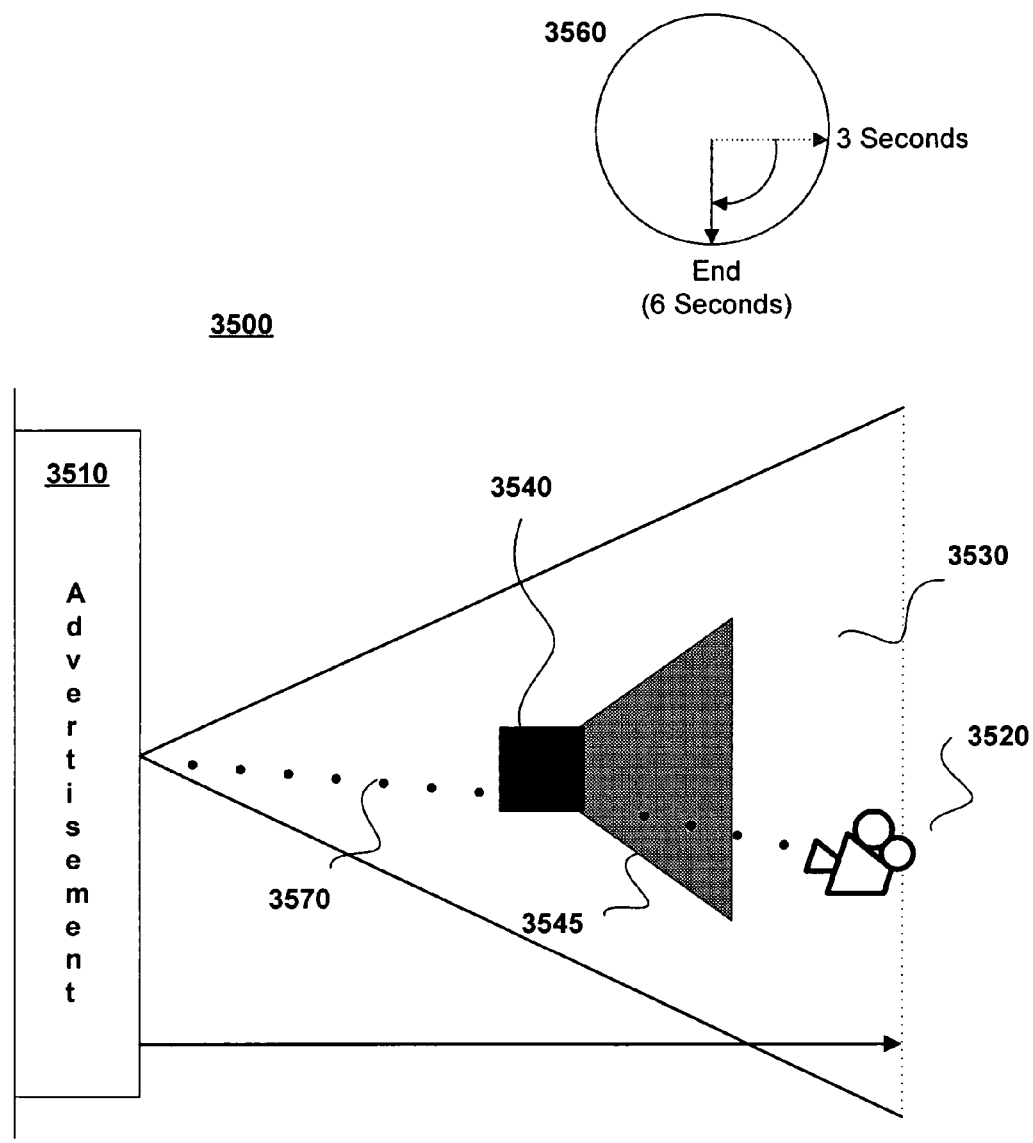
Figure 36:
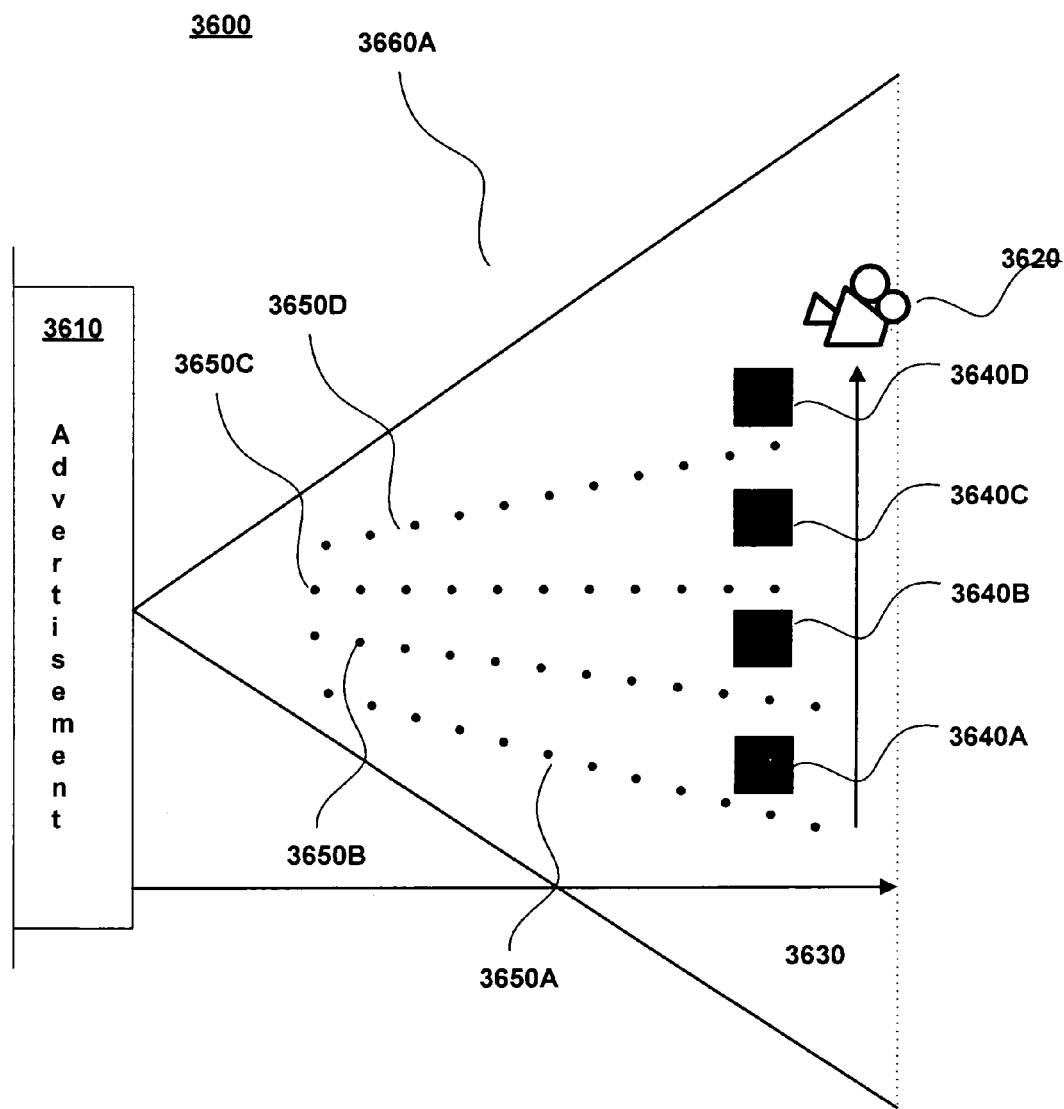

FIG. 30 illustrates line-of-sight obstacles as may be found in a video game environment, in one embodiment in accordance with the present invention;

FIG. 31 illustrates a positional relationship between a game character and an advertisement, in one embodiment in accordance with the present invention;

FIG. 32 illustrates a second positional relationship between a game character and an advertisement, in one embodiment in accordance with the present invention;

FIGS. 33A and 33B illustrate two positional relationships between a game character and an advertisement relative obstacles in an impression area, in one embodiment in accordance with the present invention;

FIG. 34 illustrates an exemplary line-of-sight determination methodology to be used in determining the occurrence of an advertising impression, in one embodiment in accordance with the present invention;

FIGS. 35A-35B illustrates the correlation between an impression counter and a positional relationship of a game character and an advertisement, in one embodiment in accordance with the present invention; and FIG. 36 illustrates an alternative correlation between an impression counter and a positional relationship of a game character and an advertisement, in one embodiment in accordance with the present invention.

DETAILED DESCRIPTION

Apparatus and Method for Executing a Game Program Having Advertisements

Figure 1B:
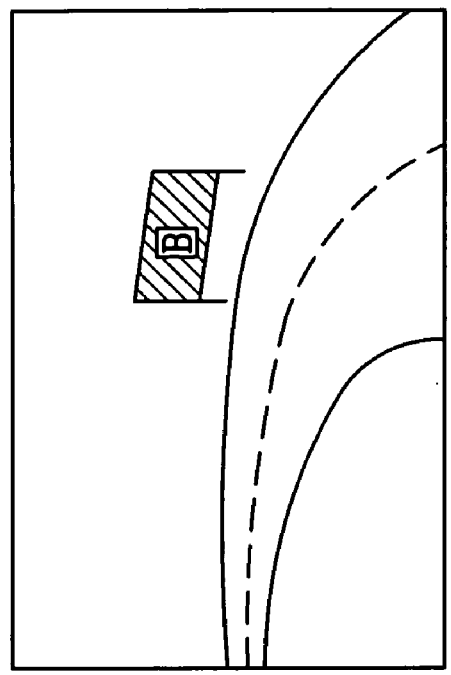
FIGS. 1A and 1B are pictorial representations of an auto racing game in which two different advertisements are displayed.
Figure 1A:
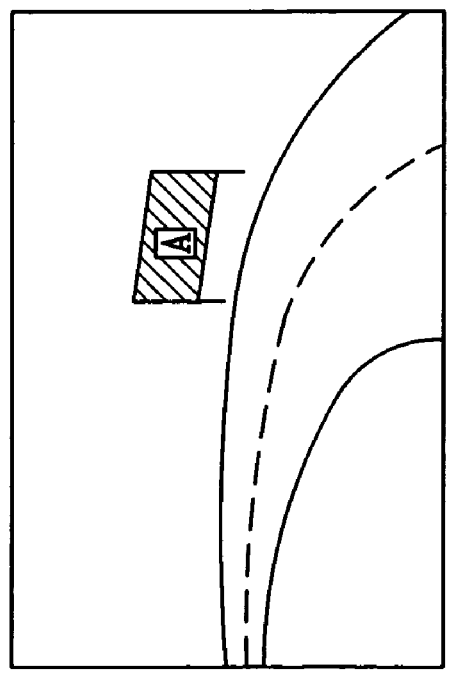
Figure 2B:
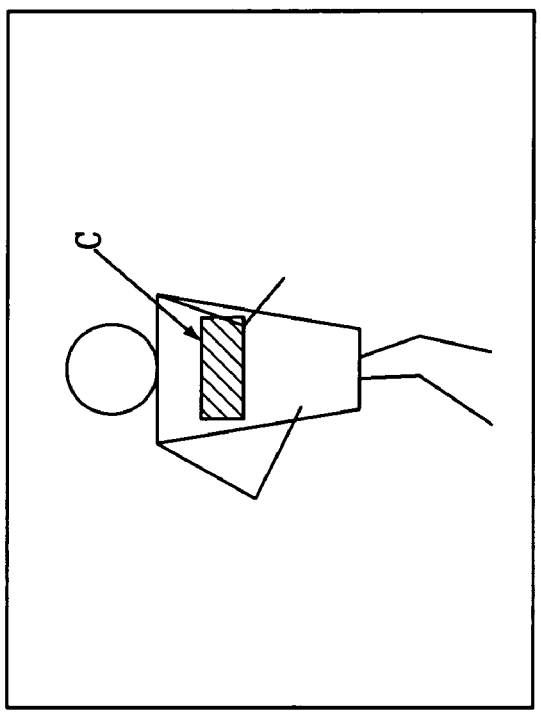
FIGS. 2A and 2B are pictorial representations of another scene of the auto racing game in which two different advertisements are displayed.
Figure 2A:
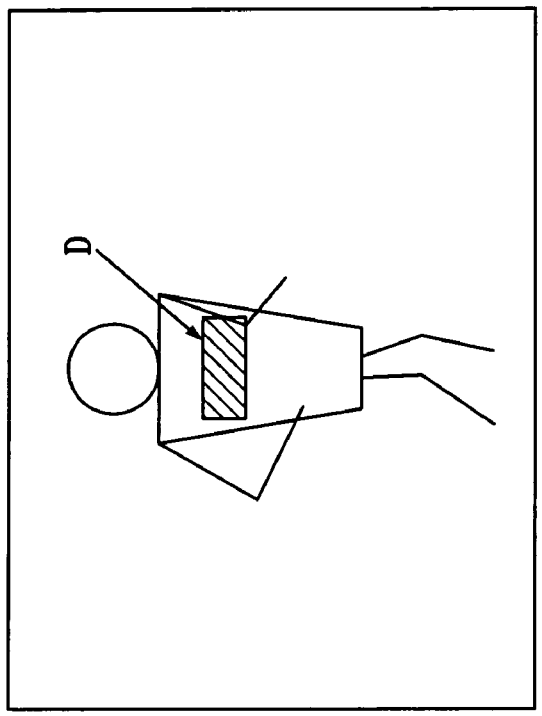

FIGS. 1A and 1B are pictorial representations of an auto racing game in which a commercial advertisement 'A' is displayed on a billboard in FIG. 1A and a different commercial advertisement 'B' is displayed on the billboard as shown in FIG. 1B. Similarly, FIGS. 2A and 2B are pictorial representations of another 'scene' of the auto racing program in which commercial advertisements 'C' and 'D,' respectively, are displayed on the clothing of the racing car driver. As seen from both set of FIGS. 1A and 1B and FIGS. 2A and 2B, advertisements 'A' and 'B' are displayed in the same scene of the auto racing program (of course, at different times) and advertisements 'C' and 'D' also are displayed in the same scene of the auto racing program.

Figure 3A:
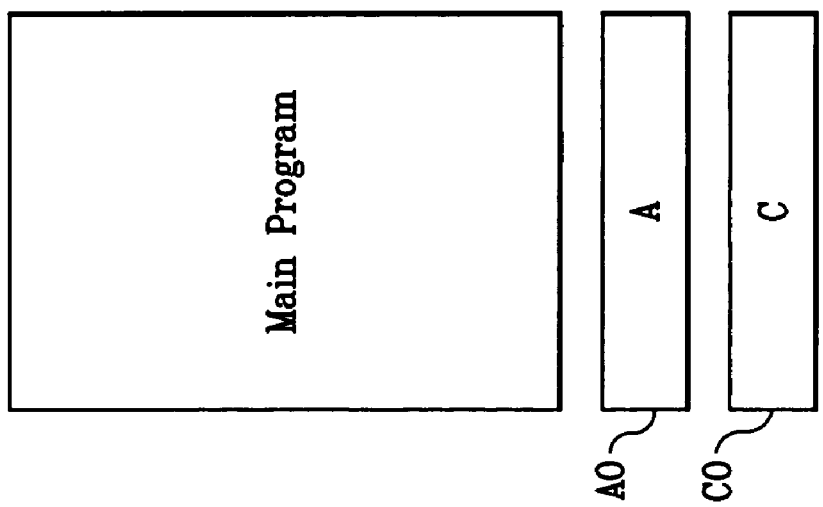

Referring next to FIGS. 3A and 3B of the drawings, the data structure of a game program at two different times of execution (to be discussed) in accordance with an embodiment of the present invention is shown. As shown in FIG. 3A, the game program is comprised of a main program M, which generally represents the entire game program except for advertisement data, and advertisement data A and C, which are stored in memory areas A0 and C0, respectively. Advertisement data A and C represent the commercial advertisements 'A' and 'C' shown in FIGS. 1A and 2A, respectively. Thus, when a game program having the data structure shown in FIG. 3A is executed, commercial advertisement A is displayed in one scene of the auto racing program and advertisement C is displayed in another scene.

FIG. 3B illustrates the data structure of the same game program shown in FIG. 3A, except advertisement data B and D are stored in memory areas A0 and C0, respectively, instead of advertisement data A and C. Thus, when the auto racing program having the data structure shown in FIG. 3B is executed, commercial advertisement B is displayed (see FIG. 1B) in the same scene advertisement A was displayed and commercial advertisement D is displayed (FIG. 2B) in the same scene advertisement C was displayed. If advertisement data A and C in a game program therefore are replaced by advertisement data B and D, respectively, after the purchase thereof, such a game program would be more valuable to the advertisers. It is appreciated that the main program M and the advertisement data stored in memory areas A0 and C0 may be stored in a single memory or in separate memories.

Figure 4:
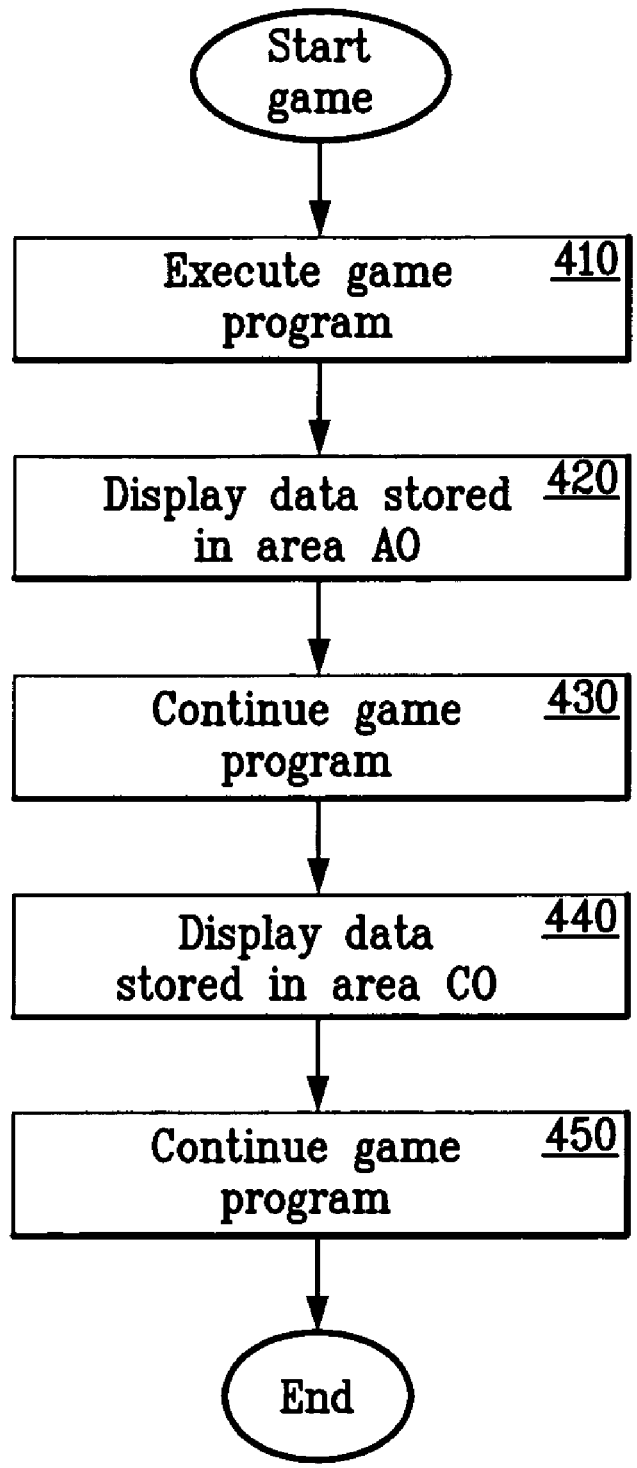
FIG. 4 is a flow chart of the operation of the game system of the present invention.

Referring now to FIG. 4, a flow chart of the operation of a game system in accordance with the present invention is shown. When a home game system is turned on, a game program (e.g., having the data structure shown in FIG. 3A) is executed at step 410 and a sequence of operations is performed in accordance with the program code of main program M. At an appropriate time during the execution of main program M, the advertisement data stored in area A0, for example, advertisement data A, is read therefrom and displayed, such as shown in FIG. 1A, at step 420. If, however, advertisement data B is stored in memory area A0, commercial advertisement B (shown in FIG. 1B) is displayed at step 420. The game program continues at step 430 and, an appropriate time as designated by the game program, the advertisement data stored in memory area C0 is read therefrom and displayed at step 440, such as shown in FIG. 2A. Upon completion of step 440, the game program continues its operation at step 450 until the completion of the program.

FIGS. 5A and 5B schematically illustrate the data structure of a game program in accordance with another embodiment of the present invention in which main program M and all of the advertisement data A, B, C and D stored therein remains unchanged (i.e., 'fixed' data). However, an advertisement selection code S is variable, wherein FIG. 5a illustrates the data structure of a game program having the advertisement selection code $S_{AC}$ which indicates that advertisement data A and C are selected, and FIG. 5B illustrates the data structure of a game program having the advertisement selection code $S_{BD}$ which indicates that advertisement data B and D are selected. Thus, the main program M and all of the advertisement data A, B, C and D are fixed data and only the advertisement selection code S is 'variable' data.

Figure 6:
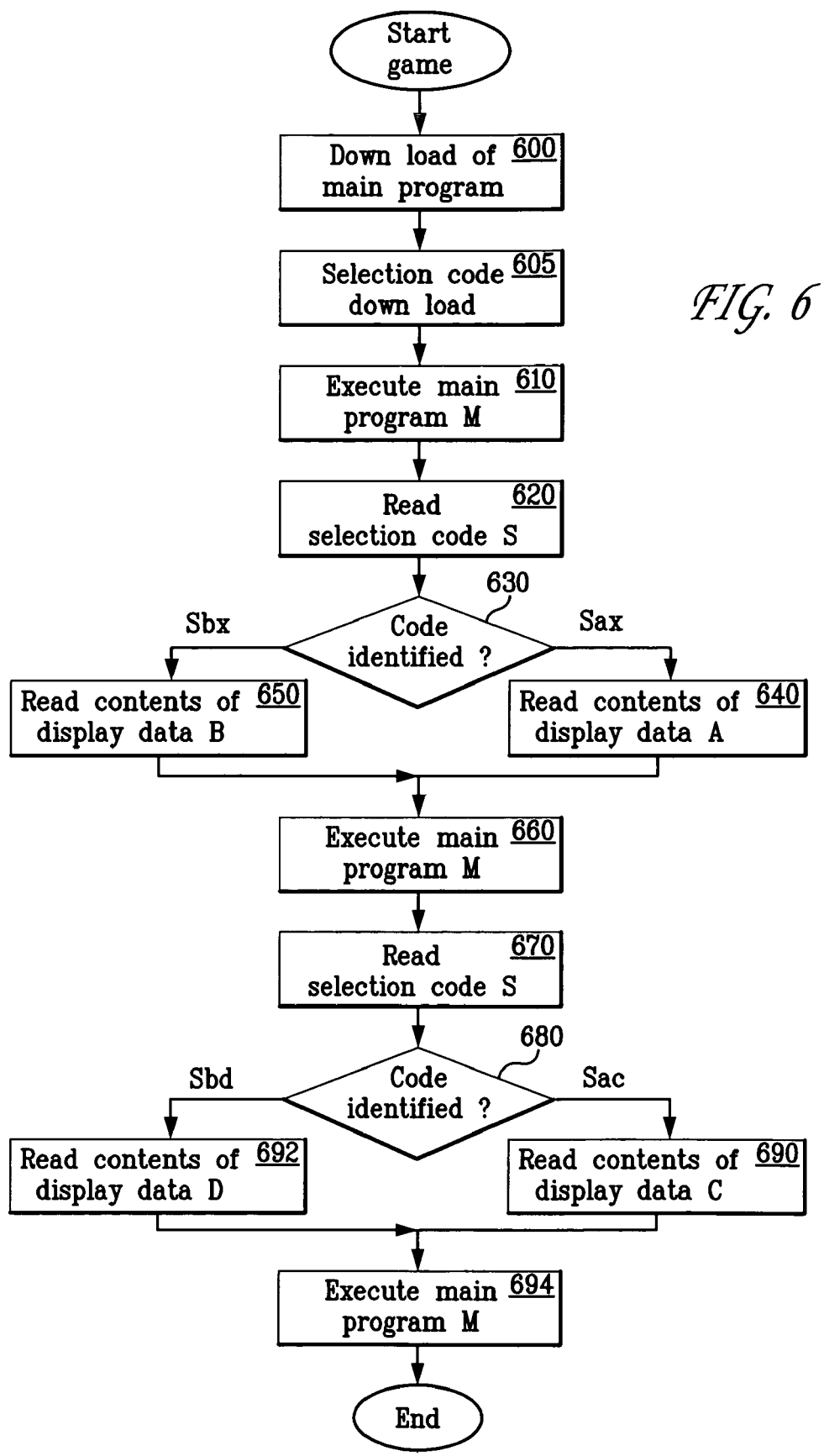
FIG. 6 is a flow chart of the operation of the game system having the data structure shown in FIGS. 5A and 5B in accordance with the present invention.

FIG. 6 is a flow chart illustrating the operation of a game system which executes a game program having a data structure shown in either FIG. 5A or 5B. When a user selects a particular game to be executed, the game system downloads at step 600 from an on-line game system service provider (to be discussed) the fixed data of that particular game, which consists of main program M and advertisement data A, B, C and D shown in FIG. 5A. The main program M and the advertisement data are stored in the game system's memory, typically non-volatile memory. If this fixed data already is stored in the game system's memory, step 600 is not executed. Selection code S is downloaded at step 605, whether or not step 600 is executed, and such selection code S identifies which advertisements are to be displayed during the execution of the game program. Upon downloading of selection code S, main program M is executed at step 610 in a manner similar to step 410 of FIG. 4 and at an appropriate time during the execution of the game program, selection code S is read from the game system's memory at step 620, and the first advertisement to be displayed is identified at step 630. If selection code S identifies commercial 'A' as the first advertisement to be displayed (i.e., $S=S_{ax}$), advertisement data A is read from memory and displayed at step 640. On the other hand, if advertisement B is identified as the first advertisement to be displayed (i.e., $S=S_{bx}$), advertisement data B is read from memory and displayed at step 650. The game program then continues at step 660 and at an appropriate time therein, selection code S is read from memory at step 670 so that the next commercial advertisement to be displayed can be identified at step 680. If advertisement C is identified by selection code S (i.e., $S=S_{xc}$), then advertisement data C is read from memory and subsequently displayed at step 690, but if advertisement D is identified by selection code S (i.e., $S=S_{xd}$), advertisement data D is read from memory and displayed at instruction step 692. The game program then continues at step 694 until completion. As shown in FIG. 6, 'x' in steps 630 and 680 represents a 'do not care' condition since step 630 is identifying only the first commercial advertisement that is to be displayed and step 680 is identifying only the second commercial advertisement that is to be displayed. Furthermore, FIG. 6 is only an exemplary flow chart of the game system of the present invention, and it is appreciated that there may be more than two commercial advertisements identified by selection code S.

Referring back to FIG. 4, prior to the execution of the game program at step 410, the advertisement data stored in memory areas A0 and C0 are downloaded from an on-line game system provider in a manner similar to that performed previously described with reference to FIGS. 5A, 5B and 6. Namely, each time a user wishes to execute a particular game program, the game system downloads advertisement data from an external source and stores the advertisement data in memory areas A0 and C0. Similarly, when a user selects a game program in the game system which operates in the manner shown in FIG. 6, a selection code S, which identifies which advertisements stored in memory are to be displayed during the execution of the game program, is downloaded. However, if the desired game program is not stored in the game system's memory (e.g., on a hard disk, floppy disk, CD ROM, magneto-optical disk, etc.) both of the above-discussed embodiments of the present invention also download the fixed data of the game program. It is seen, therefore, that prior to the execution of a game program on a game system of the present invention, either the particular advertisement data representing the image data of the advertisements that are displayed during the execution of the program are downloaded or the advertisement selection code S is downloaded to the game system. In either case, commercial advertisements are kept 'current,' and since the amount of advertisement data is relatively small compared to the size of the game program itself, the amount of 'download' time is small in the first discussed embodiment. Of course, the download time of advertisement selection code S in the second discussed embodiment is insubstantial.

In accordance with certain embodiments of the present invention, updated or 'new' advertisement data is downloaded or a new advertisement selection code is downloaded each time a game program is executed. However, such data need not be downloaded every time the game program is executed, and instead, may be downloaded only on a new day or a new week (or month) on which the game program is executed. Since commercial advertisements generally do not change multiple times within the same day, downloading such commercial advertisements more than once per day may be unnecessary. In an alternative embodiment of the present invention, commercial advertisement data or advertisement selection code S is downloaded each time the game system is turned on.

Figure 7:
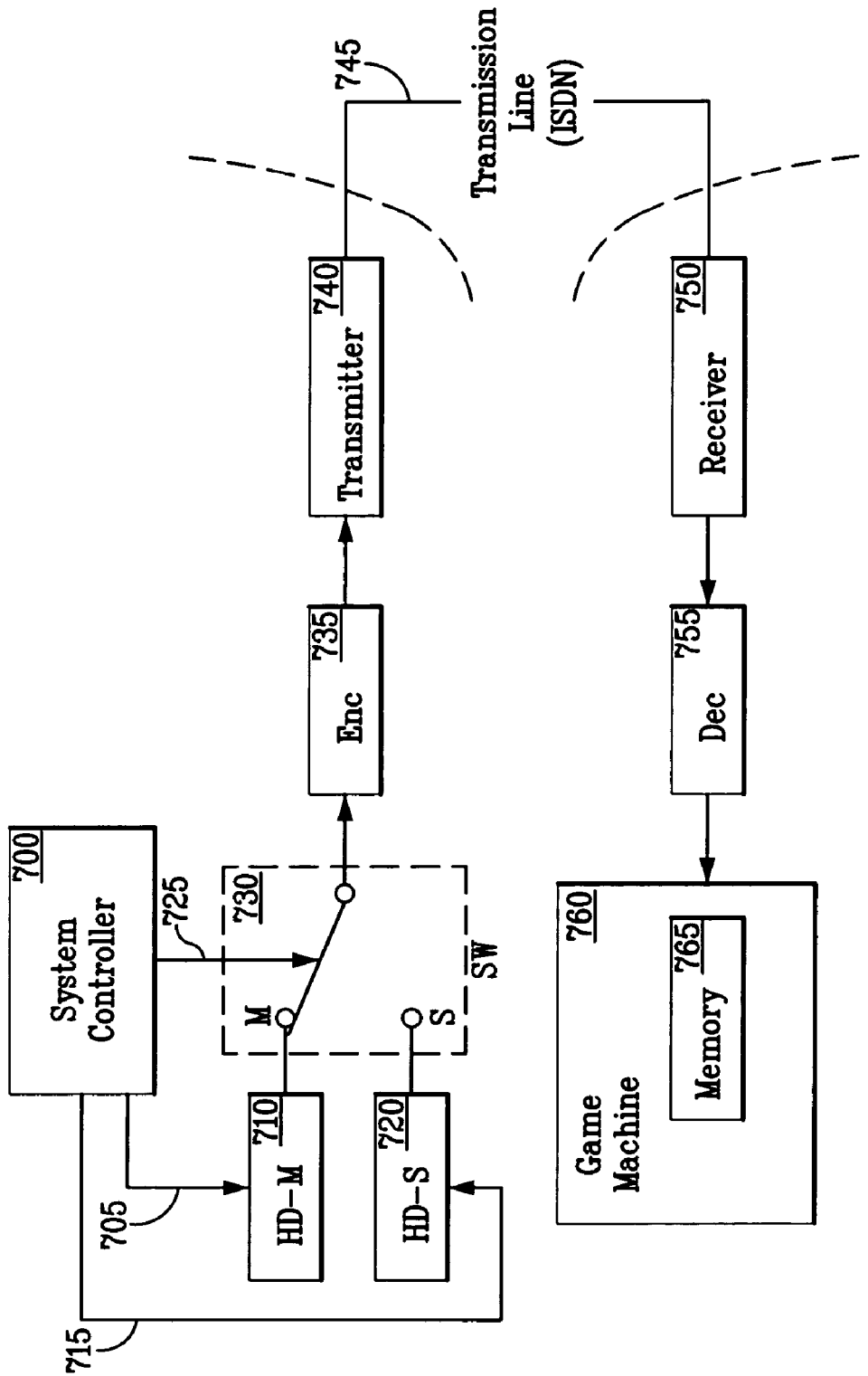
FIG. 7 is a block diagram of both the receiving and transmitting sides of the game system of the present invention.

Referring now to FIG. 7, a block diagram of both the game system (i.e., the receiving side) and a transmission system (i.e., the transmitting side) in accordance with an embodiment of the present invention is shown. The transmission system may be an on-line game system service provider, the game manufacturer itself, a telecommunication company which sells commercial advertisements, or any other suitable system in which the present invention may be applied. The transmission system generally is comprised of a system controller 700, memories 710 and 720 (e.g., hard-disk drives), a switching circuit 730, an encoder 735, and a transmitter 740. The transmission system supplies the main program M of a game and advertisement data to a game system of the present invention which generally is located in the home via a transmission line 745, for example, an ISDN (integrated services digital network), an ordinary telephone line, or any other suitable transmission line. The game system of the present invention generally is comprised of a receiver 750, a decoder 755 and a game machine 760, which includes therein a memory 765, for example, a magneto-optical disk drive or other suitable non-volatile read/write memory.

System controller 700 of the transmitting side shown in FIG. 7 controls memory 710, which stores therein the main program M of a game program, memory 720, which stores therein advertisement data, and switch 730, which switches between the outputs of memories 710 and 720. The advertisement data stored in memory 720 may be changed if it is desired to display a different advertisement when the game program is executed. When main program M is to be downloaded to the game system, in response to a suitable request from the game system, system controller 700 controls memory 710 and switch 730 so that main program M stored in memory 710 is supplied to encoder 735 which encodes the supplied data as is known in the art so that the data is suitable for transmission and supplies the encoded data to transmitter 740 which transmits the encoded data via transmission line 745 to the game system of the present invention. Receiver 750 of the receiving side receives the transmitted signal, decoder 755 decodes the transmitted signal, and game machine 760 stores in memory 765 the decoded signal (i.e., main program M). System controller 700 then controls memory 720 and switch 730 to read out and supply the advertisement data stored in memory 710 so that it may be transmitted to the game system. The advertisement data is received, decoded and stored in memory 765.

When main program M already is stored in memory 765, then only advertisement data stored in memory 720 is transmitted to the game system. As previously mentioned, main program M is stored in memory 710 and advertisement data is stored in memory 720. However, in the previously discussed embodiment described with reference to FIGS. 5A, 5B and 6, main program M as well as advertisement data A, B, C and D are stored in memory 710 and only advertisement selection code S is stored in memory 720. Therefore, only advertisement selection code S is transmitted to the game system when main program M and the advertisement data (i.e., the fixed data) already are stored therein. Memories 710 and 720 may represent different memories of the transmission system or simply different memory locations in the same memory device.

Figure 8:
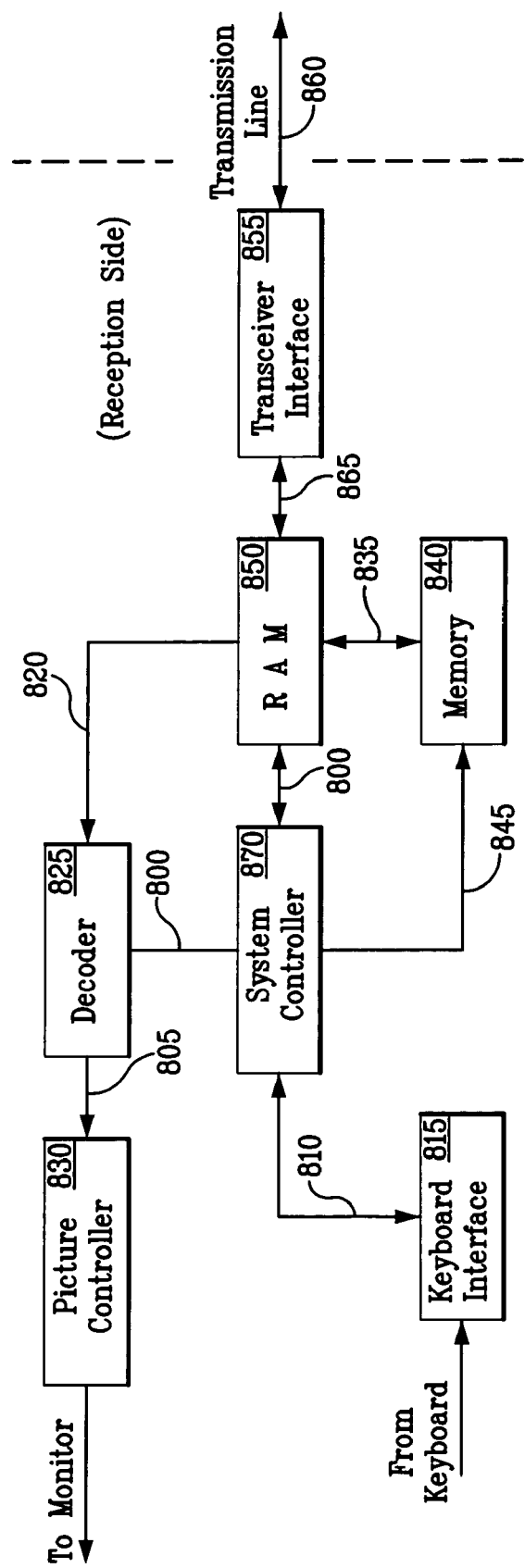
FIG. 8 is a block diagram of the game system in accordance with another embodiment of the present invention.

FIG. 8 is a block diagram of a game system in accordance with another embodiment of the present invention. In this embodiment, a game program stored on a permanent storage medium, for example, an optical disk, is purchased by a user.

The optical disk is inserted in a magneto-optical disk drive 840 (or other suitable reproducing device) which reproduces the game program stored thereon. As shown, the game system is comprised of a transceiver/interface 855, a memory 850, a system controller 870, a keyboard interface 815, a decoder 825, a picture controller 830 and memory 840 which is comprised of the magneto-optical disk drive having the optical disk loaded therein. Identification data stored on the optical disk and which identifies the game program stored thereon is reproduced therefrom and transmitted via transceiver 855 to an on-line game service provider, such as disclosed in FIG. 7. In response to the transmission of the identification data, the service provider transfers to the game system shown in FIG. 8 updated 'variable' data, which either is the advertisement data (i.e., advertisement data A, B, C or D, or any combination thereof) or advertisement selection code S, as previously discussed. The updated variable data is received by transceiver 855 and stored in memory 850. The variable data stored in memory 850 then is stored on the optical disk of memory 840. Alternatively, the variable data is not permanently stored. In either case, the game program stored on the optical disk is not executed until updated commercial advertisement data is supplied from the service provider.

Upon receiving updated commercial advertisement data, the game program is executed and at an appropriate time, the stored data is decoded in decoder 825 and supplied to picture controller 830 which converts the decoded data to a video signal and which supplies the video signal for display on a video monitor (not shown). Furthermore, user commands are entered on a keyboard (not shown) which is coupled to keyboard interface 815 which decodes the supplied commands and which supplies the decoded commands to system controller 870. System controller 870 controls the operations of the various devices of the game system of the present invention in a manner known in the art. Thus, the game system of FIG. 8 is similar to the game system shown in FIG. 7 except main program M (along with advertisement data A, B, C, D in the second discussed embodiment) is not downloaded but is stored on a magneto-optical disk that is purchased by a consumer.

FIG. 9 is a block diagram of a further embodiment of the present invention in which the 'variable' data (i.e., the advertisement data or the advertisement selection code) is supplied to the game system via a satellite transmission. In the embodiment of FIG. 9, the variable data is repeatedly transmitted over a satellite transmission such that the system of FIG. 9 only 'waits' for a relatively short period of time before receiving the variable data that corresponds to the particular game program that has been selected to be executed. When a user inserts in CD ROM drive 960 a CD ROM (or magneto-optical disk) having a game program stored thereon and executes via keyboard interface 950 the game program, a game identification code stored on the CD ROM is reproduced therefrom and supplied to random access memory (RAM) 905 in a manner similar to that previously described with reference to FIG. 8. System controller 940 then ascertains the transmission channel on which the variable data corresponding to the selected game program is transmitted and controls receiver 970 to receive satellite transmissions on the ascertained channel.

FIGS. 10A and 10B illustrate the data structure of data transmitted over two different channels of a satellite transmission. As shown, FIG. 10A shows the data transmitted on a channel G and FIG. 10B shows the data transmitted on a channel H. Channel G includes thereon data corresponding to two game programs J and K, and channel H includes thereon data corresponding to three game programs P, Q and R. If the executed game program corresponds to, for example, game J on channel G, a receiver is controlled to receive data transmitted on channel G, and upon receipt of software identification data J on channel G, advertising data J-1 and J-2 transmitted thereafter are stored in memory as, for example, commercial advertisements A and C, respectively. The advertisement data further may be stored in a non-volatile memory (e.g., a hard disk or M-O disk) so that the advertisement data does not need to be downloaded again in the event of a power failure. Furthermore, the game system may be designed to require that updated advertisement data be downloaded each time the game is executed, or each new day (or week, etc.) on which the game is executed, or each time the system is turned on, or at any other desired interval of time. The game program then is executed in a manner similar to that previously described with reference to FIG. 8.

Figure 11:
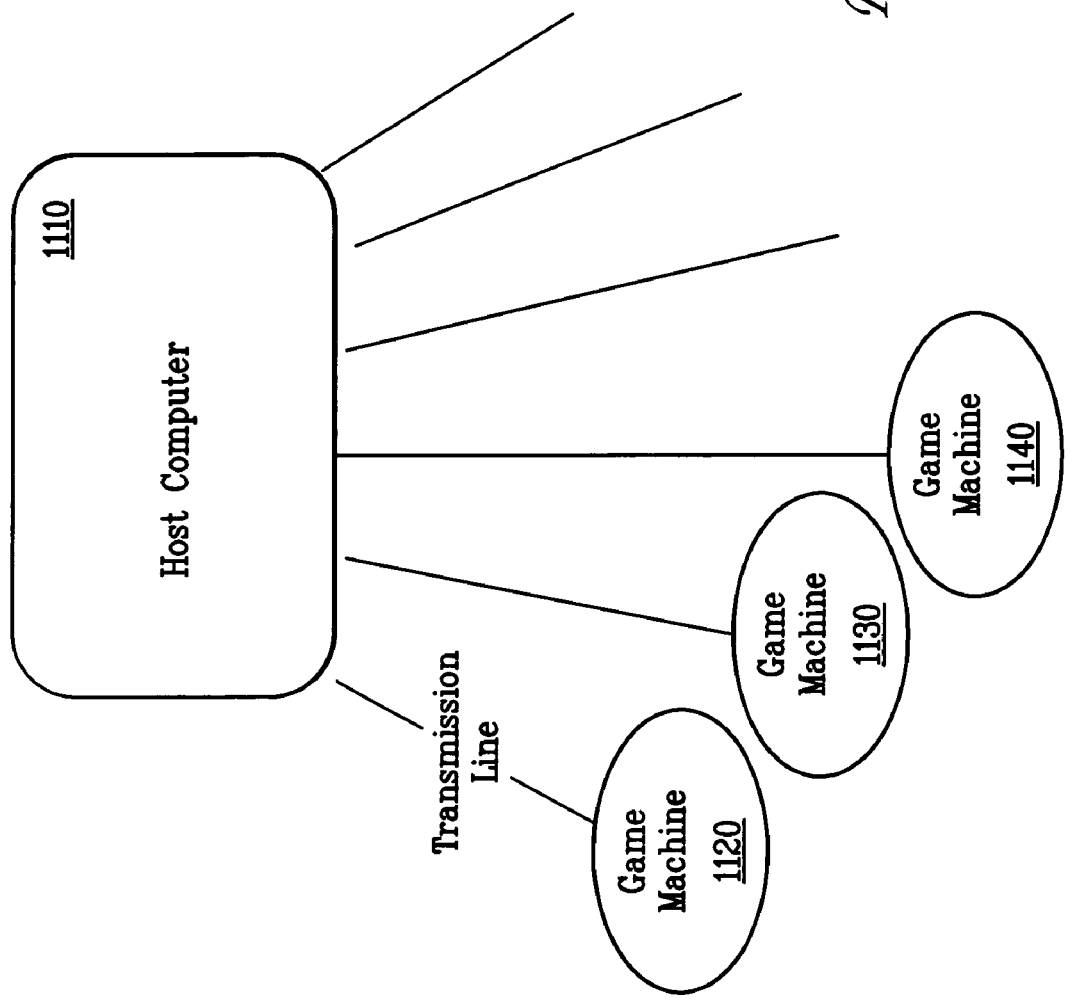
FIG. 11 is a schematic diagram showing multiple game systems which receive game data from a single host computer in accordance with the present invention.

FIG. 11 is a schematic diagram showing a plurality of game systems 1120, 1130, 1140 . . . each interacting with a host computer 1110 (i.e., the game service provider) via plural transmission lines. It is seen that since main program M of a game program is only downloaded to each game system at most one time and since advertisement data or advertisement selection codes have a relatively small amount of data, the transmission thereof is relatively short so that a transmission system generally will be operable to service a relatively large number of home game systems.

In each of the above discussed embodiments, commercial advertisements are updated on a regular basis such that profits made from such advertisements can be expected to substantially increase. Furthermore, since the amount of advertisement data that is downloaded to a game system is relatively small compared to the amount of data in a game program, download times are relatively short. Still further, the game system shown in FIG. 9 operates to download updated advertisement data in a manner that is transparent to a user of such game system.

While embodiments of the present invention has been particularly shown and described in conjunction with the embodiments thereof, it will be readily appreciated by those of ordinary skill in the art that various changes may be made without departing from the spirit and scope of the invention. For example, although the present invention has been described as displaying two commercial advertisements from a selection of four advertisements, the present invention is not limited to this number of advertisements and may be applied to game programs that display a relatively large number of advertisements during the execution of a particular game.

As another example, although the present discussion is directed to home game systems, the present invention is not limited solely to the home and may be widely applied to game systems located in other locales, including game arcades and companies.

Enabling Optional Customer Election of Auxiliary Content

FIG. 12 shows the configuration of a system for enabling display of primary media content, along with optional display of auxiliary media content, according to an embodiment of the present invention. The term 'primary media content' in the context of the specification and claims shall be understood to refer to a collection of downloadable contents which may consist of any one of video linear streaming data, such as a motion picture in the MPEG2 format, linear audio streaming data such as MP3 data, binary program data or any combination of such data. On the other hand, excluded from the definition of 'primary media content' are services which are used solely to provide access to a network, for example browser software or protocol handlers whose main function is only to establish a network connection.

As shown in FIG. 1, the system configuration is made up of a server side system comprising a download service management server 1210, a customer database 1220 and a contents database 1230, which are interconnected by a local area network (LAN) 1240. The 'primary media content' as described in the preceding paragraph is stored in a contents database 1230 which makes up part of the server side system. The customer database 1220 stores a collection of data about individual customers who access the download service through a bi-directional network 1250. The data for individual customers may consist of the customer's name, home address, age, gender, occupation, income, hobbies and interests, information about family members, purchasing history, preference of gender in contents viewed, or any other descriptive information about a user which may be beneficial to advertisers in targeting auxiliary media to customers.

Further, such customer data is not static, but is updateable based on a user's access history of the primary contents data, for example data concerning which primary contents are accessed and/or how many times a given category (e.g. type of music, genre of movies, etc.) of primary contents are accessed may be recorded and used for updating the customer data, thereby enabling advertisers to tailor their advertisements more effectively to a given customer.

The download service management server 1210 is a server system which is set up to handle download requests from a user. Access to the server 1210, which may comprise one of several servers, is facilitated through a typical device known as a router (not shown) on the LAN 1240, which directs requests to the download management server 1210. When the server 1210 receives requests from a user, the server executes a download of requested primary media content from the contents database 1230. Along with processing requests for downloading of primary media content, the server 1210 also retrieves the requesting user's customer data from the customer database 1220 and attaches it with the requested primary contents, which are then transmitted via the network by means of a known networking protocol standard, such as FTP (file transfer protocol).

The network 1250 is normally a bi-directional digital communications network that connects the user's terminal hardware with the download service management server 10 provided on the server side of the system. With current technologies, a CATV bi-directional network, ISDN or xDSL high speed networks are examples of existing infrastructures enabling the necessary network connections for implementing the present invention.

The client side of the system configuration comprises a modem or network adapter 1260, a networked game console 1270 which utilizes a detachable storage medium 1280 therein, and a TV monitor or any other suitable display means 1290 connected to the game console 1270.

The console 1270 comprises a system having a CPU, such as a personal computer for home use, a video game machine (TV game machine) as a video entertainment system, a set-top box, or a personal digital assistant such as a cellular phone.

If the game console 1270 is a portable digital assistant 1270*a* such as a cellular phone having a liquid crystal display 1271 and a data transmission function via the network 1250, it is preferable to use a semiconductor memory card 1280*a* as the storage media 1280 since the semiconductor memory card 1280*a* is compact in comparison with a CD-ROM or a DVD.

Alternatively, the personal digital assistant 1270*a* can be connected to a CD-ROM drive or a DVD drive to function as the game console 1270. Within the knowledge of those skilled in the art, any suitable compact mass storage package media can be used as the storage media 1280.

More specifically, the modem/network adapter 1260 is a typical device used to connect the client's terminal hardware, in this case the game console 1270, for hook-up to the network 1250. For example, for a CATV network, a known cable modem device may be used, whereas for an ISDN network, a device known as a terminal adapter is used.

The detachable storage media 1280 stores a collection of interactive or non-interactive auxiliary content, for example advertisements which may be made up of video images, animations, sounds, applets, etc. In the preferred embodiment, the detachable storage media 1280 comprises a CD-ROM or DVD disc. Each item of auxiliary content includes appended 'trigger data' which is appended as an access flag to the auxiliary content, as shall be discussed in further detail below.

The networked game console 1270 is a network connectable player of interactive digital contents. Such a game console 1270, according to conventional methods, normally utilizes the detachable storage media 1280 as a contents distribution media in a non-networked environment. Stated otherwise, under ordinary use according to conventional known methods, the game console 1270 is capable of playing back media contained on the detachable storage media 1280, which normally is an interactive video game for example, even if the game console 1270 is not is connected to the network. By contrast, according to the present invention, the storage media 1280 is specifically intended to be used in a networked environment and to operate in consort with downloaded primary content retrieved through a network connection, in order to provide linked or associated user-customized auxiliary content.

The network game console 1270 executes therein network access software which is to be loaded from the storage media 1280 or other internal storage medium (not shown), or which may be downloaded from the network, into an internal operating RAM (also not shown), for performing the following operations: (1) communicating with the download service management server 1210; (2) sending media or user identification data to the server in order to retrieve downloadable primary content from the contents database 1230 together with user information from the customer database 1220; (3) accessing auxiliary content stored in the storage media 1280 on the basis of user information downloaded from the server; (4) enabling the user to selectively override the playback of auxiliary content for viewing solely the primary content downloaded from the server; (5) recording a history of the auxiliary content items loaded and played back from the storage media 1280 at the election of the user; and (6) sending or uploading the record of viewed auxiliary content items to the download service management server 1210.

Under operation, the console 1270 receives downloaded primary content together with attached user information, wherein the downloaded primary content may be stored locally on an internal storage media such as a hard disk drive HDD (not shown) or an externally attached re-writable storage medium (not shown) which attaches to the game console 1270 through a port connection. The access software first checks, in accordance with feature 4 above, whether or not the user has elected to disable viewing of auxiliary content or not. If the user has not disabled viewing of auxiliary content, the console then accesses and loads one or more interactive or non-interactive contents which match the downloaded user information and/or the downloaded primary content. More specifically, a comparison is made between the user information and 'trigger data' contained as a header with each piece of auxiliary content, and if data contained in the trigger data match with the user information, the auxiliary content item is then loaded and queued for playback in the console 1270.

That is, the trigger data consists of information corresponding to the above described user information (the customer's name, home address, age, gender, occupation, income, hobbies and interests, information about family members, purchasing history, preference of gender in contents viewed, or the like).

In addition, a given request for specified primary content may also spawn the loading and queuing of auxiliary content. A record of the auxiliary content items actually loaded and played on the console 1270, along with the times and duration during which auxiliary content was played, or any other information obtained during playback of the auxiliary content, may be stored in a data storage area of the console 1270, and is uploaded to the server at any suitable time, such as after a given piece of primary content has been played, after a given piece of auxiliary content has been viewed or partially viewed, or during a sign-off process from the network connection.

The viewed contents record, particularly the times and duration for which a given piece of auxiliary content was viewed, are used as a basis for assessing fees to advertisers who have provided the auxiliary content.

Further the viewed contents record also enables customer information stored in the customer database 1220 to be updated to include new information gained during viewing or interaction between the customer and the auxiliary content.

For example, in the case of an interactive piece of auxiliary content, various questions may be asked of the user, or other user behavior monitored, which can then form part of the viewed contents record and be used for updating information on the customer in the customer database 1220. In the case of non-interactive content, information of which advertisements have been viewed can be used to update customer information.

FIG. 13 is a flowchart which describes sequential functions performed by the primary content server during communication with a networked game console. In addition, FIG. 14 shows a flowchart which describes functions performed by the networked game console during communication with the primary content server. Because the functions shown in FIGS. 13 and 14 occur in a mutually exchanged fashion, these functions shall be described together.

In step 1300 on the server side, the download service manager 1210 receives a request to establish a communication link from the network game console 1270. Similarly, in a step 1400 on the client or networked game console side, a request is sent to establish communication with the download service management server 1210. As a result of these coordinated actions, a network socket connection according to known standards (e.g., IP/TCP) for bi-directional transmission of data packets is established between the management server 1210 and the networked game console 1270.

In step 1410, after the communication link has been established, a unique media ID indicating the media 1280 installed in the game console 1270 is sent to the download service management server 1210. In the event of a first time user, the media ID is associated with the user and is thereafter used as a user identifier. In step 1310 on the server side, the management server 1210 receives the media ID.

After receiving the unique media ID, in step 1320 on the server side, the management server 1210 retrieves, via LAN 1240, user information from the customer database 1220. In the event that user information associated with the media ID (in the case of a new user) does not exist in the customer database 1220, the user may be prompted to supply basic information for establishing initial user information for the customer database 1220. This process shall be described in greater detail in FIG. 16.

At this point, in step 1420 on the game console side, a request is sent to the download management server 1210 to retrieve downloadable primary content from the contents database 1230. When the server receives the user's request for downloadable content in step 1330, the download management server 1210, via LAN 1240, finds and extracts the requested content from the contents database 1230 in step 1340.

At this point, in step 1350, the user information retrieved in step 1320 is attached to the requested primary content extracted in step 1340, and the user information together with the requested primary content are transmitted to the networked game console 1270 in step 1360.

On the client side, in step 1430 the game console 1270 receives the requested primary content along with the attached user information. In accordance with the user information, in step 1440 the game console 1270 searches for and finds one or more auxiliary content items 1550 (see FIG. 15) stored on the detachable storage media 1280 which correspond with the user information. More specifically, a comparison is made between various data contained in the user information, which may also include information of the currently requested primary content, and trigger data 1560 appended with each of the auxiliary contents 1550, and for those items for which a match is found, the auxiliary contents 1550 are extracted. As shall be explained in more detail in relation to FIG. 16, the user is given the option of overriding playback of the auxiliary content, however, assuming playback is authorized, the auxiliary content items 1550 are loaded and executed for playback along with the primary content.

In step 1450, a record of all the auxiliary content items which have actually been viewed by the customer is stored in an internal memory (not shown) of the game console 1270. Such a record may comprise an identifier of the auxiliary content items which were viewed, and the duration for which an auxiliary content item was viewed if it was not played in its entirety.

In step 1460, the game console 1270 sends the record established in step 1450 to the download management server 1210, which in turn receives the playback record in step 1370. The transmission of this record may be made in any of various ways, for example as a comprehensive record at the end of user activity which is uploaded to the server during a sign-off procedure, or intermittently as each auxiliary content item is viewed. As discussed above, the playback record, which is stored in the customer database 1220 in step 1380, provides valuable feedback information to auxiliary content providers, such as advertisers, as to whether the auxiliary content was effective for a given target audience, and may also be used as a basis for assessing fees to the auxiliary content providers.

FIG. 15 is a diagram of data contents 1500 contained on a detachable storage media 1280 inserted in the game console 1270.

As shown schematically therein, the storage media 1280 stores data comprising auxiliary content (AUX. CONTENT) 1510 to be viewed by the user of the game console, wherein the auxiliary content 1510 is made up of a plurality of content items 1550 (Content 1, Content 2 . . . Content N) each with an appended set of trigger data 1560. The storage media 1280 further holds a unique MEDIA ID section 1520, which serves for identifying the detachable storage media itself (such as an alphanumeric CD-ROM/DVD serial number) and which also establishes a user identifier for the user who utilizes the storage media 1280 in the game console 1270, and an authentication code (AUTH. CODE) 1530 which is used for authenticating access to the download service manager 1210.

It is conceivable that the MEDIA ID and the authentication code could be the same, although preferably the functions of server access and media/customer identification are facilitated by separate codes. Alternatively, the MEDIA ID section 1520 may comprise a software program which generates a unique user identifier in association with a prompt for user input of initial user data, such as the name, address, etc. of the user. It shall be understood that once the MEDIA ID 1520 becomes associated with user information, the MEDIA ID 1520 serves as a user identifier, so these terms may be used interchangeably hereinafter.

The USER ID 1520 and AUTH. CODE 1530 also serve jointly as an enabling key through which access to given primary content is authorized by the content server 1210. More specifically, when the MEDIA ID 1520 is uploaded to the server 1210, on the basis of the MEDIA ID 1520, the server 1210 can determine which primary contents, from among multiple contents in the content database 1230, are authorized for access to the user on the basis of the user identifier.

Should such a media identifier not be present, or be deemed to be incorrect or outdated, access to the content server 1210 is suspended. Thus, the correct storage media 1280 must be present in the game console, and a correct and non-outdated media identifier must be determined, in order for access to the server 1210 to be authorized. Another possibility is that the authorization code 1530 provides access to a given server dedicated for downloading of specified primary content from among multiple contents in the contents database 1230.

The storage media 1280 additionally contains a NET ACCESS indicator 1540 so that the storage media 1280 can be used for interaction with a server in a networked environment. The NET ACCESS indicator 1540 may itself comprise network access software which enables the necessary network connection, or may simply comprise a flag indicating that network software residing in the game console 1270 should be loaded and executed. In the latter case, the network software residing in the game console 1270 may comprise a small program for establishing a minimal network connection to enable more versatile network software to be downloaded from the server and executed in the game console 1270.

FIG. 16 is a process diagram describing steps undertaken in the networked game console 1270 prior to and during a network connection with the primary content server 1210.

In step 1600 when the game console is turned on, a standard boot sequence is initiated through an internal BIOS for enabling essential communications between peripheral devices and the like, whereby the system is initialized for operation by the user.

When a detachable media 1280 such as a CD-ROM or DVD disc is inserted in the game console 1270, in step 1605 the system scans the media 1280 to determine whether the data content thereon is intended for operation in a networked environment. This is done by checking whether a NET ACCESS indicator 1540, as described above, is present on the media 1280 or not.

Next, in step 1610, if it is determined that the detachable media 1280 does not contain a NET ACCESS indicator 1540 (i.e., that the media is a program intended for operation with the game console alone and not requiring a network connection), then in step 1615 the game console is operated in a normal non-networked mode. However, if the NET ACCESS indicator 1540 is present, then a bi-directional network connection is established in step 1620 as was discussed above in relation to FIG. 13 and FIG. 14. In this case, the authorization code 1530 on the detachable media 1280 is used to enable the network connection.

In step 1625, it is determined in cooperation with the content server 1210 whether or not the customer is a first time user or not. More specifically, upon receipt of the MEDIA ID 1520, the content server 1210 can determine whether this is the first time that the MEDIA ID 1520 has been used to access the system 1210, and if so, will issue a command to the game console 1270 to prompt the user for initial user data as shown in step 1630. At this time, the server 1210 may also establish and store a time/date log file for association with the MEDIA ID 1520 which permits access to the server 1210 with use of the detachable media 1280 for a limited time period only.

In step 1640, the primary content requested by the customer is downloaded into the networked game console 1270 from the content server 1210. As was described in relation to FIGS. 13 and 14, the desired primary content has attached thereto the user information which is associated with the user ID from the customer database 1220. As for determining which primary content is authorized and hence downloadable to a given user, prior to step 1640, the user may be presented with a menu option which displays only those primary content items, from among all items contained in the content database 1230, that are authorized to the user for downloading and viewing, thereby facilitating selection by the user. While menu options may be provided as a function of a menu routine executed from the detachable storage media 1280, on the server side the download management server 1210 is capable of controlling which primary content is downloadable based on the MEDIA ID 1520. In other words, the user cannot request primary content items which are not authorized for the MEDIA ID 1520.

The routine proceeds next to step 1645 for comparing the downloaded customer information with the trigger data 1560 for each of the auxiliary content items, to determine which auxiliary content items shall be loaded and queued for playback.

In step 1650, the system checks to see whether the user has elected to permit playback of auxiliary content contained on the detachable storage media 1280. The ability to optionally choose or disable playback of auxiliary content can be provided by means of a control button on the game console, and such ability is generally made constantly available to the user at any time before or during playback of the requested primary content.

If playback of auxiliary content is disabled, in step 1655 the primary content only is executed by the game console 1270 for viewing by the user. However, assuming the customer permits playback of auxiliary content, the routine proceeds to step 1660 wherein the applicable auxiliary content items 1550 determined in step 1645 are loaded and queued for playback.

Upon loading of an auxiliary content item, in step 1665 the game console 1270 makes a record in an internal storage area (not shown) that a given auxiliary content item has been readied for viewing by the customer, and upon execution of the auxiliary content, an on-board timer (also not shown) may be initiated to keep track of the time during which the auxiliary content items are played back. By means of a control loop back to step 1650, the system continuously polls whether the user has enabled or disabled the auxiliary content. Assuming the user does not disable the auxiliary content during playback, it may be assumed that the auxiliary content item was viewed or interacted with in its entirety. However, should the user disable the auxiliary content during playback of a given auxiliary content item, the time at which the disablement occurred and the auxiliary content item being played back at that time are recorded. The playback record is also important in the event the user disables and then re-enables the auxiliary content, in which case the record provides an indication of which auxiliary content item was being viewed at the time of disablement, and thus allows the auxiliary content to be reinitiated at the content item where it last left off, in which case the playback record is updated.

Then roughly simultaneously with step 1649, the auxiliary content is executed for playback along with the requested primary content in step 1670. It shall be understood that various modes for execution of auxiliary and primary content can be contemplated within the knowledge of persons skilled in the art. For example, the auxiliary content can be played back before the running of the primary content, so that the user is not permitted to view the primary content until after the auxiliary content has been viewed, or otherwise run its course, for example by interaction with the user in the case of interactive content. Alternatively, the auxiliary content can be presented alongside with the primary content, for example in a window, inset, banner or frame, while the primary content is also being executed. Interaction between primary and auxiliary content is also possible. For example, in the case where the primary content is an interactive game, the appearance of a character, scene or other data item in the primary content can be used to trigger actions in the auxiliary content.

FIG. 17 is a diagram describing an exemplary business model implemented according to the teachings of the present invention. The basic business model supposes two conditions. First, that the downloadable primary content 1710 from the contents database 1230 comprises a popular interactive game, movie, music or any other digital content worth paying for. Secondly, the content items stored on the detachable storage media 1280 are typically advertisements from various auxiliary content providers 1700 who are typically commercial companies or the like. In this case, if the user 1720 elects to view the auxiliary content provided on the detachable storage media 1280 along with the primary content 1710, the fee 1730a for the downloadable primary content 1710 can be paid to the download service operator by the auxiliary content provider 1700.

Alternatively (as indicated by the dashed line in FIG. 17), if the user 1720 decides to skip the auxiliary content, as described in step 1650 of FIG. 16, a fee 1703b to the download service operator for the primary content 1710 will be charged to the user. Thus, the user 1720 does not have to pay a fee to the download service operator as long as the user 1720 views the customized auxiliary content (triggered by the user's personal information) contained on the storage media 1280.

Based on the playback record which is created in step 1665 of FIG. 16 and uploaded to the download service provider, the download service operator can collect fees both from the user 1720 and/or auxiliary content providers 1700 based on the amount of secondary content viewed by the user 1720.

It is significant not only that the auxiliary content is provided through a detachable storage media 1280 but also that the system enables a pairing or linkage between the auxiliary content on the storage media 1280 and specified downloadable primary content 1710, and wherein, by means of key data on the storage media 1280, the storage media 80 provides the avenue of access to the primary content 1710.

In this manner, auxiliary content providers, typically advertisers, are able to direct the detachable media 1280 to customers whose motivation will be to access valuable and popular primary media content, whereas the primary content provider, through the key, can additionally control access to primary content based on a specified time period during which the storage media 1280 can be used.

Further, in addition to being motivated to use the detachable media 1280 to access popular primary media content, customers may feel less reluctant to offer personal identifying information if the impression is that the information is being collected by, and maintained under the control of, a well known primary content provider, as opposed to lesser known advertisers.

The system can also enable a two-tiered method of advertising, wherein the download server operator can require forced viewing of advertisements sent directly along with the primary content, whereas advertisements from auxiliary content providers 1280 are provided on an optional basis to the user 1720, thereby increasing the versatility of the system as an advertising method.

It shall be understood that various modifications will be apparent and can be readily made by persons skilled in the art without departing from the scope and spirit of the present invention. Accordingly, the following claims shall not be limited by the descriptions or illustrations set forth herein, but shall be construed to cover with reasonable breadth all features which may be envisaged as equivalents by those skilled in the art.

As described above, according to the present invention, a storage media such as a CD-ROM containing auxiliary content such as advertisements is installed in a console for accessing a server via a network. When the user views the advertisement, it is made possible for the user to view primary content such as a movie or music downloaded from the server via the network.

In this case, the user has an option as to whether or not to view the auxiliary content. If the user decided to view the auxiliary content, accessing of the primary content at a reduced cost or for free is made possible. If the user decided not to view the auxiliary content, a full fee is assessed for accessing of the primary content.

Providing Auxiliary Content Located on Local Storage During Download/Access of Primary Content Over a Network A system and method for providing auxiliary content located on local storage to a client connected to a content provider over a bi-directional network is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more computers executing software instructions. According to one embodiment of the present invention, server and client computer systems transmit and receive data over a computer network or standard telephone line. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices.

Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers.

FIG. 18 is a block diagram of a computer network system that can be used to locate and transmit requested content from a primary content database while providing designated auxiliary content stored in local storage media, according to embodiments of the present invention. The download management system 1800 of FIG. 18 enables the auxiliary content to be varied based on preferences of system participants during download of primary content over the download management server 1810. Control over the auxiliary content, primary content and/or the download management server 1810 is exercised by a distributor. The auxiliary content provided can be varied based on one or more user preferences, one or more distributor preferences, or a combination of both user and distributor preference information.

FIG. 18 shows the configuration of a system for enabling display of auxiliary content during download of primary content, according to embodiments of the present invention. The term 'primary content' should be understood to refer to a collection of downloadable content which may consist of any one of video linear streaming data, such as a motion picture in the MPEG2 format, linear audio streaming data such as MP3 data, binary program data, including game data, or any combination of such data. This definition is intended to describe the types of data broadly, and is not limited to any specific data formats such as MPEG2 or MP3. On the other hand, excluded from the definition of 'primary content' are data functioning solely to provide access to a network, for example, browser software or protocol handlers, whose main function is only to establish a network connection. 'Auxiliary content' refers to the same types of data. 'Auxiliary' can be distinguished from 'primary' in terms of distributor or advertiser priority, or in terms of the user's priorities or preferences (i.e., one type of content might be more important to a user, and thus 'primary'). In terms of data types, 'primary content' and 'auxiliary content' are coextensive.

With regard to system configuration, as seen in FIG. 18, the download management system 1800 is made up of a server side system comprising a download management server 1810, a primary content database 1860, and a customer database 1870, which are interconnected by a bi-directional network 1830. The download management server 1810 is shown connected directly to the databases 1860, 1870 in this embodiment of the server side system, however server connection to these or comparable databases can be made over any type of network as well. The "primary content" as described in the preceding paragraph is stored in the primary content database 1860. The customer database 1870 contains a collection of data about individual customers who access the download service through the network 1830. The data for individual customers may consist of the customer's name, home address, age, gender, occupation, income, hobbies and interests, information about family members, purchasing history, preference of gender in content viewed, or any other descriptive information about a user which may be beneficial to advertisers in targeting auxiliary content to customers. Further, such customer data is not static, but can be updated based on a user's access history of the primary content data, for example, data concerning which primary content is accessed and/or how many times a given category (e.g. type of music, genre of movies, etc.) of primary content is accessed may be recorded and used for updating the customer data, thereby enabling advertisers to tailor their advertisements more effectively to a given customer.

The download management server 1810 is a server system that is set up to handle download requests from a user. Access to the server 1810, which may comprise one of several servers, is facilitated through a typical device known as a router (not shown) on the network 1830, which directs requests to the download management server 1810. When the server 1810 receives requests from a client console user, the server executes a download of requested primary content from the primary content database 1860. Along with processing requests for downloading of primary content, the server 1810 also retrieves the requesting user's customer data from the customer database 1870 and can attach it with the requested primary content, transmitting both via the network by means of a known networking protocol standard, such as ftp (file transfer protocol).

The network 1830 may be the Internet, a Wide Area Network (WAN), a Local Area Network (LAN), or any combination thereof. The network is normally a bi-directional digital communications network that connects a client's terminal hardware with the download management server 1810. With current technologies, a CATV (cable television) bi-directional network, ISDN (Integrated Services Digital Network), DSL (Digital Subscriber Line), or xDSL high-speed networks are examples of existing network infrastructures enabling the necessary network connections for implementing embodiments of the present invention, though they are not intended to be exclusive as to the types of networks capable of practicing the present invention. In one embodiment, network 1830 may represent the Internet, in which case the server 1810 typically executes a web server process to transmit data in the form of HTML data to client computers executing web browser processes.

As shown in FIG. 18, the download management system 1800 includes a client side made up of a client console 1820 comprising a client 1840, and, optionally, a local storage device 1850 that can include a removable storage media 1852 component The client 1840 can be a personal computer, a set top box, a computer/gaming device such as PlayStation®3, a computing device of comparable capabilities, or any terminal device providing access to the system. The local storage device 1850 can be any conceivable data storage device (e.g., CD- or DVD-ROM, hard disk drive, magnetic, optical or other card drive, zip drive, etc.), and may be, and frequently is, integral with the client 1840 though is depicted here as a distinct element. Additionally, the removable storage media 1852 can be compatible and removable directly with the client 1840; this may be true for embodiments both where the local storage device 1850 is external or where it is internal to client 1840.

According to one preferred embodiment, removable storage media 1852 is specifically intended to be used in a networked environment and to operate in consort with downloaded primary content retrieved through a network connection, in order to provide linked or associated auxiliary content that is customized based on user and/or distributor preferences. For example, removable storage media 1852 can store a collection of interactive or non-interactive auxiliary content, for example advertisements that may be made up of video images, animations, sounds, applets, etc. In this preferred embodiment, the removable storage media 1852 comprises a CD-ROM disc or DVD disc. Moreover, each item of auxiliary content can include appended "trigger data" which is appended as an access flag to the auxiliary content, as shall be discussed in further detail below.

FIG. 19 is a flowchart that illustrates some download management server steps taken in providing the desired auxiliary content during download of primary content, according to one embodiment of the present invention. Execution of this download management process requires the receipt of necessary user identification and requested content information, as well as the transmission of requested content to the client console. Once a user desires to download primary content, the user will make association with the client terminal 1840 portion of the client console 1820 (FIG. 18). The subsequent steps that the download management server goes through to provide both the primary and auxiliary content, as shown herein, begin after this initial step of the user associating him or herself with the client console.

According to the embodiment of FIG. 19, a download management server first performs the step of establishing communication with a networked client console, step 1910. Here, as best seen in FIG. 18, the communication is indicated as being established with a client console 1820, however, it should be understood that this term is interchangeable with client 1840 (the client terminal) throughout these discussions for the purpose of disclosing other embodiments not limited by a definable client console. Once communication has been established with the client console, the download management server then receives a user ID from the client console, step 1920, for the initial purpose of identifying the particular user.

Next, in step 1930 of this embodiment, the download management server retrieves user information from the customer database; this user information consisting of the data for individual customers discussed above with respect to FIG. 18. The download management server then proceeds to step 1940 where the user's request for content is received. After receiving such user request information, in step 1950, the download management server finds the requested content from the primary content database.

In the subsequent step, step 1960, the download management server sends the requested content to the client console. After such sending of requested content, in step 1970, the download management server verifies whether all of the requested content has been sent. If all of the requested content has not been sent, the server will maintain a state of sending the requested content to the client console. Once all of the content has been sent, however, the download management server moves on to the final operation. The last operation of this embodiment is simply the release of communication between the download management server and the client console, step 1980.

FIG. 20 is a flowchart that illustrates some client-side steps taken in providing the desired auxiliary content during download of primary content, according to one embodiment of the present invention. The preliminary steps of this client-side process mirror the comparable steps of FIG. 19 as they occur in a mutually exchanged fashion, and also begin with the user making association with the client 1840 portion of the client console 1820 (FIG. 18) with the desire to download primary content The subsequent steps of FIG. 20, then, also begin after this initial step of the user associating him or herself with the client console.

Correspondingly, the first three steps of FIG. 20, establishing communication, step 2010, sending a user ID, step 2020, and sending user request for primary content, step 2030, are client side steps describing behavior done with the download management server that precisely mirror steps 1910, 1920 and 1940 from FIG. 19, and no additional description is warranted. The next client side step, step 2040, is to begin playing auxiliary content stored in the local storage device. The auxiliary content played as a result of this step can be default auxiliary content or can be selected according to preferences and procedures originating on the client side in the client console; additionally, the auxiliary content can be dictating by distributor preferences and procedures transmitted over the network immediately prior to provision of the auxiliary content As a specific example of such client side procedure, a comparison can be made between various data contained in the user information, which may also include information of the currently requested primary content, and trigger data appended with each of the auxiliary content, and for those items for which a match is found, the auxiliary content is extracted. The auxiliary content items are then played/executed along with the primary content.

The client console then receives the requested primary content, as shown in step 2050. After receiving such content, in step 2060, the client verifies whether all of the requested primary content has been sent. If all of the requested primary content has not been sent, the client console will maintain a state of receiving the requested content from the download management server. Once all of the content has been sent, however, the client moves on to the final two operations. First, the client stops playing the auxiliary content stored in the local storage device, step 2070, then, in final step 2080, the communication with the download management server is released.

During operation of the preferred embodiments, the client console 1820 receives and downloads the designated primary content, wherein the downloaded primary content is stored on the local storage media such as a hard disk drive HDD or any conceivable externally attached re-writable storage medium, as discussed above. The auxiliary content to be provided during download can be: (1) static content specifically associated with the primary content, (2) content variable based on user or distributor preferences, as detailed immediately below, and/or (3) variable content selected on either the server side or the client side, as described in more detail further below.

In these preferred embodiments, the auxiliary content provided can be varied based on one or more user preferences, one or more distributor preferences, or a combination of both user and distributor preference information. With respect to user preferences, either previously acquired information is used or the user is prompted to chose from a selection of specific content items and categories of content; default content is provided if no user preferences are available/selected. With respect to distributor preferences, the download management server sends the user auxiliary content assignment data before sending the requested primary content; according to the data, the client computer executes the appropriate auxiliary content stored in the local storage.

In all of the embodiments, the content may be separated into categories to facilitate selection of the appropriate content for particular users, and for other functionality. For example, the content might be categorized into: (1) images, movie data, and other audiovisual content, (2) music, (3) games, such as video game software, (4) customer surveys, and/or (5) lots, or related interactive polling data. With regard to such customer surveys and lots, the interactive user results are sent to the download management server, and can be used to various advantages, such as to assist in the selection of auxiliary content or to obtain updated customer profiles.

During operation of another preferred embodiment, the client console 1820 receives downloaded primary content together with attached user information that is acquired by the download management server by means of a user identification code (as described in more detail below). The user identification code may provide data sufficient for the download management server to identify the user anywhere from broadly, such as by category of how the user acquired a piece of removable storage media, to very specifically, such as an individual user from a mailing list of such prospective customers. The access software first accesses and loads one or more interactive or non-interactive auxiliary content files which match the downloaded user information and/or the downloaded primary content. More specifically, a comparison is made between the user information and 'trigger data' contained within each piece of auxiliary content, and if data contained in the trigger data match with the user information, the auxiliary content item is then loaded and queued for playback in the client console 1820.

In addition, a given request for specified primary content may also spawn the loading and queuing of specific auxiliary content. Such specific auxiliary content, for example, might be interactive content wherein various questions may be asked of the user or other user behavior monitored, which can then form part of download record and be used for updating information on the customer in the customer database 1870. In the case of non-interactive content, information of which advertisements have been viewed might later be used to update customer information.

In the preferred embodiments, in general, removable storage media 1852 stores data comprising auxiliary content to be viewed by the user of the client console, wherein the auxiliary content is made up of a plurality of content items each with an appended set of trigger data. The removable storage media 1852 can further hold a unique media identification section, which serves for identifying the removable storage media itself (such as an alphanumeric CD-ROM/DVD serial number), and an authentication code which is used for authenticating access to the download management server 1810, and which can also establishes a user identifier for the user who utilizes the removable storage media 1852 in the client console 1820. It is conceivable that the media identification code and the authentication code could be the same, although preferably the functions of server access and storage media/ customer identification are facilitated by separate codes. Alternatively, the media identification section can comprise a software program that generates a unique user identifier in association with a prompt for user input of initial user data, such as the name address, etc. of the user. It should be understood that once the media identification becomes associated with user information, the media identification operates as a user identifier, so these terms might be used interchangeably hereinafter.

In any embodiment, a user identification code and authorization code also serve jointly as an enabling key through which access to given primary content is authorized by the download management server 1810. More specifically, when the media identification code is uploaded to the server 1810, on the basis of this code, the server 1810 can determine which primary content, from among multiple content in the primary content database 1860, are authorized for access to the user on the basis of the user identifier. Should such a media identifier not be present, or be deemed to be incorrect or outdated, access to the primary content is suspended. Thus, the correct removable storage media 1852 must be present in the client console, and a correct and non-outdated removable storage media identifier must be determined, in order for access to the server 1810 to be authorized. Another possibility is that the authorization code provides access to a given server dedicated for downloading of specified primary content from among multiple content in a primary content database 1860.

The removable storage media 1852 can additionally contain a network access data piece indicating that the removable storage media 1852 is intended for interaction with a server in a networked environment. This indicator may itself comprise network access software which enables the necessary network connection, or may simply comprise a flag indicating that network software residing in the client console 1820 should be loaded and executed In the latter case, the network software residing in the client console 1820 may comprise a small program for establishing a minimal network connection to enable more versatile network software to be downloaded from the server and executed in the client console 1820.

In environments where it is desired that only some of the available primary content is downloadable to a given user, the user may be presented with a menu option which displays only those primary content items, from among all items contained in the primary content database 1860, that are authorized to the user for downloading and viewing, thereby facilitating selection by the user. While menu options may be provided as a function of a menu routine executed from the removable storage media 1852, the server side the download management server 1810 is capable of controlling which primary content is downloadable based on the media identification code. In other words, the user cannot request primary content that is not authorized for the applicable media identification code.

In the broadest preferred embodiment, the auxiliary content is executed for playback while the requested primary content is downloading. The auxiliary content stored in the local storage device is played by the client console during download of the primary content until the primary content is finished downloading. It shall be understood that other modes for execution of auxiliary and primary content are to be contemplated within the knowledge of persons skilled in the art. For example, the auxiliary content can be played back before the running of the primary content, so that the user is not permitted to view the primary content until after the auxiliary content has been viewed, or otherwise run its course, for example by interaction with the user in the case of interactive content. Interaction between primary and auxiliary content is also possible. For example, in the case where the primary content is an interactive game, the appearance of a character, scene or other data item in the primary content can be used to trigger actions in the auxiliary content.

It is significant not only that the auxiliary content is provided via removable storage media 1852, but also that the system enables a pairing or linkage between the auxiliary content on the removable storage media 1852 and specified downloadable primary content, and wherein, by means of key data on the storage media, the removable storage media 1852 provides the avenue of access to the primary content. In this manner, auxiliary content providers, typically advertisers, are able to direct removable storage media 1852 to customers whose motivation will be to access valuable and popular primary content, whereas the primary content provider, through the key, can additionally control access to primary content based on a specified time period during which the removable storage media 1852 can be used.

In-Contents Advertising Method

FIG. 21 is a block diagram illustrating an overall system wherein a related server or terminal is connected to a network 2100, such as cable television, a broad-band wireless network, or an optical fiber network, for example. As shown in FIG. 21, connected to the network 2100 are a contents provider system 2120 made up of a contents server 2140 and a system 2130, an advertising agency server 2150 having a database 2160 such as advertisement information data and the like for configuring an advertisement information creating system, terminals 2170-1 through 2170-N which are terminals of a contents providing company such as a game software company or the like, advertiser terminals 2180-1 through 2180-N, user terminals 2190-1 through 2190-N, a bank server 2110, and an advertisement creating company server 2111.

Now, the contents server 2140 is for distributing digital contents requested from users 2190-1 through 2190-N, and stores massive amounts of contents digital contents produced by authoring at the contents providing company 2170-1 through 2170-N, e.g., contents such as games or the like.

The overall system will be described with reference to FIG. 22. The contents providing company 2170-1 through 2170-N provides the advertising agency server with advertisement structure information indicating portions and time slots in which advertisements can be inserted, demonstration information, etc. ((1) providing advertisement structure information), and this is registered in the database 2160 of the advertising agency server 2150. The advertising agency server 2150 directly informs the advertiser terminals 2180-1 through 2180-N of the advertisement informing information such as 'title,' 'contents,' etc., of a newly-registered title, by mail or otherwise ((2) informing).

The advertiser 2180-1 through 2180-N can access the advertising agency server 2150, and can view the advertisement informing information ((3) viewing), and further apply for advertising from the browser screen ((4) application). Once the advertisers have been decided upon, advertiser specified information such as 'advertiser name,' time slot, and time period, are notified to the contents providing company terminals 2170-1 through 2170-N from the advertising agency server 2150 by mail or the like ((5) notification). Also, advertiser specified information and advertisement structure information are supplied to the server 2111 of the advertisement creating company from the advertising agency server 2150 ((6) ordering). The advertisement creating company creates advertisement information based on the advertiser specified information and advertisement structure information. The completed advertisement information such as bitmap data or the like is delivered from the server 2111 of the advertisement creating company to the advertising agency server 2150 ((7) delivery).

Next, the fact that the advertisement has been completed is notified from the advertising agency server 2150 to the advertiser via the terminals 2180-1 through 2180-N, by mail or the like ((8) notification). The advertiser can view the completed advertisement information on the advertising agency server 2150 via the terminals 2180-1 through 2180-N ((9) viewing).

If the advertiser presses an "OK" button or the like here, the product is delivered and an itinerary is sent from the advertising agency server 2150 to the contents providing company via the contents providing company terminals 2170-1 through 2170-N, by mail or the like. The breakdown of the itinerary is 'advertiser,' 'time slot,' 'period,' 'advertising fees,' and so forth.

The advertising information from the advertising agency server 2150 is provided to the contents providing company via the contents providing company terminals 2170-1 through 2170-N ((10) delivery (itinerary)). At the contents providing company, the advertisement information is merged with digital contents and advertising programs by authoring processing, and then registered in the contents server 2140 of the contents provider 2120 ((11) registration).

The user applies for the contents (e.g., a driving game) using terminals 2190-1 through 2190-N ((12) application), and starts downloading ((13) download). At this time, the contents provider 2140 notifies the advertising agency server 5 of the fact of the download request and the title thereof, etc. The advertising agency server 2150 transmits the advertisement information data corresponding to the received title to the system 2130 of the contents provider 2120. If necessary, the contents provided can update the advertisement information based on the advertising program of the digital contents regarding which downloading has been requested, using received updated advertisement information data.

The user can download the requested digital contents via the user terminals 2190-1 through 2190-N ((14) advertisement information). After downloading the digital contents, the user activating the digital contents renders the updated advertisement information (delivered in the above step (7)) within the contents, by the updated advertising program added to the contents.

On the other hand, the state of advertisement such as the number of sets of digital contents distributed are notified from the advertising agency server 2150 to the advertiser via the advertiser terminals 2180-1 through 2180-N ((15) notification), and also the same information is notified to the contents providing company via the contents providing company terminals 2170-1 through 2170-N ((16) notification). Further, invoicing of the advertiser and payment amount of the contents providing company based on the same information is notified to the bank by the server 2110. Thus, the bank bills the advertiser, and pays the contents providing company.

The in-contents advertising method, in-contents advertising server, and program-transferring medium for realizing in-contents advertising, according to the present invention can be applied to advertising dealing with networks. Also, according to the present invention, contents such as a driving game or the like are provided from a contents server 2140 of a contents provider to the user, and advertisement information set in the advertisement areas therein is separately provided to the user from the server 2150 of the advertising agency. Accordingly, the advertising information can be readily updated whenever appropriate, without new stamper creation.

Figure 23B:
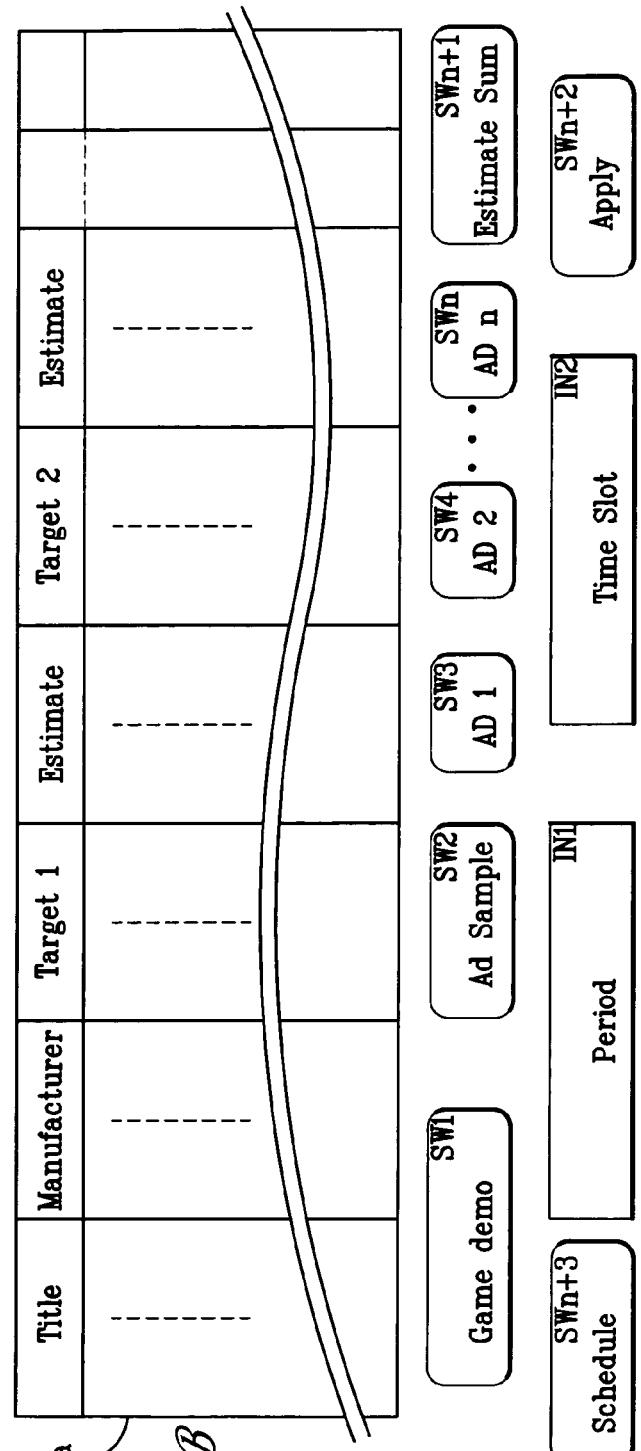

FIGS. 23A and 23B are explanatory diagrams illustrating an example of data configuration of advertisement structure information supplied to the advertising agency server 5 via the contents providing company terminals 2170-1 through 2170-N in the above advertisement information providing step (1).

As shown in FIG. 23A here, the advertisement structure information is made up of a header with the ID of the contents providing company, title, etc., movie data (graphics data of several tens to several hundreds of frames) 2321, a demonstration game program 2322, object data 2323, multiple sets of texture data 2324, and so forth.

Now, the demonstration program 2322 is the actual title program simplified for a demonstration. Also, the object data 2323 is a collection of coordinates values of objects made up of polygon apex data or the like, for example. The texture data 2324 is pattern data of the object data converted from 3-dimensional data to 2-dimensional data by transparent conversion and subsequently written to areas indicated by coordinates value, and in the event that the object data is a racing car, for example, the texture data is the coloring pattern on the body, and so forth.

As shown in FIG. 23A here, advertisement insertable information AD1 is set into the movie 2321 area, advertisement insertable information AD2 is set at the head of the object area, and advertisement insertable information AD3 and AD4 are set to the heads of each texture area. For example, AD1 contains information such as a code indicating that advertisements may be inserted, code indicating that the data is a movie, the number of insertion frames, resolution etc., AD2 contains information such as a code indicating that advertisements may be inserted, code indicating that the data is an object, and AD3 and AD4 each contain information such as a code indicating that advertisements may be inserted, code indicating that the insertion format may be any of all or part of texture, code indicating that the data is texture, the range of the texture in the event of all, the range of the texture in the event of part, and so forth. The advertising agency server 2150 makes reference to this information and thus generates the viewing screen for the advertiser in the above viewing step (3).

FIG. 23B is a screen display example of a screen which the advertiser can view by accessing the advertising agency server 2150. As shown in FIG. 23B here, the display screen is made up of list data Da such as title, manufacturer, advertisement target 1, estimated amount, advertisement target 2, estimated amount, and so forth, and switches and the like displayed below, which are a game demo switch SW1 for executing the game demo, an advertisement sample switch SW2 for showing an advertisement sample, switches SW3 through SWn for specifying advertisement targets 1 through n, and estimate sum switch SWn+1 for calculating and displaying the estimate sum, an input area IN1 for inputting the advertisement carrying period, an input area IN2 for inputting the advertisement carrying time slot, and an applying switch SWn+2 for applying.

In the above applying step (4), the advertiser can watch the game demo and the advertisement sample, select the advertisement object, input the advertisement carrying period and time slot, confirm the estimated sum, and apply, Note that data of the same contents of the above list is formed in the database 2160 of the advertising agency server 2150.

In the event that the advertiser presses the schedule button SWn+3, a schedule SC1 such as shown in FIG. 24 is displayed on a monitor (not shown) connected to the terminals 2180-1 through 2180-N of the advertiser, along with buttons Bu1 through Bun for selecting advertising targets, a monthly schedule SC2 for specifying the month, and a daily schedule SC3 for specifying the day.

The schedule SC1 is made up of time slot, status, and monetary amount. The time slot is in increments of one hour, for example. The status indicates whether or not another advertiser has already applied, with a circle meaning that application can be made, and an X implying that application cannot be made. In other words, an X means that another advertiser has already applied for that time slot.

This schedule is made for each advertisement target. As shown in the Figure, advertising target 1 is selected for the current schedule. Here, the button Bu1 for the advertisement target 1 is displayed in inverse (hatched in the figure). Also, May (hatched) is specified for the month, and the 10th (framed) for the day.

FIG. 25 is a block diagram illustrating one of the user terminals 2190-1 through 2190-N, e.g., 2190-1. As shown in FIG. 25 here, the user terminal 2190-1 comprises a user terminal 2512, monitor 2513, main data storage 2514, sub-data storage 2515, controller 2516, and interface 2517 for network 2100. This terminal 2190-1 is an entertainment system represented by home game computers for example, wherein the main data storage 2514 is a hard disk drive or a high-speed optical disk drive or the like, and the sub-data storage 2515 is flash memory. Game data G1 through Gn containing advertisement programs API through APn as shown in FIG. 26 respectively are each stored in the main data storage 2514. The other user terminals 2190-2 through 2190-N are of a similar configuration.

As shown in FIG. 26, the sets of game data G1 through Gn are each made up of a header 2630 of contents providing company name, title, date of sale, etc., and movie data 2631, program data 2632, object data 2633, multiple sets of texture data 2634, advertising program data AP, and so forth. Here, the program data is not a demonstration program like the advertisement structure information, but is an authentic program intended for sale. Also, with regard to the advertising program data, advertisement information is obtained from the advertising agency server 2150 based on the embedded above information indicating that advertisements may be inserted, and the advertisement information is displayed in the game.

Next, with reference to FIG. 27, description will be made the advertising carrying operation of the advertising program in the event that the user has activated contents downloaded to an own terminal 2190-1 through 2190-N.

Once the digital contents such as a game or the like downloaded to the terminals 2190-1 through 2190-N is activated, the advertisement program is activated, in step 2710, judgment is made by the advertisement program whether or not the digital contents have been activated, and in the event that this yields "YES", the flow proceeds to step 2720. In step 2720, the advertising program accesses the server 2150 of the advertising agency, and also in step 2730, makes notification of the title of the digital contents activated on the user terminal 2190-1 through 2190-N, and user address. Thus, the server 5 reads out the advertisement data corresponding to the database 2160, and transfers this to the above address. In step 2740, the user terminal 2190-1 through 2190-N receives the above advertising data under control of the advertising program, records this in the main data storage 2514 (see FIG. 25) in step 2750, and in step 2760 generates a table of information indicating addresses in the main data storage for advertisement data, and the position of the advertisement target, (i.e., information indicating which advertisement insertable information this is, like that shown in FIG. 26).

Once the game starts in step 2770, subsequently in step 2780 judgment is made whether or not the position is the position for inserting advertisement information, and in the event that this yields "YES", in step 2790 the corresponding advertisement data is positioned at the corresponding position in the memory. It is needless to say that this positioning is made at an earlier point in the progression of the game. Also, an arrangement may be made wherein not all advertisement data is obtained at once, but rather a little is obtained at a time as the game progresses. Further, movie data is preferably placed in the main memory or a graphics engine buffer immediately before the game starts, object data is preferably placed in the main memory either immediately before the game starts or before the data is used, and texture data is preferably placed in the main memory or a graphics engine buffer either immediately before the game starts or before the data is used.

Thus, with driving games for example, arrangements can be realized wherein cars the same as cars actually manufactured and sold by the advertiser can be operated by the user, or wherein advertisements of the advertiser are carried on the body of the car operated by the user, and so forth.

Next, with reference to FIG. 28, description will be made regarding operation of the advertising agency server 2150 in the event that advertising data is requested by the advertising program.

In step 2810, judgment is made regarding whether or not there is access from the user terminals 2190-1 through 2190-N, and in the event that this yields "YES", the title of the digital contents and the user address is received from the terminals 2190-1 through 2190-N in step 2820, the database 2160 is referred to in step 2830, advertisement data corresponding to the title is read out in step 2840, the advertisement data is transmitted to the user terminals 2190-1 through 2190-N indicated by the user address received in step 2850, and the transmission record for the advertising data is updated in step 2860. Counting the number of times of updating the transmission record allows measurement of how many advertisements have been viewed to be made, and payment to the contents providing company and billing the advertiser can be calculated based on this value.

Next, carrying advertisements at the time of downloading digital contents will be described with reference to FIG. 29.

In step 2910, the system 2130 of the contents provider 2140 judges whether or not there has been a request for downloading digital contents from the user terminals 2190-1 through 2190-N, and in the event that this yields "YES", the flow proceeds to step 2920, and then notifies the title to the advertising agency server 2150. The advertising agency server 2150 searches the database 2160 for the advertising information data corresponding to the received title, and transmits this to the system 2130 of the contents provider 2120. In step 2930, the system 2130 of the contents provider 2120 receives the downloading advertisement data. In step 2940, once the contents server 2140 starts downloading the digital contents, the system 2130 transmits advertisement information data to the download destination user terminals 2190-1 through 2190-N in step 2950. Thus, a corresponding advertisement is output on the monitor of the downloading user terminals 2190-1 through 2190-N. In step 2960, the system judges whether or not the download from the contents server 2140 has ended, and in the event that this yields "YES", the flow ends, and in the event that this is "NO", the flow proceeds to step 2950 again.

It should be understood that the present invention is by no means restricted to the above-described embodiment. The present invention can take on other forms such as the following variations, for example.

An arrangement may be made wherein the advertising agency server 2150 directly sends advertising information data to the user terminals 2190-1 through 2190-N. In this case, the advertising agency server 2150 needs to receive data indicating starting and ending of downloading from the user terminals 2190-1 through 2190-N, and also receive the title of digital contents, user address requesting the download, etc., from the system 2130 of the contents provider, beforehand.

Though the advertisements in the above example only involved images, it is needless to say that advertisements using audio can be similarly carried.

In the above example, advertisement information is set into the contents each time there is a digital contents download request from the user, but the present invention is not restricted to this. Instead, the advertising information can be updated as necessary regarding advertisement contents, carrying period, etc., based on specifications from the advertiser.

As described above, according to the present invention, an in-contents advertising method, an in-contents advertising server, and a program-transferring medium for realizing in-contents advertising, capable of application to advertising dealing with networks, can be provided.

Further, according to the present invention, an in-contents advertising method, an in-contents advertising server, and a program-transferring medium for realizing in-contents advertising, capable of easily updating the advertisement contents whenever appropriate, can be provided.

Advertising Impression Determination

Embodiments of the presently described advertising systems may also be utilized to provide for the targeting of advertisements. Providing information over a communications network requires proper addressing of that information to an end-user. For example, a network address (e.g., an Internet Protocol address) may be static and assigned to a particular user. Identifying the actual user assigned to this address may be achieved through the network service provider (e.g., an ISP) that is assigned the network address and aware of the address of that user. Alternatively, a user may register with a content provider (e.g., an on-line gaming network), which may require providing specific information (e.g., name, e-mail, billing address and so forth).

In the case of acquiring end-user information from a network provider (e.g., through a commercial information sharing agreement), the acquired information may reflect billing information (i.e., certain geographic information). Similarly, registering with the content provider may reflect certain geographic information of the user (e.g., billing information). As a result of this geographic information, an advertiser may target geographic or region-specific advertisements.

For example, an end-user that resides in Boston may have little interest in receiving information concerning New York Yankee season ticket sales. Similarly, there would likely be little value to advertise a regional product or service such as a restaurant in New York to someone who resides in San Francisco where that product or service is not offered. National advertising campaigns concerning a regional product or service would likely be ineffective relative a return on the advertising investment and may annoy the user receiving those advertisements, because the user may have no interest/access to the product or service being advertised. In contrast, a user in San Francisco might have interest in receiving advertisements related to San Francisco Giants season ticket sales or a concert in the area; that is, geographically relevant advertisements.

By acquiring geographic information of a user (either through direct registration or a service provider), advertisements can be targeted so that the appropriate advertisement is directed to the user. In this way, advertising dollars are ensured a greater return on investment. For example, products localized to Boston are advertised to persons living in the Boston area and products specific to San Francisco are advertised to persons residing in the San Francisco area.

Geographic information may also be inferred from other available information. For example, an IP address may identify a particular region of a country through geo-location. While geo-location via an IP address is not as accurate as explicit registration with a service provider, it provides a greater degree of accuracy than would blind advertisement campaigns. Thus, even dynamic IP addresses that are not consistently associated with any particular user (but instead a service provider who may recycle the address amongst a group of users) may have some advertising value due to geo-location techniques. Geographically-specific advertisements may be provided to the geo-located user, although there remains the possibility that such advertisements may be less accurately targeted than an advertisement with a specific geographic affiliation.

Advertisements may also be more accurately tracked with regard to actual impressions thereby allowing for more accurate determinations of advertising campaign value or proper remuneration to a provider of the advertisement relative those impressions. For example, an advertisement may have 1,000,000 impressions over a 2 week period. While this number may be impressive in a vacuum, when it is learned that 75% of those impressions occurred in a geographic region where the product or service is unavailable, the number of impressions becomes much less valuable. Many of the impressions were wasted on portions of the consuming public that will not or, perhaps even worse, cannot purchase the service or product. Thus, an advertiser can purchase a particular number of impressions with the caveat that those impressions be within a particular geographic region to count against a total overall ad buy.

Direct targeting of users may also take place using variations of the aforementioned identification methodologies. For example, in the registration scenario, a user may provide certain 'likes' or 'dislikes' in a user profile generated during the registration process. A user may indicate favorite sports teams, favorite hobbies, and the like. As a result of the user profile reflecting that a user is a Boston Red Sox fan, the user may be presented with certain advertisements that relate to World Series Memorabilia from the Red Sox 2004 World Series victory, and not a compilation of the New York Yankees World Series victories. Similarly, a user that identifies an affiliation with the San Francisco 49ers may receive 49er related advertisements instead of advertisements related to the Oakland Raiders. Alternative or more generic profile factors may also be implemented and/or utilized as are available and/or relevant to a particular advertiser.

This type of targeted advertising may be extremely useful when a product or service is available nationwide but has limited popularity or sales in particular regions. For example, a product may be available over the Internet (e.g., through Amazon.com) but also available at a number of brick and mortar stores in one particular region of the country (e.g., the West Coast). A user on the East Coast might purchase these products if he was aware of particular sale opportunities or new product releases. If that user does not live on the West Coast where an advertising campaign is in effect, however, they may never receive advertisements related to that product as advertising dollars have been allocated to a in the locale where brick and mortar stores are located. If the East Coast user indicated an affinity for a particular product in a profile, advertisements can be presented to this user via the in-game advertising system 100 even though the user lives in a region where product sales are otherwise low and advertising (in traditional media forms) is low or entirely non-existent. Through such targeted advertising, not only are impressions generated amongst able buyers, but also amongst willing and highly interested buyers making each impression all the more valuable.

Certain learning intelligence may also be implemented to aid in the direct or geographic targeting advertising process. For example, a game user may participate in an on-line baseball league. Registration for that league may be limited solely to a user name and billing information. If the user resides in Southern California, it would be (as a broad-based assumption) unlikely for this game user to be a fan of the Florida Marlins and (as another assumption) probably a fan of the Los Angeles Dodgers or the Anaheim Angels. Such assumptions may prove to be false.

But if the same user, via the on-line baseball league, continually selects the Florida Marlins as his team of choice, an embodiments of the present invention may recognize the repetitive behavior (e.g., the selection of a particular team, or a particular character in a game). Based on the repetitive behavior of the user, an assumptive profile of a user may be generated.

Further, if the user plays the networked/on-line baseball league fifteen times and elects to play with the Marlins fourteen of those times, it would be an intelligent assumption that the user is a Marlins fan even though the user lives in Southern California. As a result, certain advertisements in the game environment may be directed toward fan merchandise for the Florida Marlins, instead of for the Dodgers or a random advertisement.

Such targeted advertising is not limited to favorites or affiliations of the user. Direct targeting may also utilize demographics such as gender, age, and the nature of the game itself. Gender may be specifically identified or presumed based on the content of a video game. Age may be based on a specific identification or a presumption related to the maturity of a particular game. The nature of the game itself may indicate demographic information of the user or relevant advertising content. For example, a sports game may generate sports advertisement whereas role playing games may generate advertisement specific to the nature of the game such as combat or fantasy. Various combinations or subsets of targeted advertising may also be utilized (e.g., age and gender relative a particular genre of video game).

These intelligent determinations or analyses based on various demographics may take place at an advertisement server via an appropriate software module providing for such deductive or intelligent determinations.

It should be noted that the present disclosure describes numerous inventive components that may operate individually or with other inventive components outlined herein. One such inventive component—tracking what advertisements the user sees—involves monitoring the view perspective of the user (e.g., the point-of-view of the game character or of the actual user via a game camera) and calculating when the user has experienced an ad impression. One embodiment of this method further allows for object occlusion detection. Such impression information may then be returned to an ad server or other component of the system.

FIG. 30 illustrates line-of-sight obstacles as may be found in a game environment 3000. FIG. 30 illustrates a game character 3010 (as reflected by the camera icon), an advertisement 3020, one or more obstacles 3030-3080 and line-of-sight 3090 relative the game character 3010 and its current viewing orientation to the advertisement 3020. It should be noted that any references to a game character in the present disclosure is also inclusive of a game camera as to include various points-of-view of the game character of the video game as well as that of the actual user. In one embodiment, the point-of-view is that of the actual user (player) of the video game such that the impression of an advertisement or other information is actually that of the user as would be most like an advertising impression in the real-world. Obstacles 3030-3080 may be representative of any object in the gaming environment 3000. Walls, corners, pillars, objects (e.g., boxes, signs, rows of lockers, doors, etc.), other game characters, opaque glass or even other advertisements (that is, not advertisement 3020) may be representative of the obstacles 3030-3080.

In an ideal advertising environment, game character 3010 and advertisement 3020 would be separated by an unbroken line-of-sight. That is, obstacles 3030-3080 would not break line-of-sight 3090 whereby game character 3010 (and its controlling user through, for example, a first-person game view) would have a full and uninterrupted view of and exposure to advertisement 3020. Such an uninterrupted view of and exposure to advertisement 3020 is desirous in that it provides for an advertising impression most like that as would be encountered in the real-world (e.g., reading a newspaper advertisement, viewing a billboard or attentively viewing a television commercial). That is, persons in the real-world are generally able to view an advertisement (or at least position themselves) such that other objects in the environment do not obscure a view of that advertisement.

But as is shown in FIG. 30, line-of-sight 3090 is interrupted at multiple points by obstacles 3030, 3040 and 3050. Obstacle 3030 may be a stack of boxes whereas obstacle 3040 may be a soda machine while obstacle 3050 may be a corner in a hallway. The exact nature of obstacles 3030, 3040 and 3050 is irrelevant except for the fact that they are interrupting line-of-sight 3090 between game character 3010 and advertisement 3020. Such a scenario as illustrated in FIG. 30 is common in complex game environments such as those offered by role-playing or first-person adventure games, where users navigate through the gaming environment 3000 and the objects that exist therein.

The interruption of the line-of-sight 3090 as caused by obstacles 3030, 3040 and 3050 may partially (or wholly) prevent the character 3010 from viewing the advertisement 3020. Depending on the exact angle of obstacles 3030, 3040 and 3050, the character 3010 may be able to see certain portions of advertisement 3020, but those portions may be minimal compared to the greater portion of the advertisement 3020 obscured by obstacles 3030, 3040 and 3050. In some cases, an advertiser may have paid significant sums of money for the placement of advertisement 3020 in game environment 3000. However, the advertisement 3020 may never be viewed as was intended by the advertiser (e.g., a full-frontal observation of the advertisement 3020 for a given period of time in order to allow the game user controlling game character 3010 to review and comprehend the advertisement 3020). The advertiser may, therefore, have expended certain sums of money with absolutely no end benefit as the user of the game (via character 3010) did not view the advertisement 3020. This lack of an advertisement impression results even though character 3010 is actually standing directly in front of advertisement 3020 and has their line-of-sight 3090 oriented in the same direction.

FIG. 31 illustrates a positional relationship between a game character 3120 and an advertisement 3110 in a game environment 3100, in one embodiment in accordance with the present invention. In FIG. 31, advertisement 3110 is located at a predetermined position in the game environment 3100. This positioning may be along a wall 3150 in the game environment 3100. For example, advertisement 3110 may be a poster advertising an upcoming concert, advertisement 3110 having been pushed into the game environment 3100 by various components of the in-game advertising system 100 (FIG. 1) (e.g., via asset tagging, whereby the relevance or 'freshness' of the advertisement 3110 can be continually updated after the initial release of the game). In the present example, the advertisement 3110 (poster) may be positioned on the wall 3150 of, for example, a record store in the game environment 3100.

The game character 3120 may enter this particular portion of the game environment 3100 (the record store) through, for example, an entryway 3160. As can be seen in FIG. 31, the game character 3120, upon initial entry into the game environment 3100, may be standing directly adjacent to and oriented toward the advertisement 3110. Due to the positioning of the game character 3120 relative the advertisement 3110, however, the game character may not be able to actually see or be exposed to the advertisement 3110 regardless of the orientation of the game character 3120 in the general direction of the poster (advertisement 3110).

The game character's 3120 inability to view the advertisement 3110 in FIG. 31 is a result of the game character 3120 being outside an impression area 3350 defined, in part, by a combination of a first angle $\theta_i$ and a second angle $\theta_r$ relative to a surface vector 3360. The first angle $\theta_i$ is the angle measured from a ray 3170 to the surface normal 3190 ($\theta$) wherein normal incidence is an angle of zero. The second angle $\theta_r$ is the angle measured from a ray 3180 to the surface normal 3190. The second angle $\theta_r$, at least with regard to isotropic surface, is identical to the first angle $\theta_i$ (i.e., $\theta_i=\theta_r$). In FIG. 31, the first angle $\theta_i$ and the second angle $\theta_r$ each have an angle of about $30^\theta$ relative the surface normal 3190.

The surface vector 3360 comprising a unit length (e.g., a distance from the advertisement) further defines the impression area 3350 for a predetermined distance from the surface of the advertisement 3110. The surface vector 3360 relative the advertisement 3110 is defined, for example, as being 20 feet. Absent any obstructions in the impression area 3350, if the game character 3120 is within 20 feet of the advertisement 3110 and within the angles defined by first ray 3170 and second ray 3180 (i.e., +/−30° relative the surface normal 3190), then the game character 3120 is within the impression area 3350.

A user controlling the game character 3120 within the impression area and facing the advertisement 3110 will be able to view the advertisement 3110. That is, an impression will be established for the advertisement 3110 as would normally occur in the real world (e.g., while the user is standing in front of a billboard). Alternatively, if the game character 3120 is not within the impression area 3350 as defined by first ray 3170, second ray 3180 and surface vector 3360, then no impression is generated.

FIG. 32 illustrates a second positional relationship between a game character 3220 and an advertisement 3210 in a game environment 3200, in one embodiment in accordance with the present invention. The game environment 3200 of FIG. 32 is similar to that illustrated in FIG. 31 with the exception of the position of game character 3220. In FIG. 32, game character 3220 is positioned directly in front of and exposed to the advertisement 3210.

An impression area 3230 is defined in a manner similar to that of FIG. 31. That is, a first ray 3270 and a second ray 3280 relative surface normal 3290 in conjunction with surface vector/distance 3240. Because game character 3230 is located within the impression area 3230 of the advertisement 3210, an advertising impression is generated.

FIG. 33A illustrates a positional relationship between a game character 3320 and an advertisement 3330 relative an obstacle 3340 in an impression area 3310 in a game environment 3300, in one embodiment in accordance with the present invention. The impression area 3310 of the game environment 3300 is defined in a manner similar to that described above (e.g., a first and second ray relative a surface normal with a predetermined distance relative the advertisement 3330). Game character 3320 is positioned within the impression area 3310 and the orientation of the line-of-sight of the game character 3320 is toward the advertisement 3330. The line-of-sight from the game character 3320 to the advertisement 3330 is, however, at least partially obscured by the obstacle 3340 within an obstructed area 3345.

With the increased graphic complexity of many video games, placement of objects about a game environment increasingly provides a challenge to creating advertising impressions. For example, in FIG. 33A, due to the position of the game character 3320 relative the obstacle 3340, the game character 3320 cannot view the advertisement 3330. Therefore, no advertising impression is made to the user controlling the game character 3320.

Determining whether a game character falls within an obstructed area can be accomplished by using line-of-sight determination. In FIG. 34, obstructed line-of-sight 3420 is shown between game character 3400 and advertisement 3410, in one embodiment in accordance with the present invention. FIG. 34 also shows unobstructed line-of-sight 3450 between game character 3400 at a different position relative advertisement 3410. The determination of obstruction may be established by testing line-of-sight 3420 (or 3450) between game character 3400 (3400') and advertisement 3410 that passes through a center of obstruction probe 3425.

In some embodiments, obstruction probe 3425 is a spherical object with a predetermined radius r. Obstruction probe 3425 travels along the line of sight 3420 (or 3450) between game character 3400 (3400') and advertisement 3410. If obstruction probe 3425 does not collide with any obstacles, then the line-of-sight between game character 3400 (3400') and advertisement 3410 is unobstructed. If game character 3400 is located in an impression area and oriented toward the advertisement 3410, an impression of the advertisement 3410 is generated. Unobstructed line-of-sight 3450 illustrates the absence of object obstruction between game character 3400' and advertisement 3410, which allows for an advertising impression.

Alternatively, line-of-sight 3420 is obstructed as a result of one or more objects 3430A . . . 3430C, preventing an advertising impression. If the obstruction probe 3425, while traveling along (obstructed) line-of-sight 3420 intersects one or more polygonal sides $3440_a \ldots 3440_c$ of one or more objects $3430_a \ldots 3430_c$, where each of one or more objects $3430_a \ldots 3430_c$ is typically constructed from multiple polygonal sides $3440_a \ldots 3440_c$, then an unobstructed view of the advertisement 3410 relative the game character 3400 is not possible and no advertising impression is generated notwithstanding the presence of the game character 3400 in an impression area. Such a scenario—an obstructed line-of-sight and absence of an advertising impression despite being in an impression area—is illustrated in the aforementioned FIG. 33A.

In some embodiments of the present invention, partial viewing of and exposure to an advertisement may be sufficient to establish an advertising impression. For example, certain trademarks or logos have established a certain degree of notoriety within the purchasing public. For these famous or easily recognizable trademarks or logos, viewing even a portion of the trademark or logo may be sufficient to establish an advertising impression. Similar 'partial viewing impressions' may be acceptable with regard to slogans, celebrities, famous spokespersons, and so forth. In these instances, even though the obstruction probe 3425 may intersect with an object, if the intersection involves only a small percentage of the probe 3425, then a partial impression may be generated. If the object obscures the advertisement in its entirety—100% of the probe 3425 intersects with the object—then no impression is generated.

The radius r of the obstruction probe 3425 may be reduced whereby a collision with a polygonal sides $3440_a \ldots 3440_c$ of one or more objects $3430_a \ldots 3430_c$ may be avoided thus allowing for an unobstructed line-of-sight and, subject to presence in an impression area, establishing an advertising impression. In that regard, the radius r of obstruction probe 3425 may be relative to an advertisement to be viewed. Information relative the setting of radius r may be part of advertising data pushed to a video game environment by the advertising server 350.

In some embodiments of the present invention, especially those involving third-person points-of-view, it may be possible to overcome obstructed lines-of-sight in an effort to create an unobstructed line-of-sight. For example, in an in-game advertising system where payment of advertisement space is made in advance, an advertiser may seek to have their advertisement viewed at any cost. In these instances, a camera tracking the game character may be adjusted to provide an unobstructed line-of-sight to allow for viewing of the advertisement and creating an ad impression. Exemplary systems and methods for providing an unobstructed view of an advertisement or other target are disclosed in U.S. patent application Ser. No. 10/268,495, which is incorporated by reference.

FIG. 33B illustrates a positional relationship between a game character 3370 and an advertisement 3380 relative an obstacle 3390 in an impression area 3360 of a game environment 3350. The impression area 3360 of the game environment 3350 and relative the advertisement 3380 is defined in a manner similar to that of FIGS. 31 and 10 (e.g., a first and second angle relative a surface normal combined with a surface vector). Game character 3370 is positioned within the impression area 3360 but is not in an obstructed area 3395 as would be generated by obstacle 3390 like that described in FIG. 33A. A determination of the lack of an obstruction area 3395 or the game character 3370 not being positioned in an obstruction area 3395 is determined in a manner similar to that as described in FIG. 34. In that regard, an obstruction probe traverses a line-of-sight between the game character 3370 and the advertisement 3380 and does not intersect with a polygonal side of an object. The lack of intersection thus indicates the presence of an unobstructed line-of-sight and the establishment of an advertisement impression resulting from game character's 3370 exposure to the advertisement.

FIG. 35A illustrates the correlation between an impression counter 3560 and the position of a game character 3520 relative an advertisement 3510 in a game environment 3500. Impression counter 3560 measures the time period that the game character 3520 is positioned in impression area 3530 with an unobstructed line-of-sight 3550 relative the advertisement 3510. As can be seen in FIG. 35A, game character 3520 has an unobstructed line-of-sight 3550 of and exposure to advertisement 3510 notwithstanding the presence of object 3540 and obstructed area 3545.

It should be noted that impression counter 3560 is not necessarily a stopwatch or other timing device as depicted in FIG. 35A. Impression counter 3560, in an embodiment of the present invention, is any timing mechanism governed by hardware or software relative an end-user client device 170 (e.g., a gaming console) that may measure the time period that the game character 3520 is positioned in the impression area 3530 with an unobstructed line-of-sight 3550 relative the advertisement 3510 and may utilize various units and/or measurement schemes. In one embodiment, a temporal period is used as a unit of measure (e.g., seconds, fractions of seconds and so forth).

FIG. 35B further illustrates the correlation between an impression counter 3560 and the position of a game character 3520 relative an advertisement 3510 in a game environment 3500. In FIG. 35B, however, the game character 3520 has moved behind the object 3540 and into the obstructed area 3545. Notwithstanding the fact that the game character 3520 remains within the impression area 3530, the game character 3520 has an obstructed line-of-sight 3570 relative advertisement 3510. When the line-of-sight of the game character 3520 relative the advertisement 3510 becomes obstructed (as is reflected in FIG. 35B), the impression counter 3560 terminates. That is, an impression of the advertisement 3510 is no longer being generated as the advertisement 3510 has been obstructed from the game character's 3520 view.

By measuring the length of exposure to an advertisement via impression counter 3560, an advertiser can determine the value of an ad impression or whether an impression has actually been made if the existence of an impression is tied to the duration of presence in the ad impression area (e.g., the time of exposure to the advertisement). For example, a pricing model may be established wherein an advertiser is charged based on the duration of the advertisement impression. The duration of the advertisement impression is reflected by the impression counter 3560. In another pricing model, an advertiser may pay a fee for a certain number of advertisement impressions. An ad impression may be defined as unobstructed exposure to an advertisement for a certain period of time. For example, and as evidenced in FIG. 35B, the game character 3520 is in the defined impression area 3530 but is unable to actually view the advertisement 3510. As such, the advertiser should not have the presence of the game character 3520 in the impression area 3530 with no view of the actual advertisement 3510 constitute an advertisement impression.

The various ad impression determinations may be implemented utilizing software downloads or through software installed on physical media (e.g. a software client on an optical disk) or may be pre-installed in a gaming device. Various modules that interact with the ad impression determination software (e.g., receiving ad impression information for reporting to an advertiser) may be further located in various other aspects of an advertising system (e.g., at ad server).

As noted, various pricing models may be based upon the existence of advertising impressions or the quality thereof. For example, an advertiser may be satisfied knowing that their advertising content has made it into a video game. Another advertiser may be more demanding and require information related to actual impressions. Using the methodology described in FIG. 34 with regard to determining the existence of unobstructed lines-of-sight it may be determined whether the user actually viewed the advertisement.

Even more specific, it may be determined how long the user viewed the advertisement. For example, if a user is merely scanning around the room for an exit or a particular object, their line-of-sight may intersect with the advertisement but the scanning of the room was too quick to allow for any meaningful consideration or understanding of what the advertisement portrayed. In this scenario, a timer may be implemented as was described in FIGS. 35A and 35B.

On an even more detailed level, it may be possible to determine the quality of the impression. For example, a user may view an advertisement as a result of being in an impression area. That user may, however, be on the very far edge of the impression area and have slight difficulty viewing the advertisement. This might be the case if a user is utilizing a later model television or computer monitor or is utilizing a computing device that has lower graphics processing power. Notwithstanding graphics output considerations, it is possible to further delineate the impression area into quality impression areas whereby the advertisement is viewed in every instance but better or worse depending on the exact placement of the game character when viewing the advertisement.

A game character may be face-to-face with an advertisement. The character, while clearly within the impression area, may be so close to the advertisement that he cannot fully view the advertisement or the copy that he can view is blurred because of the close proximity of the character relative the advertisement in the gaming environment. Similarly, a user may be too far away to fully appreciate the advertisement. Through delineating quality impressions, advertisers can appreciate a minimal impression (e.g., up close or almost too far away) but also have certain assurances with regard to quality impressions as may be subject to the particular whims of the advertiser.

Various pricing schemes may be based upon these various levels or quality of impression whereby a general impression is charged at one rate while a higher quality impression is charged at a different rate. Similarly, the length of time a user is in an impression area can be correlated to a pricing model. For example, if a user is in an impression area for 2-seconds, an impression may have been made but possibly a minimal one due to the complexity of the advertisement. If the user is in the impression area for 10-seconds, a greater impression has been made and has greater value to the advertiser. Limits may be imposed on such an impression counter such that an advertiser is not charged for a 30-minute impression when a user happens to position his game character in front of an advertisement and then leave to attend to another task for half-an-hour. Notwithstanding the presence in the impression area for that period of time, a thirty-minute impression has not truly been made as the user of the game (the controller of the character) has not been subjected to that advertising copy.

Traditional economic aspects of supply and demand may also come into play with various pricing models. For example, if a game is released with great fanfare and is a 'must buy for the holiday season,' ad buys in the game may be more expensive. If the game layer proves to be unpopular for a variety of reasons, the pricing levels may decrease to reflect the demand of the game. These determinations as to supply and demand may be made, in part, based on the location and intrinsic value definition of specific tags, the demand for a tag as driven by the number of times tagged assets in a video game are identified during average, peak and off-peak game play thereby resulting in various requests to an advertising server.

Similarly, certain video games may have indicia identifying a distinct owner as a result of a user profile or information embedded on the game or subject to, for example, a network address. An advertiser may also determine that while 1,000 impressions may have occurred for their advertisement on a particular day that almost half of those were related to a small group of users who continually entered a gaming environment where the advertisement was rendered time-and-again versus 1,000 impressions distributed more equally amongst 3000 different, unique game players. The impressions in the latter example are more valuable then the repeated impressions amongst a small group of users in the first example.

Certain embodiments of the exemplary in-game advertising system described in the present invention may also allow for certain interactions with the products advertised in a video game. For example, a game player might approach a vending machine whereby a variety of beverages are available and effectively advertised via their labeling, trademarks or other visual indicia. A user might select a particular beverage for his character to enjoy in the course of the video game by pressing a button on his keypad that corresponds to purchasing a particular beverage from the vending machine. These 'virtual purchases' may be conveyed to advertisers in that the advertisement has not only made an advertising impression in that a user has seen the product or related advertising but taken some sort of positive interaction with the product (e.g., purchasing the product in the video game).

Similar game metrics may be implemented with regard to negative connotations. For example, if four beverages are available, the user's selection of one beverage may reflect negatively as to the other three. By further example, a user may be presented with a vending machine for two competing beverages; if the user takes some action relative one of the vending machines (e.g., destroying it with a weapon), that act too may reflect negatively relative advertising metric information.

Through tracking user interactions with advertisements in a video game environment, the video game effectively becomes a user feedback service similar to an advertising focus group. Feedback may also be registered through explicit interactions wherein a user may expressly provide their opinion of a product or service relative the game environment. For example, the user may be prompted as to their opinion of a particular product; the user may then press 'up' for a positive reflection or 'down' for a negative reflection.

Interactions via, for example, a microphone input are also possible wherein the user provides feedback in connection with the advertisement. Such feedback may be transmitted to an agent on the other end of the communication channel or passed through speech recognition software wherein certain keywords as they relate to a product are recognized and categorized.

To address the feedback features, the impression tracking system may include functions or may interact with functions capable of soliciting or recording user reaction to an advertising campaign. For example, an advertiser may deploy an advertising campaign defined by advertising content that is loaded into a tag with program or pointer to program(s). Such programs may signal the user to perform actions. Other programs may monitor user reaction in and about the advertisement or in response thereto. For example, one such program that may be invoked when accessing a loaded advertisement tag includes a reference to a speech input requirements and definitions.

Advertising beyond the traditional flat, print advertisement may also be implemented utilizing the presently described in-game advertising system. For example, in addition to billboards or single page ad copy, rotating billboards may be utilized wherein triangular panels in the billboard rotate relative to one another thereby effectively providing three-billboards-in-one. The billboard panels then rotate every few seconds to reflect a new advertisement on each panel as occurs in the real-world. In this way, a single game asset can be tagged for multiple advertisement introductions.

Other ads in a game environment may be movable. For example, advertisements may be located on the sides of buses that traverse city streets or a series of flyers that might blow down an alley. Television ads with full motion video and audio ads as might be emitted over a radio or a telephone in a gaming environment are also envisioned as being implemented in the present invention.

Just as certain advertisements have higher demand in the real-world (e.g., high traffic areas), certain advertisements in a video game environment may enjoy higher pricing as a result of high traffic areas. For example, advertisements that appear in the beginning of a video game or a level wherein every user will view the advertisement inherently have more value than an advertisement located in a 'secret Easter Egg' level or extremely difficult level that many users may never reach.

Other embodiments of the present invention may include rewards based on user interaction with particular advertisements. For example, if a user provides actual feedback in a video game environment, the user may receive merchandise, points or coupon rewards from the producer of the product as an appreciation for their opinion. Such information concerning where to send a reward may be expressly provided during a feedback session or as a result of an association with a user profile. This latter case would be valuable wherein points or rewards are offered for less explicit interactions (e.g., not in response to an advertiser/feedback query) such as casual interactions or favorable behavior relative an advertised product and points or rewards accumulate over time.

Advertisements, especially those ads that are audible in nature or are full motion video, may be subject to real-time limitations. For example, a user in a video game may be changing the channels of a television in the video game environment. If the user only watches two seconds of the advertisement, an impression may or may not be generated. Such limitations in the case of real-time advertising may be subject not only to an impression area but also an impression time and even an impression time relative particular portions of the advertisement.

For example, an advertisement may be thirty-seconds in length but the first five-seconds do not indicate the nature of the product and the last five-seconds concern legal boilerplate required by the particular advertisement. If an impression time is identified as five-seconds, watching the first or last five-seconds of this particular advertisement would technically constitute an impression notwithstanding the fact that the user knows nothing more about the product after those five-seconds than he did prior. In these cases, limitations as to impressions of particular portions of an advertisement may be implemented. For example, for an advertiser to consider there to have been an impression, the user must not only view five-seconds of the advertisement but those five-seconds must be within the middle 20-seconds of the 30-second advertisement.

Video or audio ads may also be subject to start-stop loops. That is, the advertisement starts when the user accesses the advertisement (e.g., tunes to a radio station playing the advertisement) and then stops when the user leaves the advertisement (e.g., changes the radio to another station). If the user then changes back to the original station with the advertisement, the ad may commence where it left off as if no time has passed. Such a methodology better ensures an impression but does so at the risk compromising reality (i.e., real-time passage of time is not in effect). The tag object may track the state of the advertisement impression, such as the index into the location in a video file to start the next sequence for the one or more tags associated with the advertising video loop.

Video games, radios and televisions that offer the user the ability to change channels may be associated with features to track multiple advertisement impressions and campaigns. When a user changes a channel or directs a virtual character in the game environment to change a channel, new advertisements may be provided. Such advertisement changes may be transitioned with white noise or a familiar blur associated with changing a channel according to the nature of the device. Radio or television devices may be configured with channels that access both traditional programming, advertisement content or other content. Other content may include chat wherein the device facilitates communications. Other content may also include other information in connection with the game. Generally, the mixing of advertisement and other content in such devices may have the benefit of catalyzing user exposure to advertisements since the use of the device and changing of the channels may be necessary to facilitate game play.

Other advertisements may be rendered or emitted in true real-time. For example, if a television advertisement in a video game is two minutes in length and the user changes the channel in the video game after thirty-seconds of viewing the advertisement but comes back to the same channel thirty-seconds later, the advertisement will now be at the 60 second point and not the 30 second point as in a start-stop embodiment.

While real-time advertisements may be more realistic, ensuring an impression becomes more difficult relative the portion of the advertisement the user viewed as has been previously noted. Certain impression, especially in the real-time video and audio sense, may be subject to ongoing impression limitations. For example, an impression may constitute viewing 30 seconds of a one minute advertisement. The user may, at one point in the game, view a first 10-seconds of the advertisement, view a second 10-seconds at a different point in the game and view yet another 10-seconds at another point in the game. In this instance, the user-albeit piecemeal-may have viewed enough of the ad over the course of time to constitute an impression.

Other advertisements may limit an impression opportunity to consecutive time or such piecemeal viewing/listening but within an overall time frame. For example, viewing the advertisement in 10-second snippets may suffice as an advertisement but they must occur within 15 minutes of one another. Other advertisements may require the thirty-seconds to occur consecutively or an impression has not been established.

Some of these real-time/consecutive impression implications addressed above are reflected in FIG. 36 of the present application. FIG. 36 illustrates the positional relationship of an in-motion game character 3620 relative an advertisement 3610 in an impression area 3630 in a game environment 3600. In FIG. 36, the game character 3620 is positioned in the impression area 3630 of advertisement 3610. The impression area 3630 is also populated with obstacles $3640_A \ldots 3640_D$. As the game character 3620 traverses the game environment 3600, the line-of-sight of the game character changes from an obstructed line-of-sight (as would occur behind obstacles $3640_A \ldots 3640_D$) and an unobstructed line-of-sight $3650_A \ldots 3650_D$. An impression counter (not shown) would move between an on-and-off state as the line-of-sight alternates between obstructed and unobstructed ($3650_A \ldots 3650_D$) lines-of sight.

For example, as the game character 3620 moves past object $3640_A$, the impression counter would begin to measure the existence of an ad impression as provided by unobstructed line-of-sight $3650_A$. As the game character passes behind object $3640_a$, the impression counter would stop measuring the existence of an advertisement impression as a result of now obstructed line-of-sight. Once the game character 3620 emerges from behind object $3640_a$, an unobstructed line-of-sight ($3650_B$) once again exists and the impression counter again would begin to measure the existence of an advertisement impression from the stop point of the previous impression. The measurement of an advertisement impression would continue in a similar fashion as the game character 3620 passes in between remaining objects $3640_B \ldots 3640_D$.

In the present embodiment, as the impression counter starts-and-stops, any one segment of time correlating to an advertisement impression may not constitute a single advertisement impression. The ongoing exposure to the advertisement 3610, albeit in an interrupted fashion, may over the course of time constitute an ad impression. For example, by the impression counter reaching a certain time period (e.g., from start point to a point three seconds in time later), this time period may (as a whole) constitute an ad impression. Such a measurement methodology would be desirous in instances where a game character passes by, for example, a number of pillars; a rod iron fence, a series of windows, or a crowded room.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

For example, the embedded advertising 'tags' as described in the present invention may be further applied to digital video and audio signals—television and audio broadcasts, for example—as well as movies filmed in a digital format whereby advertisements or other content may be inserted into previously generated audio and/or video content. On-line media such as on-line magazines, newspapers and blogs may also benefit from the implementation of tagging advertising assets (e.g., particular column inches or steaming news broadcasts) as present-day advertising methodologies such as pop-ads become less effective and/or less popular. Advertising content may be offered by network and/or content providers (e.g., cable providers) whereby advertising content is offered on-demand.

Additionally, the various impression area and occlusion concepts disclosed herein may be applied to audio advertisements or other audible emissions. For example, a radio or other audio emitting object may be defined, in part, by an impression area. Such an impression area would be determined in a manner similar to an impression area as it concerns a visual advertisement. An impression area in the context of audio would be representative of where an audio advertisement or other audio emission may be heard by the character in a game environment as the volume of the audio emission decreases as the character moves further away from the advertisement in three-dimensional space or if the character is located behind an object in which case the occlusion determination concepts become applicable (e.g., does a wall separate the character and the audio signal). The quality of audio impressions may also be determined in a manner similar to quality determinations with visual advertisements with regard to not only distance but the extent to which an intermediate object might absorb the sound, for example, a pane of soundproof glass versus a thinly constructed wall.

The asset tagged to receive an advertisement may be movable and rotatable and may be programmed to dynamically orientate towards the user camera as the user manipulates around the game environment. Ad campaigns may be interleaved with special programming. Special programming may influence ad campaigns, variables in the tags relating to the ad campaigns, or may relate to the game environment. Special programming may influence (e.g., terminate or replace) an ad campaign or modify variables or functions contained in an ad campaign or tag. Special programming may accommodate for dynamic reconfiguration and reuse of an advertising asset.

For example, special programming ay be used to communicate special messages, game messages, forum messages, facilitate chat and so forth. Special programming may also be used to transfer control of the advertising asset to the game environment so that the advertising real estate can be used to convey game information and other information.

Notwithstanding the providing of detailed descriptions of exemplary embodiments, it is to be understood that the present invention may be embodied in various forms. For example, it is envisioned that the apparatus and method for executing a game program having advertisements; the customer election of auxiliary content; the provisioning of auxiliary content on local storage during the download and/or access of primary content over a network; the in-contents advertising method; and advertising impression determination methodologies disclosed in the present application may all be combined with one another individually, collectively, or in any other fashion as would be understood by one of ordinary skill in the art. Therefore, specific details disclosed herein are not to be interpreted as limiting but rather as a basis for the claims and as a representative basis for teaching one skilled in the art to employ the present invention in virtually any appropriately detailed system, structure, method, process, or manner.

What is claimed is:

1. An apparatus for executing content data having a plurality of images, the plurality of images including original images and advertisement images, the advertisement images including advertising data, the apparatus comprising:
    at least one storage mechanism, wherein the content data having the plurality of images is stored in the at least one storage mechanism;
    a network connection coupled to the storage mechanism, whereby the storage mechanism may receive and store new advertising data transmitted over the network connection, the new advertising data for insertion into the advertisement images; and
    a processing unit coupled to the at least one storage mechanism, wherein the processing unit executes instructions stored in the at least one storage mechanism, the instructions including the content data having the plurality of images, whereby the execution of the instructions causes:
        display of a virtual environment including the original images and advertisement images, the advertisement images including the new advertising data received over the network connection and stored in the at least one storage mechanism, and
        identification of impressions based on a state of at least one object in the virtual environment and user manipulation of the content data, the at least one object occluding a portion of an advertisement image in the virtual environment, the occluded portion meeting an allowed occlusion level.

2. The apparatus of claim 1, wherein the content data stored in the at least one storage mechanism includes primary media content and the advertising data includes trigger data corresponding to a particular advertisement.

3. The apparatus of claim 2, wherein the advertising data for insertion into the advertisement images is received by the network connection from an advertising server and is based in part on specifications of an advertiser and information contained within the primary media content indicating that advertisement images may be inserted into the primary media content.

4. The apparatus of claim 1, wherein the advertising data is received by the network connection during a download of primary media content from a server.

5. The apparatus of claim 1, wherein a feedback record from a user is transmitted over the network connection, the feedback record reflecting the identified impressions of the user to the advertisement images.

6. The apparatus of claim 1, wherein the display of the virtual environment includes use of an in-game camera to present the virtual environment from a perspective associated with the user.

7. The apparatus of claim 1, wherein the identification of impressions is further based on location of a character associated with the user, the location within a predefined impression area in the virtual environment.

8. The apparatus of claim 1, wherein the identification of impressions is further based an orientation of a character associated with the user, the orientation facing the advertisement image in the virtual environment.

9. The apparatus of claim 8, wherein the identification of impressions specifies an allowed occlusion level relative to the degree of frame of the advertisement image.

10. The apparatus of claim 1, wherein the identification of impressions is further based on a degree of frame of the advertisement image.

11. A method for executing content data including original images and advertisement images, the advertisement images associated with advertising data, the method comprising:
    maintaining the content data in memory;
    receiving new advertising data at a network connection, the new advertising data for insertion into the advertisement images of the content data; and
    executing instructions stored in memory, the instructions including the content data, wherein execution of the instructions by a processor:
        generates a display of a virtual environment including the original images and the advertising images, wherein the advertising images includes the new advertising data, and
        identifies impressions based on a state of at least one object in the virtual environment and user manipulation of the content data, the at least one object occluding a portion of an advertisement image in the virtual environment, the occluded portion meeting an allowed occlusion level.

12. The method of claim 11, wherein the identification of impressions comprises:
    monitoring a perspective of the user in the virtual environment;
    identifying that the at least one object occludes a portion of the advertisement image from the user perspective; and
    determining an impression based on a level of occlusion of the at least one object from the user perspective.

13. The method of claim 11, wherein generating the display comprises inserting the new advertising data into the advertisement images, wherein insertion of the new advertising data into the advertising images is based in part on specifications of an advertiser and information contained within the primary media content indicating that advertisement images may be inserted into the primary media content.

14. The method of claim 11, further comprising transmitting a feedback record from a user, the transmitted feedback record sent using the network connection, the feedback record reflecting the identified impressions of the user to each of the advertisement images.

15. The method of claim 11, wherein the identification of impressions is further based on location of a character associated with the user, the location within a predefined impression area in the virtual environment.

16. The method of claim 11, wherein the identification of impressions is further based an orientation of a character associated with the user, the orientation facing the advertisement image in the virtual environment.

17. The method of claim 11, wherein the identification of impressions is further based on a degree of frame of the advertisement image.

18. The method of claim 17, wherein the identification of impressions specifies an allowed occlusion level relative to the degree of frame of the advertisement image.

19. The method of claim 18, wherein the occlusion level is determined based on an occlusion probe, the radius size of the occlusion probe based on the degree of frame of the advertisement image.

20. A computer-readable storage medium, having embodied thereon a program, the program being executable by a processor to perform a method for executing content data including original images and advertisement images, the advertisement images associated with advertising data, the method comprising:

receiving new advertising data, the new advertising data for insertion into the advertisement images;

generating a display of a virtual environment including the original images and the advertising images, the advertising images including the new advertising data; and identifying impressions based on a state of at least one object in the virtual environment and user manipulation of the content data, the at least one object occluding a portion of an advertisement image in the virtual environment, the occluded portion meeting an allowed occlusion level.

* * * * *